(12) United States Patent
Tumbar et al.

(10) Patent No.: US 6,639,683 B1
(45) Date of Patent: Oct. 28, 2003

(54) INTERFEROMETRIC SENSOR AND METHOD TO DETECT OPTICAL FIELDS

(75) Inventors: Remy Tumbar, 1512 Country Lake Dr., Champaign, IL (US) 61821; David J. Brady, Champaign, IL (US)

(73) Assignee: Remy Tumbar, New York, NY (US)

( * ) Notice: Subject to any disclaimer, the term of this patent is extended or adjusted under 35 U.S.C. 154(b) by 0 days.

(21) Appl. No.: 09/690,576

(22) Filed: Oct. 17, 2000

(51) Int. Cl.⁷ .................................................. G01B 9/02
(52) U.S. Cl. ........................ 356/521; 356/512; 356/494
(58) Field of Search ................................ 356/491, 520, 356/521, 512

(56) References Cited

U.S. PATENT DOCUMENTS

| | | | | |
|---|---|---|---|---|
| 4,518,854 A | * | 5/1985 | Hutchin | ...................... 250/201 |
| 5,438,414 A | | 8/1995 | Rust | |
| 6,304,330 B1 | | 10/2001 | Millerd et al. | |

FOREIGN PATENT DOCUMENTS

EP          538126          4/1993

OTHER PUBLICATIONS

J.E. Greivenkamp, "Color Dependent Optical Prefilter for the suppression of Aliasing Artifacts", Applied Optics, vol. 29, No. 5, Feb. 10, 1990, pp. 676–683.

A.L. Weijers, H. vanBrug, H.J. Frankena, "Polarization Phase Stepping with a Savart Element", Applied Optics, vol. 37, No. 22, Aug. 1, 1998, pp. 5150–5155.

S.P. Kothiyal, C. Delisle, Shearing Interferometer for Phase Shifting Inteferometry of Polarization Phase Shifter, Applied Optics, vol. 24, No. 24, Dec. 15, 1985, pp. 4439–4442.

J. M. Geary, Introduction to Wavefront Sensors, Chapters 5.3–5.7, pp. 70–87.

J.M. Geary, Introduction to Wavefront Sensors, Chapter 6, "In direct Wavefront Measurement, Part II", pp. 89–103.

K.E. Thompson, D.M. Rust, H. Chen, "A Compact Polarization Imager", John Hopkins APL Technical Digest, vol. 16, No. 3, 1995, pp. 258–277.

T.W. Stone, J.M. Battiato, "Optical Array Generation and Interconnection Using Birefringent Slabs", Applied Optics, vol. 33, No. 2, Jan. 10, 1994, pp. 182–191.

R. Tumbar, "Sampling Field Sensors", Ph.D. Proposal, University of Illinois at Urbana, Champaign, unpublished(2000).

"The Sampling Field Sensor", 1998 Poster Presentation.

R. Tumbar, R.A. Stack, D.J. Brady, "Wave–Front Sensing with a Sampling Field Sensor", Applied Optics, vol. 39, No. 1, Jan. 1, 2000, pp. 72–84.

Malacarra et al., "Interferogram Analysis for Optical Testing", Review and Comparison of Major Interferometric Systems, Chapter 1, pp. 1–16.

(List continued on next page.)

*Primary Examiner*—Frank G. Font
*Assistant Examiner*—Andrew H. Lee
(74) *Attorney, Agent, or Firm*—Brinks Hofer Gilson & Lione

(57) ABSTRACT

A method and device is capable of amplitude, phase, polarization shear, wavelength, and diversity measurement along a common path by using a sampling device to get a sparse sampled optical field. The sampled field is fed to a diversity generator device. The diversity generator device generates the diversity information associated with each sample/element of the sparse input in empty space provided by sampling. The diversity information may consist of phase-shifted copies of the input sample having known/device dependent relative phases, amplitudes, polarization, shear, or wavelength with respect to their originating sample. The geometry of the fan out allows overlap between part or all different diversity copies (originating from the same or from different samples) thus making the method interferometric.

53 Claims, 35 Drawing Sheets

OTHER PUBLICATIONS

Malacarra et al., "Interferogram Analysis for Optical Testing", Phase Shifting Interferometry, Chapter 7, pp. 247–261.

Born & Wolf, "Principles of Optics", pp. 705–708.

Jerome Primot, "Three–wave lateral shearing interferometer", Applied Optics, vol. 32, No. 31, Nov. 1, 1993, pp. 6242–6249.

Thomas W. Stone and James M. Battiato, "Optical array generation and interconnection using biefringent slabs", Applied Optics, vol. 33, No. 2, Jan. 10, 1994, pp. 182–191.

Karl E. Thompson, David M. Rust and Hua Chen, "A Compact Polarization Imager", Johns Hopkins Apl. Technical Digest, vol. 16, No. 3(1995), pp. 258–276.

Chapter 3, "The Sampling Field Sensor", pp. 29–74.

Aldegonda L. Weijers, Hedser van Brug and Hans J. Frankena, "Polarization phase stepping with a Savart element", Applied Optics, vol. 37, No. 22, Aug. 1, 1998, pp. 5150–5155.

M.P. Kothiyal and Claude delisle, "Shearing interferometer for phase shifting interferometry with polarization phase shifter", Applied Optics, vol. 24, No. 24, Dec. 15, 1985, pp. 4439–4442.

R.J. Bell "Introductory Fourier Transform Spectroscopy", Chapter two, Historical Sketch and Crucial Ideal, Michelson and His Interferometer, pp. 16–19.

K. Creath, "Phase Measurement Interferometry Techniques", E.Wolf, Progress in Optics XXVI, Elsevier Science Publishers, B.V. 1988, pp. 349–373.

Goodman, "Introduction to fourier Optics", Introduction to Fourier Optics, pp. 108–115.

A. Kalestynski and B. Smolinska, "Spatial frequency sampling by phase modulation as a method of generating multiple images", Applied Optics, Aug. 1977, vol. 16., No. 8, pp. 2261–2263.

* cited by examiner

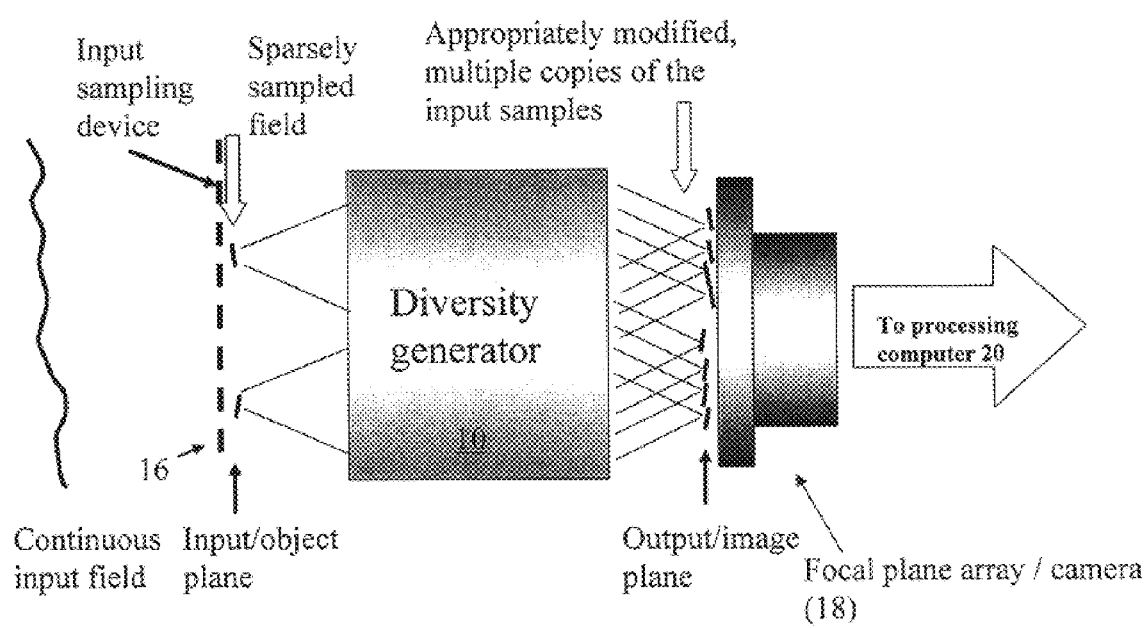
FIG. 1(d) Sampling field sensor

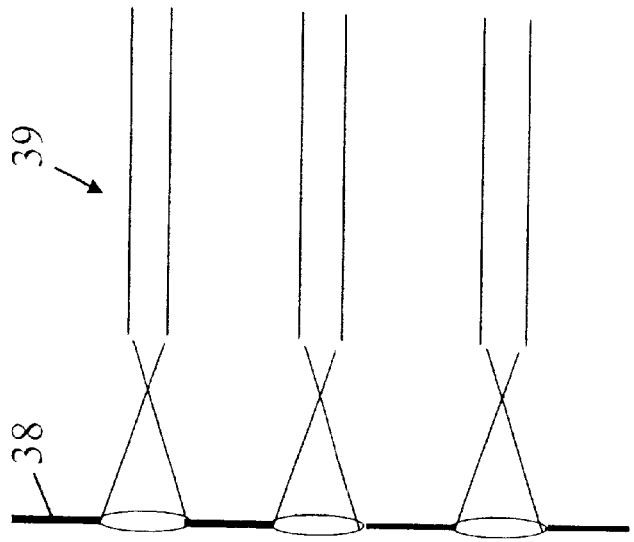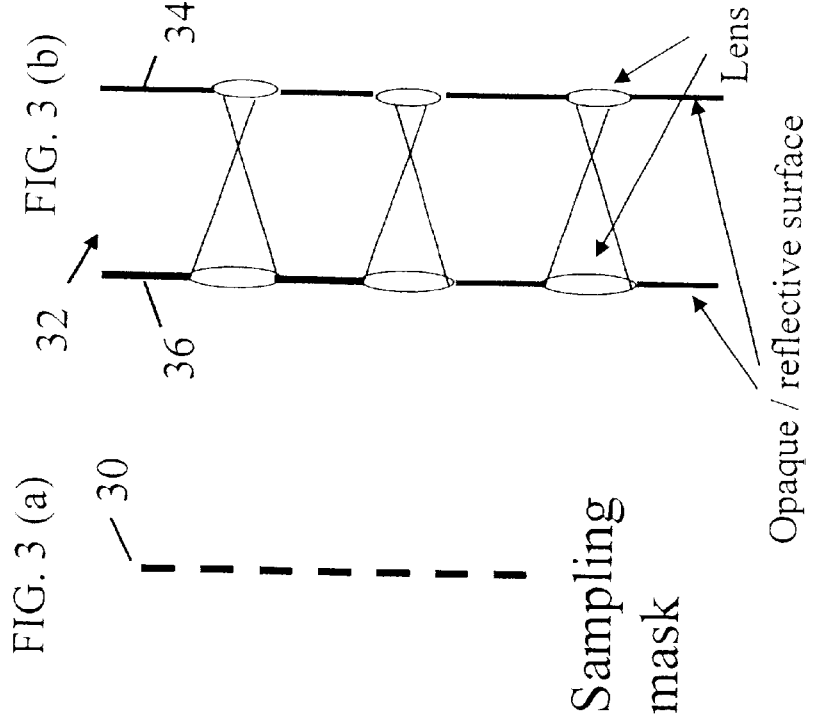
FIG. 3

Finite focal length system (42)

Lenslet array (44)

4-f afocal system (40)

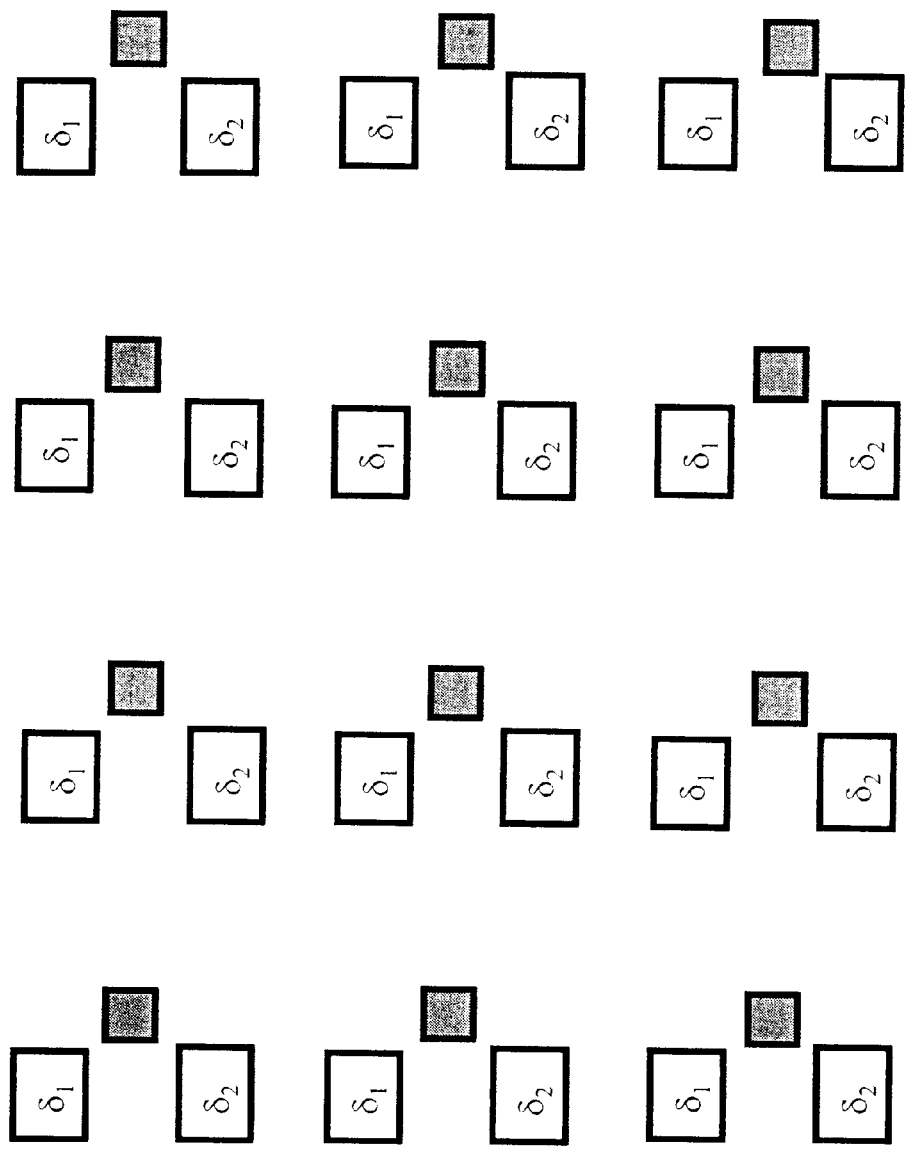
FIG. 21 Pattern on the periodic FME (4×3 periods)

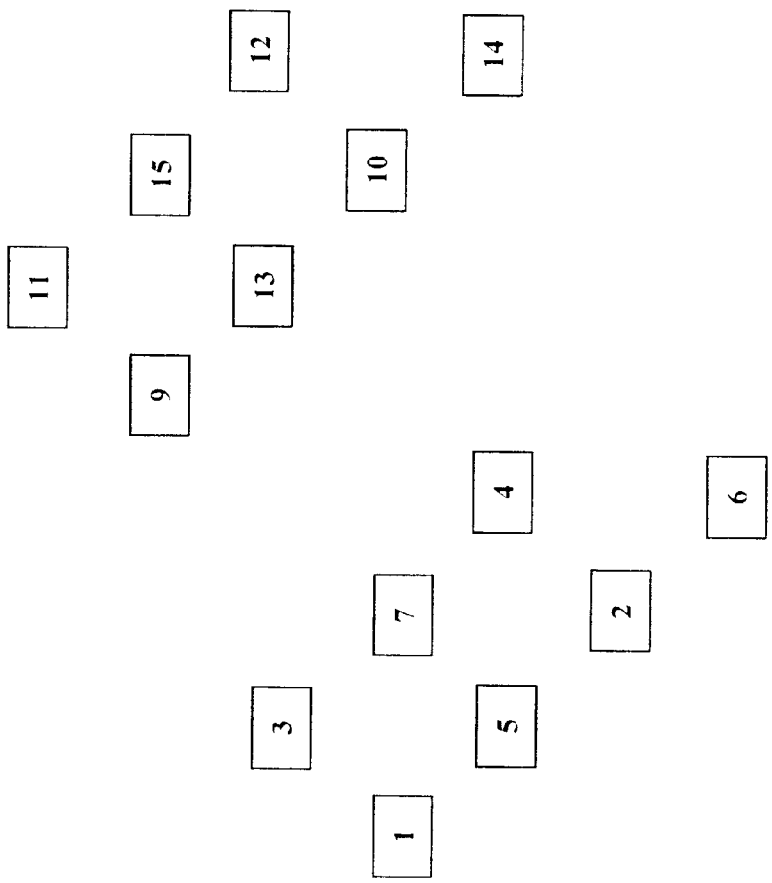
FIG. 22 (a) Characteristic pattern of the two stage DG with FME for one sample in the input.

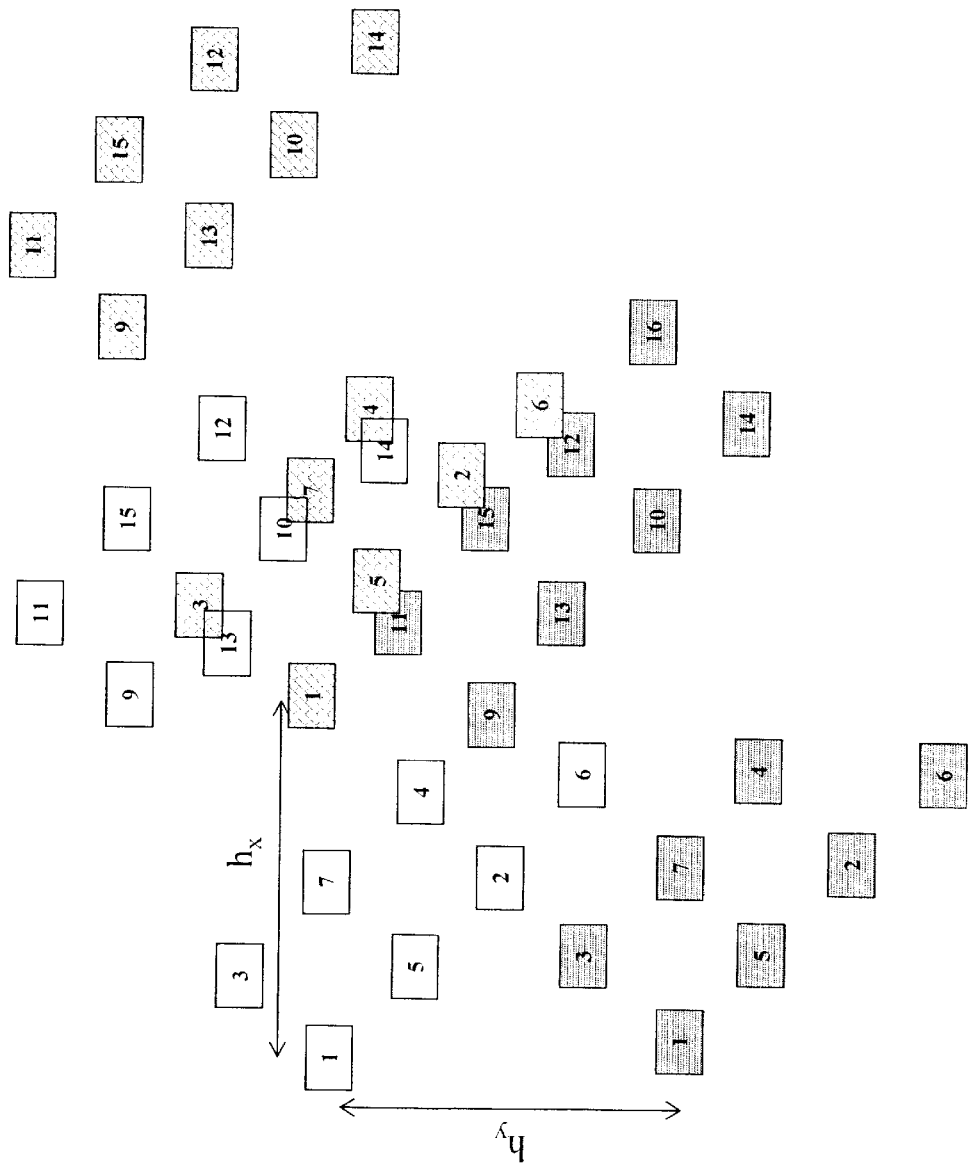
FIG. 22 (b): Characteristic pattern of the two stage DG with FME for the the three samples in FIG. 16

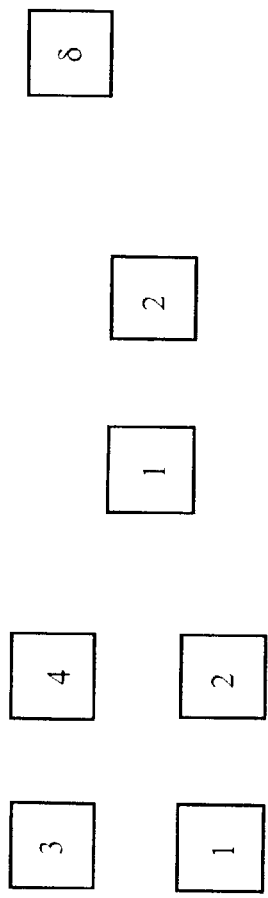
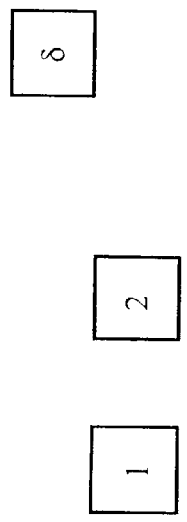
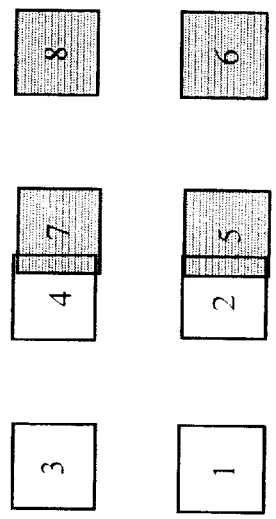
1 = OOO
2 = EOO
3 = OEO
4 = EEO
5 = OOE
6 = EOE
7 = OEE
8 = EEE
FIG. 23 (a)   FIG. 23 (b)   FIG. 23 (c)   FIG. 23 (d)
☐ Characteristic pattern for x polarization: $c_x$
▨ Characteristic pattern for y polarization: $c_y$ (slightly displaced to emphasize overlap)

INTERFEROMETRIC SENSOR AND METHOD TO DETECT OPTICAL FIELDS

FEDERALLY SPONSORED RESEARCH OR DEVELOPMENT

This invention was made with Government support under Grant No. DAAG55-98-1-0039, awarded by the U.S. Army, U.S. Army Research Office. The Government has certain rights in the invention.

FIELD OF THE INVENTION

The field of the invention is optical field sensing and analysis.

BACKGROUND OF THE INVENTION

Systems and devices that rely upon obtaining intelligence from optical fields are limited by the sensor used to sense the optical field. Image intensity provides limited information, and techniques which analyze only intensity are accordingly limited. More powerful analysis techniques, such as interferometry, seek to expand the information through use of the intensity to determine other aspects of the optical field such as the phase, the polarization, or the spectral information.

The typical sensing device in an imaging system is a photodetector that senses optical intensity. Photodetectors can detect only the intensity of an optical field and cannot detect the phase of the optical field. Therefore, the field parameters that are dependent on the phase of the optical field have to be coded into intensity measurements. For example, interferometers detect phase differences by interfering different optical fields or portions of the same optical field. The resulting interferograms code the phase information into intensity information. Similarly, the temporal spectrum of the optical field consists of different components having different temporal oscillation frequencies. That means that their phases change with different velocities. A regular photodetector cannot output different signals as a function of the frequency of the incident optical field in the spectral regions where it has a flat spectral response. Fourier transform spectrometers (FTS) interfere delayed versions of the optical field and output the resulting intensity measurements. The Fourier transform of the measurements gives the spectral content of the input field.

Interferometers, holograms, spectrometers and other optical instruments code phase related information into intensity information. In some cases, the output intensity is measured for more than one state of the instrument. For example, the path length difference of an interferometer is changed between measurements to provide additional phase information. This is done by moving mirrors, moving gratings, moving wave plates, and other means. These operations may remove degeneracies (like in the estimating the phase angle from its cosine value, which is measured by interferometers) or they may increase the accuracy of the estimate in the presence of noise. The so-called phase-shift algorithms are used for that purpose. In the case of shearing interferometers, the shear direction is changed (from x to y for example) in some cases in order to recover two-dimensional phase maps. A problem arises when the input changes (e.g., a pulsed or variable field) or when the system also changes uncontrollably between the measurements, thus reducing the accuracy of the result. Similarly, complete polarization measurement of the optical field requires four intensity measurements. This multiple shot measurement requires rotating polarizers and waveplates to obtain the polarization information (including the phase lag between TE and TM components) from intensity data. This poses a problem if the input is changing during the time of the measurement. If the input field contains spectral information, Fourier transform spectrometers, such as the Michelson interferometer, may recover the spectral content. Fourier transform spectrometers scan the path/phase delay between the two arms and measure the interference output for different delays. Multiple measurements are required, which poses a problem in the case of changing inputs.

There are other ways to generate more information per output frame. In these cases the output information is not similar to that of multi frame systems although it is used to solve the same problems. For example, crossed gratings have been used to generate simultaneous x and y shears in wave-front sensors. Triple shearing interferometry, which uses array generation techniques to produce three sheared interfering beams from one input beam, has also been proposed for real-time wave front sensing. We proposed a technique that samples the input wave front with an array of small apertures and generates both phase shift and shear diversity information. The phase shift information for both x and y shears was generated by appropriately choosing the diffraction distance and the sampling positions in the output aperture of the sensor. Our approach had limited light throughput making it unusable with reduced input intensities.

| Acronym | TABLE OF ACRONYMS: Meaning |
|---|---|
| DFS | Diversity Field Sensor |
| DG | Diversity Generator |
| DMD | Deformable Mirror Device |
| FME | Field Modulating Elements |
| FTS | Fourier Transform Spectroscopy |
| MZI | Mach-Zehnder Interferometer |
| PSF | Point Spread Function/Characteristic Pattern |
| RSI | Rotational, Shear Interferometer |
| SDG | Sampling Diversity Generator |
| SFS | Sampling Field Sensor |
| SLM | Spatial Light Modulator |
| TE | Transversal Electrical |
| TM | Transversal Magnetic |
| WASE | Wave-Front/Amplitude Splitting Element |

SUMMARY OF THE INVENTION

The invention is a new method to be used to generate more diversity data per frame of the output of an optical system. The present method can be applied to any situation where phase, polarization, shear, coherence (spatial and/or temporal), and wavelength data is recorded in a single or multiple frames of the output to obtain information from the input optical field. It generates the information in fewer frames, or even one frame of the output. We define a frame of the output to be the measurement of intensity in the output plane of the system taken at one time instance. The data is similar to that in the corresponding multi-shot system. Thus, each particular application of the method possesses the same advantages as the corresponding multi-shot system. In addition, the invention is able to use fewer frames, or even one frame, of the output to reconstruct the information in the input optical field. Also, in contrast to multi-path systems, the information is generated essentially along the same optical path, resulting in more compact systems that are also less sensitive to vibrations and misalignment.

The present invention can be applied to reduce the number of frames in multi-frame diversity based field measurement techniques. It is capable of generating amplitude, phase, polarization, spatial, temporal coherence, and/or wavelength diversity data along an essentially common optical path by using a sparsely sampled input field and generating the diversity data in the empty regions between the samples. The diversity data associated with each sample is generated by imaging the respective samples into multiple appropriately modified and spatially shifted copies, placed in the empty space between the samples and appropriately modified to provide diversity data alone or through interference with the copies coming from the same sample or from different samples in the input. The method can also be used with a continuous input field. The continuous field is first sampled with a sampling device in order to obtain a sparsely sampled version. The diversity data is processed with algorithms parameterized by the characteristics of the fan out.

BRIEF DESCRIPTION OF THE DRAWINGS

Other features, objects and advantages of the invention will be apparent to those skilled in the art by reference to the detailed description and the drawings, of which:

FIG. 1(d) illustrates a sampling field sensor constructed in accordance with the invention;

FIGS. 3(a)–3(c) illustrates implementations of sampling elements usable in a diversity generator of the invention;

FIG. 21 illustrates a pattern on the periodic FME (4×3 periods) of the two stage DG;

FIGS. 22(a) and 22(b) respectively show characteristic patterns of the two stage DG with FME for: (a) one sample in the input; (b) the three samples in FIG. 16;

FIG. 23 illustrates a characteristic pattern for polarization estimation. The characteristic patterns of the first and the second stage of the DG are shown in FIG. 23(a) and 23(b) respectively. FIG. 23(c) shows the pattern on the FME which is such that to add a phase shift $\delta$ to copy labeled "3" in FIG. 23(a). FIG. 23(d) shows the output pattern of the cascaded DG following the same numbering scheme as in FIG. 12 together with the legend showing the propagation through the sequence of plates;

DETAILED DESCRIPTION OF THE PREFERRED EMBODIMENTS

Different applications of the method of the invention result in different physical implementations. However, the logical/functional application of the method is common to all of its applications. In the invention, diversity data is generated such that fewer (ideally one) frames of the system output are required for an unambiguous reconstruction of the input (e.g., for phase reconstruction problems). In an additional aspect of the invention, the same approach is used to increase the estimation accuracy of an input parameter, e.g., when more than the minimum set of diversity data is generated. The method of the invention can be used in any situation where multiple frames of the output of an optical system are required for reconstructing the input optical field. Exemplary uses of the inventive method include:

1. Phase-shift and/or shearing (lateral, radial, and rotational) interferometers such as the Mach-Zehnder interferometer (MZI) or the rotational shearing interferometer (RSI) for which the method can be used to generate both the shear and the phase-shift data.
2. Phase-shift non-shearing interferometers such as the Michelson/Twyman-Green interferometer, the Fizeau interferometer, and others, for which it can be used to generate the phase-shift information.
3. Ellipsometers, which measure the phase delay between the TE and TM polarization components of an input field by providing the phase-shift data as well as the individual polarization component data. The method of the invention can be used to measure the Stokes/Jones parameters associated with an optical field. U.S. Pat. No. 5,438,414 provides a device for measuring the field power (intensity) in the TE and TM components of an optical field. However, the present invention enables an interferometric measurement of the phase lag between the two polarization components as well as less crosstalk between measurements by imaging the input samples to the output plane.
4. Fourier transform spectrometers. The present method may be used to generate phase-shifted copies of each input sample. The output copies from each input sample are interfered with each other to provide an estimate of the temporal spectrum of the input field.

Diversity information permits reconstruction of optical field components. A Diversity generator interferes intensity elements to permit reconstruction of field components. Stated differently, diversity generation includes optical measurement techniques that measure multiple modified versions of the input optical field in order to get the optical field information in it.

The present invention has multiple aspects concerning obtaining diversity information from optical fields. The method of the present invention is useful when multiple measurements of one or more input optical fields are necessary in order to obtain an estimate of their characteristics, e.g., phase, amplitude, polarization, coherence, wavelength, and noise content.

Figure 1A:
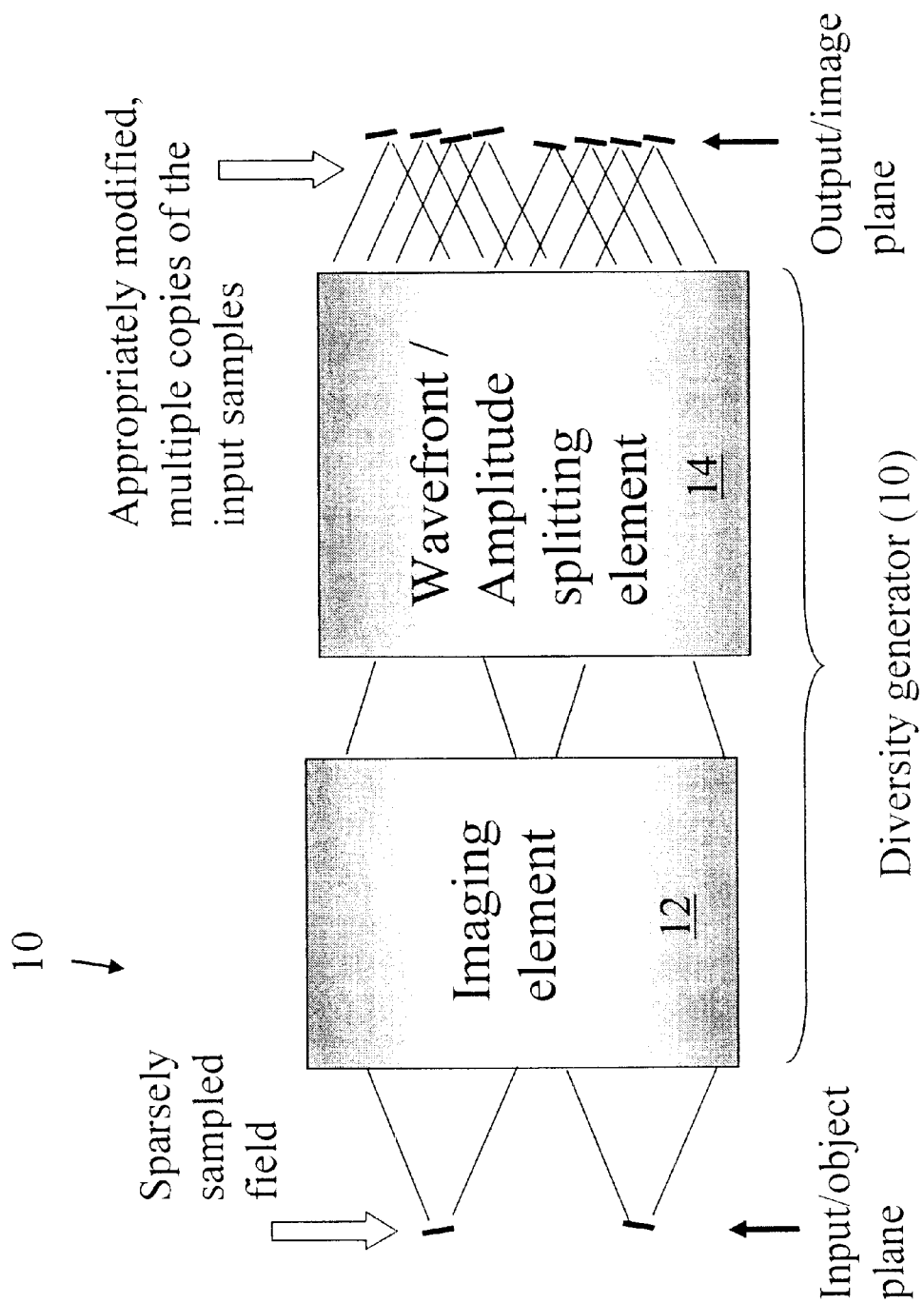
FIG. 1(a) illustrates a diversity generator constructed in accordance with the invention.

One aspect of the invention provides a method to generate diversity information associated with a sparse optical field, i.e., an optical field that consists of samples separated by empty regions. The diversity information is generated by appropriately imaging each sample into multiple copies, using an appropriately designed combination of imaging elements and wave-front/amplitude splitting elements. The copies are generated such that the intensity information at the output plane of the device contains the desired diversity information about the input. The diversity information can be shear, amplitude, phase, polarization, spatial, temporal coherence, wavelength and noise diversity. The multiple copies associated with each sample in the input are generated on an essentially common optical path, in the empty space between the samples. This provides for a more compact system that is less sensitive to noise and misalignment. The method provides for a device that generates diversity information associated with sampled optical fields on an essentially common optical path, the diversity generator (DG). Referring to FIG. 1(a), the DG 10 includes an imaging element 12, which images the input samples to their images at the image/output plane, and a wave-front splitting element 14, which multiplies each image into multiple, appropriately modified copies. The WASE 14 can be placed before or after the imaging element 12. The generation of the fan-out copies may be done in a similar manner for all input samples (shift-invariant DG) or it may be different for part or all the input samples (shift-variant DG).

The DG 10 generates the diversity information along an essentially common optical path, thus being more compact and less sensitive to vibration and misalignment than multi-path systems. Additional optical components (such as waveplates, polarizers, spectral filters, imaging optics), along with the imaging element 12 and the WASE 14, may be used in the practice of the method.

The output of the DG 10 at all points (X,Y) in the output space/plane for a unit amplitude and zero phase impulse input function placed at the point (x,y) in the input space/plane is called impulse response function, c(X,Y;x,y;λ). We refer to the output generically as a characteristic pattern of the DG 10. The most general form of characteristic pattern is a shift variant one, given by:

$$c(x, y; X, Y; \lambda) = \sum_{(X_{j0}, Y_{j0}) \in \left\{\begin{array}{c}\text{non-overlapping} \\ \text{copies}\end{array}\right\}} \delta(X - X_{j0}(x, y), Y - Y_{j0}(x, y)) \cdot K_{j0}(x, y) \cdot e^{i\alpha_{j0}(x,y)} \cdot \vec{P}_{j0}(x, y) + \quad (1)$$

$$\sum_{(X_{j1}, Y_{j1}) \in \left\{\begin{array}{c}\text{overlapping copies} \\ \text{of different} \\ \text{samples from the} \\ \text{same input field}\end{array}\right\}} \delta(X - X_{j1}(x, y), Y - Y_{j1}(x, y)) \cdot K_{j1}(x, y) \cdot e^{i\alpha_{j1}(x,y)} \cdot \vec{P}_{j1}(x, y) +$$

$$\sum_{(X_{j2}, Y_{j2}) \in \left\{\begin{array}{c}\text{overlapping copies} \\ \text{of the same} \\ \text{sample from the} \\ \text{same input field}\end{array}\right\}} \delta(X - X_{j2}(x, y), Y - Y_{j2}(x, y)) \cdot K_{j2}(x, y) \cdot e^{i\alpha_{j2}(x,y)} \cdot \vec{P}_{j2}(x, y) +$$

$$\sum_{(X_{j3}, Y_{j3}) \in \left\{\begin{array}{c}\text{overlapping copies} \\ \text{of different} \\ \text{samples from} \\ \text{different input fields}\end{array}\right\}} \delta(X - X_{j3}(x, y), Y - Y_{j3}(x, y)) \cdot K_{j3}(x, y) \cdot e^{i\alpha_{j3}(x,y)} \cdot \vec{P}_{j3}(x, y) +$$

-continued $$\sum_{(X_{j4},Y_{j4})\in\left\{\begin{array}{c}\text{overlapping copies}\\\text{of same sample}\\\text{from different}\\\text{input fields}\end{array}\right\}} \delta(X - X_{j4}(x, y), Y - Y_{j4}(x, y)) \cdot K_{j4}(x, y) \cdot e^{i\alpha_{j4}(x,y)} \cdot \vec{P}_{j4}(x, y)$$

The small case variables are the coordinates in the input plane while the capital variables are the coordinates in the output plane of the DG. A shift invariant implementation is obtained by replacing the four-variable dependence with a two-variable dependence of the characteristic pattern or impulse response function. It is given by:

$$c(X - x, Y - y; \lambda) = \sum_{(X_{j0},Y_{j0})\in\left\{\begin{array}{c}\text{non-overlapping}\\\text{copies}\end{array}\right\}} \delta(X - X_{j0}, Y - Y_{j0}) \cdot K_{j0} \cdot e^{i\alpha_{j0}} \cdot \vec{P}_{j0} + \quad (2)$$

$$\sum_{(X_{j1},Y_{j1})\in\left\{\begin{array}{c}\text{overlapping copies}\\\text{of different}\\\text{samples from the}\\\text{same input field}\end{array}\right\}} \delta(X - X_{j1}, Y - Y_{j1}) \cdot K_{j1} \cdot e^{i\alpha_{j1}} \cdot \vec{P}_{j1} +$$

$$\sum_{(X_{j2},Y_{j2})\in\left\{\begin{array}{c}\text{overlapping copies}\\\text{of the same}\\\text{sample from the}\\\text{same input field}\end{array}\right\}} \delta(X - X_{j2}, Y - Y_{j2}) \cdot K_{j2} \cdot e^{i\alpha_{j2}} \cdot \vec{P}_{j2} +$$

$$\sum_{(X_{j3},Y_{j3})\in\left\{\begin{array}{c}\text{overlapping copies}\\\text{of different}\\\text{samples from}\\\text{different input fields}\end{array}\right\}} \delta(X - X_{j3}, Y - Y_{j3}) \cdot K_{j3} \cdot e^{i\alpha_{j3}} \cdot \vec{P}_{j3} +$$

$$\sum_{(X_{j4},Y_{j4})\in\left\{\begin{array}{c}\text{overlapping copies}\\\text{of same sample}\\\text{from different}\\\text{input fields}\end{array}\right\}} \delta(X - X_{j4}, Y - Y_{j4}) \cdot K_{j4} \cdot e^{i\alpha_{j4}} \cdot \vec{P}_{j4}$$

Next, we shall consider only the shift invariant case (Eq. (2)), for simplicity. The logical generalization to the shift-variant case (Eq. (1)) will be obvious to those skilled in the art.

The vectors $(X_j, Y_j)$ with $j\in\{j0, j1, j2, j3, j4\}$ give the positions of the different copies in the output plane. These copies will be placed in the empty regions of the output plane provided by the current method through sampling in the input plane. This allows for small lateral displacement vectors $(X_j, Y_j)$.

The symbols $K_j$, $\alpha j$, and $P_j$, with $j\in\{j0, j1, j2, j3, j4\}$, give the amplitude, the relative phase, and the polarization, respectively, of the different copies in the characteristic pattern. Therefore, each generated copy is placed at a certain coordinate in the output plane such that different copies interfere along the chosen shear directions (thus the controlled geometry giving shear diversity), it has a certain relative phase with respect to a common reference (thus the controlled phase giving phase diversity), and it has a certain polarization (thus the controlled polarization giving polarization diversity). The polarization vector is a Jones vector if the input optical field is completely polarized or a Stokes vector if the input optical is partially polarized. The wavelength dependence of the characteristic pattern can be used to generate wavelength diversity.

The terms in the characteristic pattern in Eq. (1) are grouped under different summation signs, according to the way they interfere/overlap, if a sampled field containing multiple samples is fed to the DG 10. According to linear systems theory, the output of the DG 10 will consist of a convolution (in the shift invariant case) between the input field and the characteristic pattern of the DG. Because the input field is sparsely sampled, the result of the convolution will be a set of adjacent characteristic patterns following the geometry of the adjacency of the input samples. Therefore different output copies may overlap in different manners. Referring to Eqs. (1) and (2), there are four different ways of overlap/interference and each provides different diversity information through detection by appropriately positioned photodetectors in the output-sensing plane. The notes under the summation terms in Eqs. (1) and (2) are self-explanatory. As provided by Eqs. (1) and (2), the interference of multiple fields is possible, although not more than two are usually interfered in practice.

For example, multiple fan-out copies from different samples may overlap at one point in the output. These terms will be under the summation sign labeled as "overlapping copies from different samples of the same input field". A similar pattern is followed for the detection of the terms in the remaining three groups. A special mention is due for the group labeled as "non-overlapping copies" in Eqs. (1) and (2), which are copies that will not overlap with other copies even in the presence of adjacent samples in the input (which create the adjacent characteristic patterns in the output of a shift invariant DG). These copies are used for direct irradiance measurements of different characteristics of the corresponding input sample. The chosen overlap manner depends on the particular application of the method and the type of diversity measurement needed.

The type of terms to be included and the overlap manner will be obvious to those skilled in the art when applying the current method to a known multi-shot technique. For example, the method of shearing interferometry interferes adjacent samples of a monochromatic and spatially coherent input field to estimate its phase distribution. This is done separately for samples adjacent along two non-collinear directions, usually the Cartesian directions. Additional intensity measurements of the input, without interference, are used to estimate the amplitude distribution of the input field. The present method can be used to generate the information in as little as a one frame of the intensity in the output plane. The characteristic function of the DG 10 will contain only the terms under the first two summation signs. The terms under the first summation sign will give the amplitude measurements while the ones under the second summation sign will give the phase-shifted interferometric measurements for different shears and phase shifts. Another important example is that of phase shift interferometry as it is applied in two-beam interferometers, such as the Michelson and the Fizeau interferometers.

The choice of overlap manner and type of diversity data needed does not always completely specify the needed characteristic pattern. In other words, multiple characteristic patterns may be possible for the same application of the method. The current method specifies the requirements to be satisfied by the different patterns based on the type of diversity data needed, and type of input field.

Figure 1B:
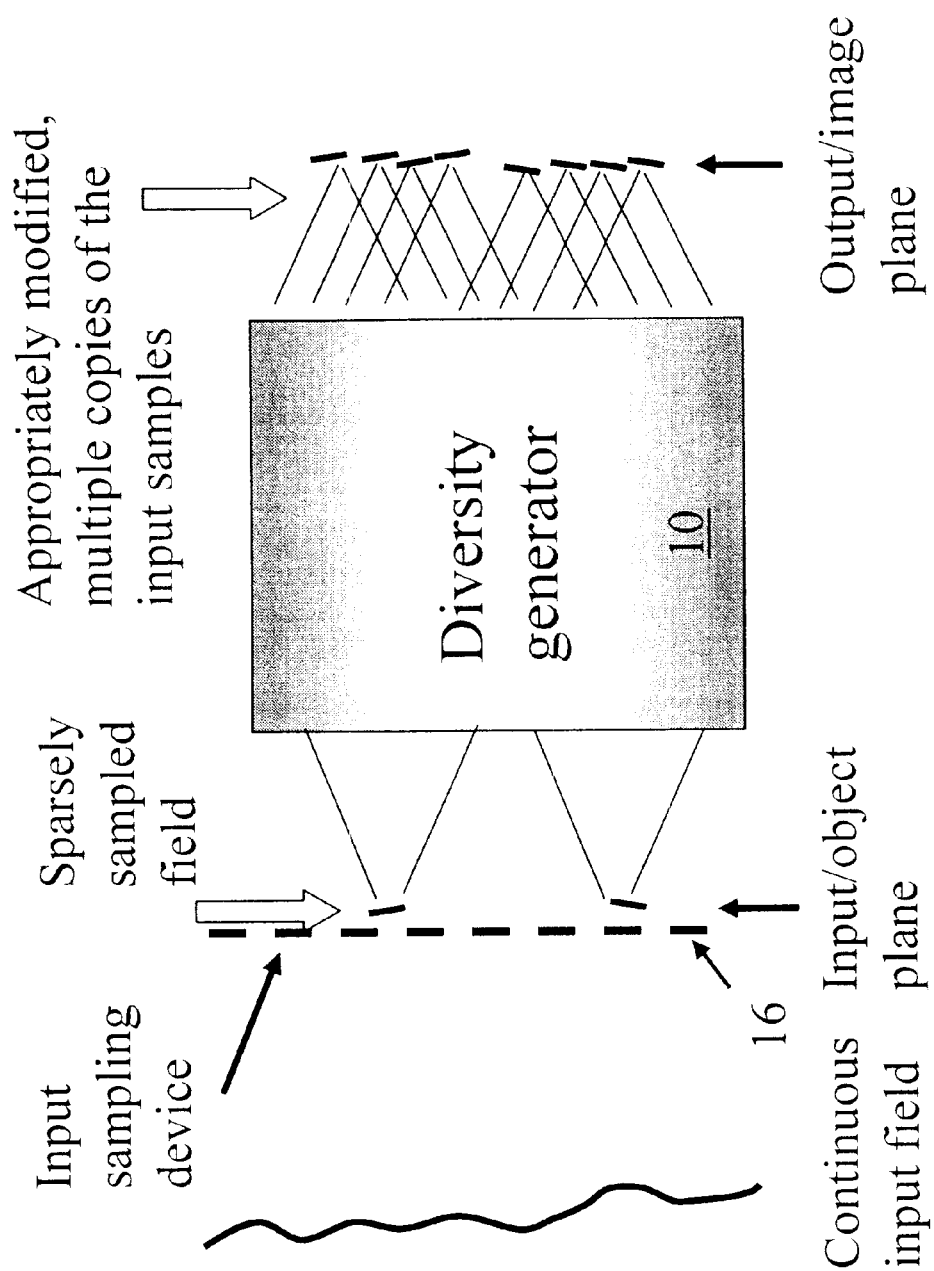
FIG. 1(b) illustrates a sampling diversity generator constructed in accordance with the invention.

A sampling device 16, as shown in FIG. 1*b*, permits use of the DG 10 to generate diversity information associated with a continuous field. The combination of sampling device 16 and DG 10 needs to be properly chosen so that the desired diversity information is obtained at the output of the DG 10. For example, the geometry of the sampling device needs to match the geometry of the characteristic pattern in the DG 10 for the purpose of generating the desired diversity information. The sampling device 16 sparsely samples a continuous input field and the diversity generator generates diversity information associated with the samples in a manner controlled by the application of the invention.

Figure 1C:
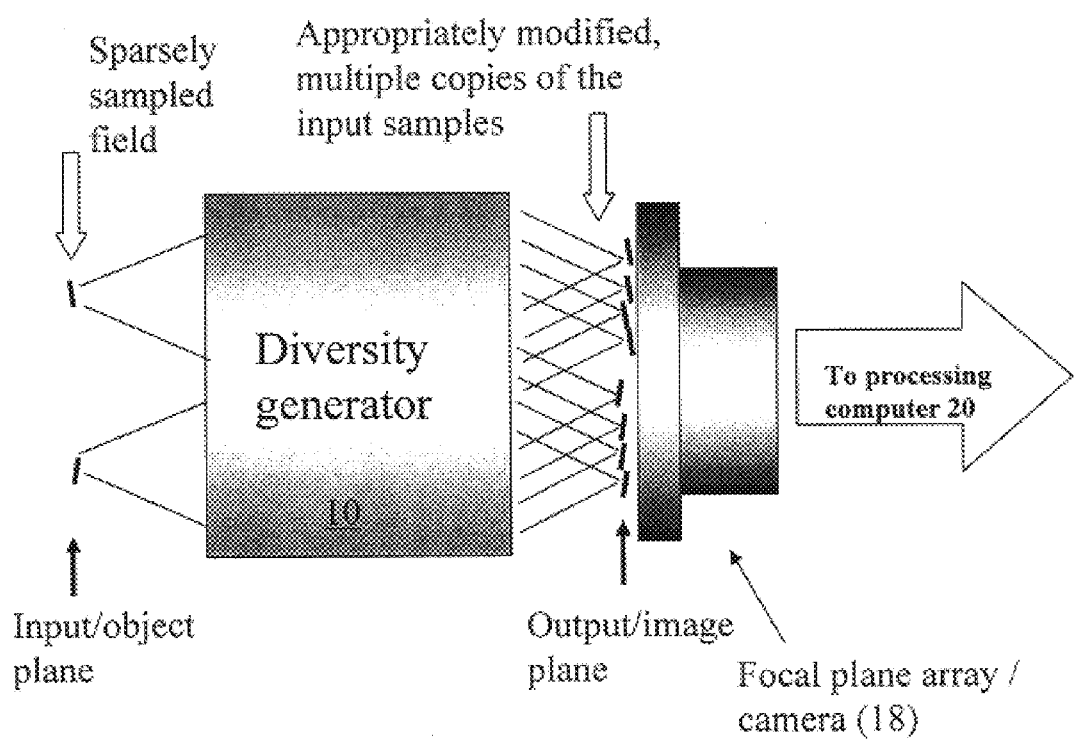
FIG. 1(c) illustrates a diversity field sensor constructed in accordance with the invention.

Referring now to FIG. 1(*c*), an appropriately designed photodetector array 18 and a signal/data processing unit 20 provide for a method of reconstructing the parameters in one or more sparsely sampled input fields by use of specific diversity information from the DG 10. The geometry of the array of photodetectors 18 is given by the geometry of the sampled field, the geometry of the characteristic pattern, and the desired diversity data. The processing unit 20 uses algorithms parameterized by the parameters of the characteristic pattern of the DG 10, the geometry of the sampled input field, and the choice of diversity data used to reconstruct the information in the input field.

In FIG. 1(*d*), parameters in one or more continuous input fields may be reconstructed by use of specific diversity information from the FIG. 1(*c*) device by using it with an appropriately designed sampling device 16. The sampling device sparsely samples the input field, which is then fed to the DG 10, sensed by the photodetector array 18 and analyzed by the computer 20. Algorithms, parameterized by the parameters of the characteristic pattern of the DG 10, the geometry of the sampling device, and the choice of diversity data are used to reconstruct the information in the input field.

Figure 2:
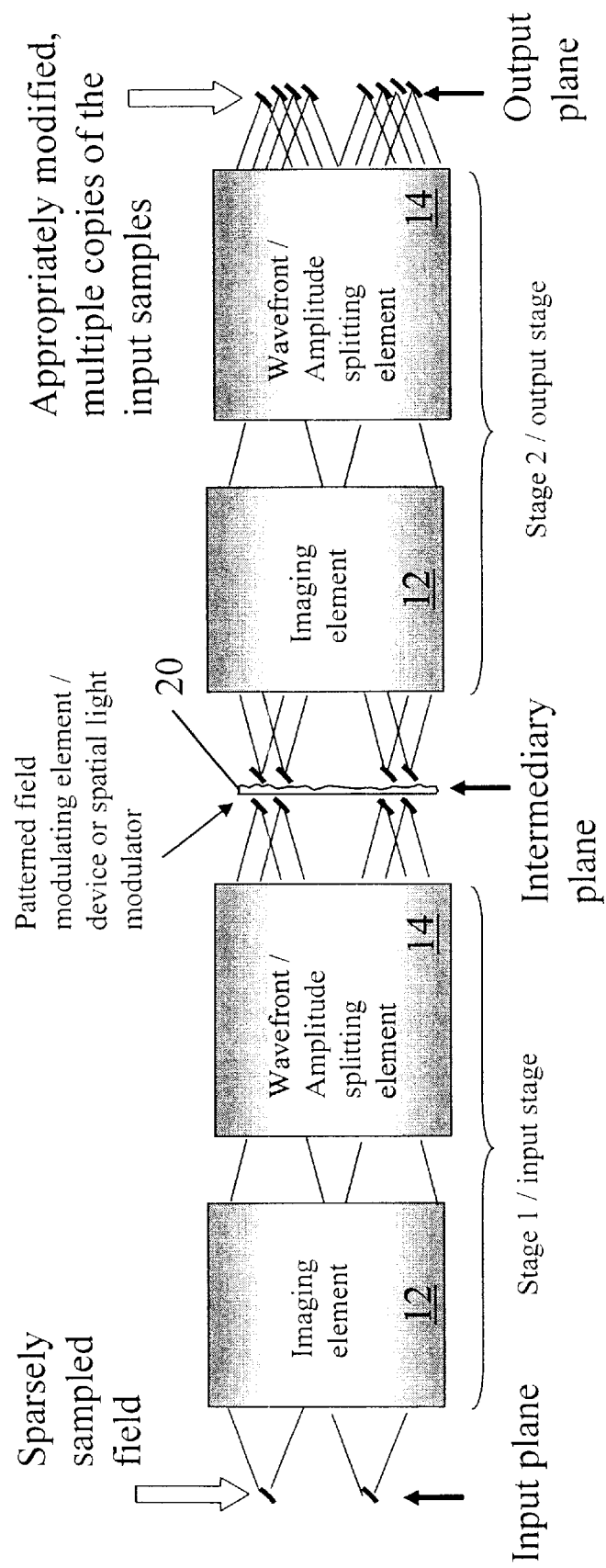
FIG. 2 illustrates a multiple stage diversity generator with a field modulating element constructed in accordance with the invention.

The DG 10 may also be implemented in multiple steps of imaging and splitting the optical field into copies with additional field-modulating elements (FME) 22 at the intermediary output/input planes, as shown in FIG. 2. An FME 22 is an optical device that can change the characteristics (phase, amplitude, polarization, wavelength) of the field incident on it in different ways for different regions in its aperture. A particular kind of FME, known as a spatial light modulator (SLM), modifies the amplitude and the phase of an optical field differently for different regions on its aperture (also known as pixels). The FME 22 is used to prepare the output field of one stage for the input into the next stage, thus giving more freedom in the generation of a specific characteristic pattern, which gives specific diversity information. Two or more stages can be used. The output intensity of the last stage, which is the output of the DG 10, constitutes diversity information.

EXAMPLE IMPLEMENTATIONS OF THE INVENTION

The arrangements of FIGS. 1(*a*)–1(*d*) will be useful in many devices, and may be implemented by different physical devices. Compact implementations of the arrangements of FIGS. 1(*a*)–1(*d*) may be realized by physically combining the logical functions of multiple elements into one physical element. For example, the functions of the imaging element and the wave-front/amplitude splitting element may be combined into one physical element by using diffractive lenses etched directly onto the surface of the wave-front/amplitude splitting element, which may be a plate of birefringent material. In the same way, the sampling element can also be added by placing a sampling mask on the opposite surface of the wave-front/amplitude splitting element.

Each of the functional elements of the FIGS. 1(*a*)–1(*d*) preferred embodiments can be physically implemented in different ways. Preferred example physical embodiments for the elements are now discussed.

The Sampling Device 16

The function of the sampling device 16 is to create a sparsely sampled optical field (or fields) from a continuous optical field (or fields). This function may be performed by a sampling mask 30 with an array of holes or a reconfigurable sampling element such as a spatial light modulator (SLM), as shown in FIG. 3(*a*). This can be a liquid crystal based SLM (such as that from Cambridge Research and Instrumentation, Inc.) or micro-electromechanical system (MEMS) of mirrors (such as the digital micromirror device or DMD from Texas Instruments). Another way to realize a sampling device is to use minifying optics, such as cascaded arrays of lenses 32, as shown in FIG. 3(*b*). The lenses in a last array 34 have a smaller aperture than the lenses in a first array 36 and have opaque/non-transmissive structures between them. Another possibility shown in FIG. 3(*c*) is to use arrays of lenses 38 which couple light into arrays of fibers 39 or wave-guiding structures. The fiber arrays 39 or waveguide structures are separated from each other to provide the empty regions in the sparsely sampled field.

The Diversity Generator 10

The diversity generator 10 generates modified copies of its sparsely sampled input field at each point in the input. If the DG 10 generates the diversity copies with the same characteristics for all the points in the input then it is called a shift invariant system in systems theory language. It is called a shift variant system if it generates the modified copies with different characteristics for different points in the input. The diversity information is generated along an essentially common optical path in the empty space between the image of the input samples at the output plane. This is in contrast to other systems, such as multi-path systems, which may have similar transfer functions but generate diversity information on essentially different optical paths.

Given the structure of the sparsley sampled input field and the desired diversity information, the diversity generator 10 is realized by an appropriate choice of imaging element 12 and WASE 14. Referring to Eqs. (1) and (2), the structure of the sparsely sampled input field and the desired diversity information give the structure of the characteristic pattern by specifying lateral displacement distances as well as the specific requirements on some or all the rest of the parameters, namely, the symbols $K_j$, $\alpha j$, and $P_j$, with $j \in \{j0, j1, j2, j3, j4\}$, which give the amplitude, the relative phase, and the polarization, respectively, of the different copies in the characteristic pattern. Therefore, each generated copy is placed at a certain coordinate in the output plane (thus the controlled geometry giving shear diversity), it has a certain relative phase with respect to a common reference (thus the controlled phase giving phase diversity), and it has a certain polarization (thus the controlled polarization giving polarization diversity). In addition, the wavelength dependence of the characteristic pattern provides for generation of wavelength diversity. The parameters and geometry of the characteristic pattern together with the properties and geometry of the input fields(s) give the type of diversity information generated by the DG 10.

The polarization vector is a Jones vector if the input optical field is completely polarized or a Stokes vector if the input optical field is partially polarized. The terms in the characteristic pattern in Eqs. (1) and (2) are grouped under different summation signs, according to the way they interfere/overlap given the geometry of the sampled input. The type of overlap and the properties of the input optical field(s) give the type of diversity information. Conversely, the type of overlap can be specified knowing the properties of the input optical field(s) and the desired type of diversity information. For example, if the input field consists of spatially coherent (with each other) samples of a monochromatic field and the shear and phase diversity information is required, then the characteristic pattern will consist only of terms under the first and second summation signs. The displacement vectors will be chosen such that copies coming from different samples will be interfered, along different shear directions. In addition, the phase shifts added by the characteristic pattern in the interference data will be different in order to satisfy the phase-shift diversity. The latter requirement gives specific relations to be satisfied by the phase constants, which are labeled with $\alpha j$, with $j \in \{j0, j1, j2, j3, j4\}$, in Eqs. (1) and (2). The choice of overlap manner and type of diversity data needed does not always completely specify the needed characteristic pattern. In other words, multiple characteristic patterns may be possible for the same application of the method.

Linear systems theory of optical systems shows that the impulse response function of a perfect imaging system is given by a delta function. In addition, one can use the birefringence effect as well as diffraction to split the wavefront or the amplitude of an optical field into multiple copies. Thus, the DG transfer function is realized by an imaging element 12 that images the sampling plane/space onto the output plane/space through a wave-front/amplitude splitting element 14. Therefore, the input is imaged into multiple modified copies at the output. Similar setups of imaging elements and wave-front/amplitude splitting devices have been used for generation of multiple images, or in array generators (AG) for optical interconnects or for color-camera blur filters, but not to produce. interferometric data. Even more control over the field characteristics in the different fan-out copies may be gained by using a set of cascaded pairs of imaging elements 12 and WASE 14, with patterned field modulating elements 20 at the intermediary input/output plane between them, as in FIG. 2. The patterned modulating element 20 is placed at the output of the first diversity generator and is patterned to modify the different copies in different ways such as blocking certain portions of the output of the DG or having different polarization selectivity or relative phase shifts. Additional waveplates, diffractive elements, polarization elements, and spectral filters may be included in certain implementations of the diversity fan-out device.

The Imaging Element 12

Figure 4B:
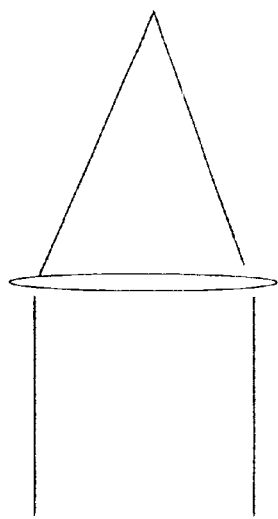
FIGS. 4(a)–4(c) illustrates implementations of imaging elements usable in a diversity generator of the invention.
Figure 4A:
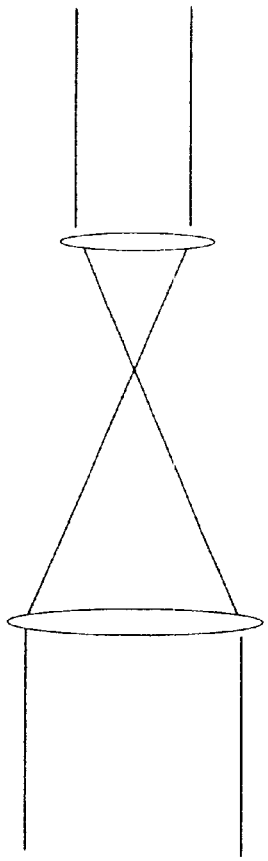
Figure 4C:

FIGS. 4(a) and 4(b) respectively show that the imaging element 12 can be implemented as an afocal 40 or a finite focal 42 length optical imaging system. The finite focal length system 42 images the input field with an additional quadratic phase distribution whereas the afocal system 40 is able to preserve the phase information in the input field. The imaging element 12 may be implemented using refractive, reflective, or diffractive elements (such as diffractive optical elements, e.g. Fresnel lenses, or volume holograms). In addition, the imaging element 12 may also be implemented as an array of imaging elements 44 that separately image different regions of the sampled field, as shown in FIG. 4(c). This provides for additional freedom in implementing the diversity generation function, which may have different characteristics for all or part of the sampled field (the DG with shift-variant characteristic pattern).

The WASE 14

The imaging element 12 provides for the characteristic function in the form of a $\delta(x,y)$ function, while the WASE 14 splits the image at the output of the imaging elements into multiple, appropriately modified copies, as is shown by Eqs. (1) and (2). The WASE 14 is designed to appropriately split the optical field incident on it into multiple appropriately modified copies in order to obtain the desired characteristic pattern. The WASE 14 can be implemented using birefringent plates and/or diffractive optical elements.

Birefringent WASE

Figure 5A:
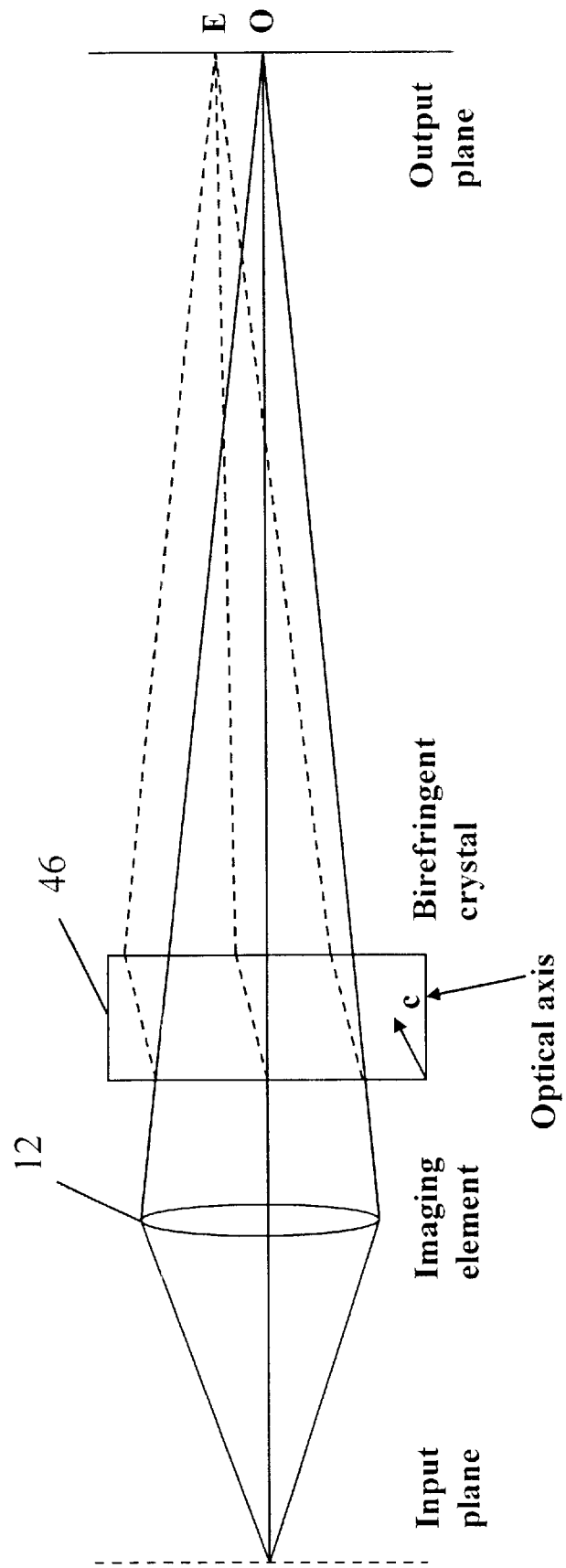
FIG. 5(a) illustrates a preferred birefringent plate fan out device usable in a diversity generator of the invention.
Figure 5B:
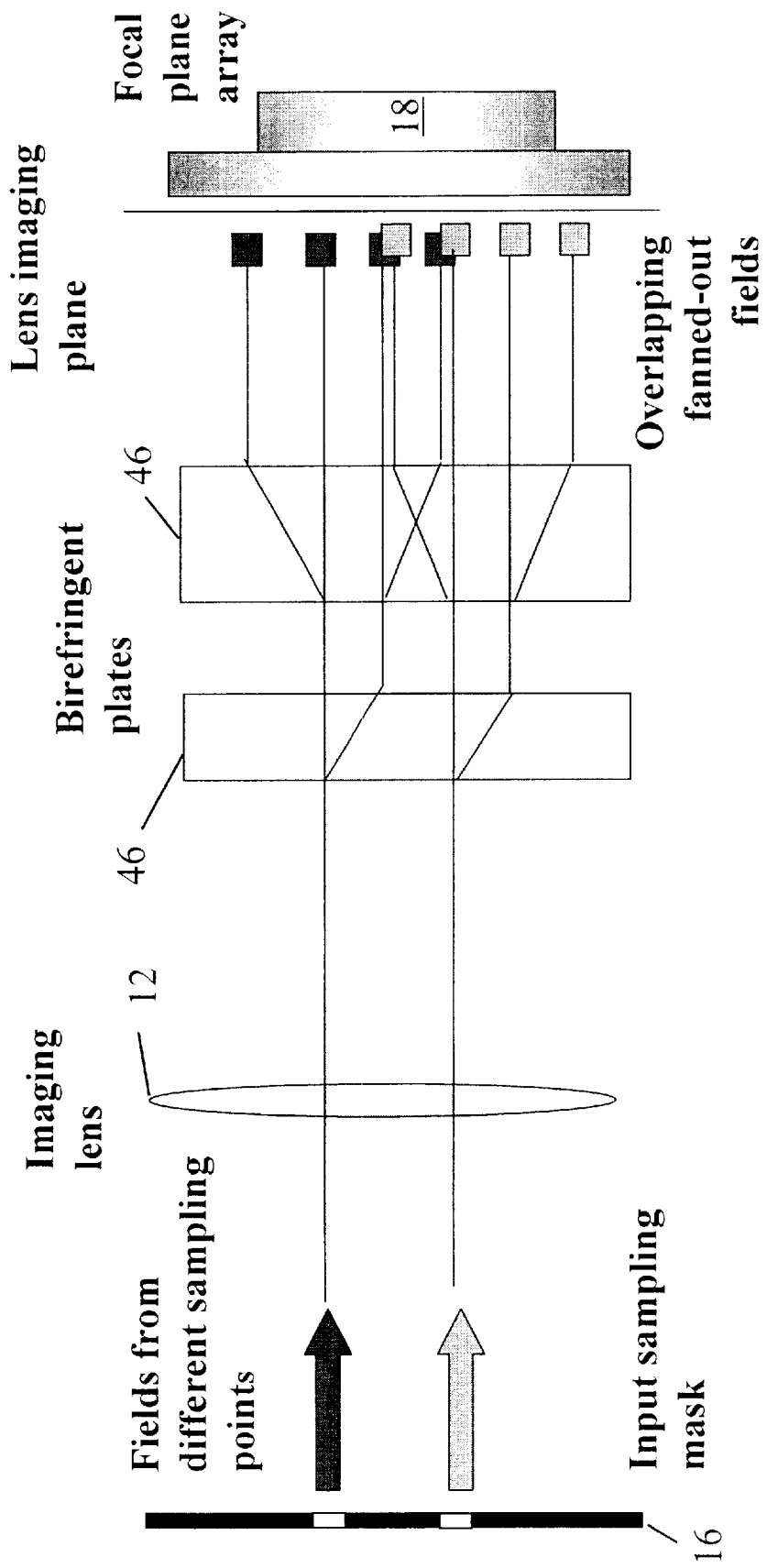
FIG. 5(b) illustrates a preferred fan out device that generates multiple overlapping copies of different samples in the input using multiple birefringent plates.

One implementation of the wave-front/amplitude splitting element uses a set of birefringent plates 46, as in FIGS. 5(a) and 5(b). Each plate 46 can split the input field into two laterally shifted copies with amplitudes given by the polarization of the input. More copies can be created by using more birefringent plates as in FIG. 5(b). The optical field in the different output copies "sees" different material characteristics, such as different index of refraction, depending on its polarization and the orientation of the optical axis, ĉ, of the birefringent crystal 46. This produces the different phase shifts and/or polarizations at the output of the diversity generator 10. Thus, birefringent plates 46 can be used to generate the appropriately modified copies in the characteristic pattern. In FIGS. 5(a), the copy with the field having ordinary polarization is labeled "O" and that with the field having extraordinary polarization is labeled "E". The design of the birefringent elements 46 is given by the properties of the desired characteristic pattern (type and number of overlapping copies, shearing distances, and polarization).

Consider the generation of two copies one with no shear and one with a lateral shear of $r_0$ and relative phase shift $\Delta\Phi$, as in FIG. 5(a). If a uniaxial material is used, the thickness of the birefringent plate giving a lateral shear $r_0$ to a normally incident optical field is $$d = |\vec{r}_0| \cdot \frac{2(n_o^4 + (n_e^4 - n_o^4)\cos^2(\beta))^{1/2}}{(n_e^2 - n_o^2)\sin(2\beta)} \quad (3)$$

where β is the angle between the direction of the optical axis of the crystal and the normal to the face of the crystal, which is also the direction of propagation of the field incident on the crystal. The constants $n_e$ and $n_o$ are the extraordinary and the ordinary, respectively, refractive indices of the uniaxial crystal. The crystal is oriented to obtain the desired shear direction. The direction of polarization of the optical field before entering the birefringent plate 46 gives the amount of relative power in the two components. This can be controlled by controlling the direction of polarization using waveplates or polarization rotators.

The phase difference ΔΦ between the two copies depends on the thickness of the birefringent plate, the angle of the optical axis with respect to the face of the plate, and the tilt angle of the plate with respect to the direction of propagation of the input optical field. The phase difference is given by:

$$\Delta\Phi = \frac{2\pi}{\lambda} \cdot d \cdot \left( n_o - \left[ \frac{\sin^2(\beta)}{n_e^2} + \frac{\cos^2(\beta)}{n_o^2} \right]^{-1/2} \right) - \quad (4)$$

$$k_0 dA \sin(\alpha) + k_0 d \left( k_0 C - \frac{1}{2\sqrt{\varepsilon_o}} \right) \sin^2(\alpha)$$

where λ is the wavelength of the optical field incident on the crystal, α is the tilt angle, which is the angle between the normal to the face of the plate and the direction of propagation, $k_0 = 2\pi/\lambda$, and A and C are given:

$$A = \frac{1}{2}\sin(2\delta)\left( \frac{1}{n_e^2} - \frac{1}{n_o^2} \right)\left[ \frac{\sin^2(\beta)}{n_e^2} + \frac{\cos^2(\beta)}{n_o^2} \right]^{-1} \quad (5)$$

$$C = \frac{\lambda}{4\pi n_e^2 n_o^2}\left[ \frac{\sin^2(\beta)}{n_e^2} + \frac{\cos^2(\beta)}{n_o^2} \right]^{-3/2}$$

Thus, the phase difference ΔΦ can be obtained either by choosing the right crystal thickness or by tilting the crystal or by a combination of selected thickness and tilt.

A Fourier optics calculation of propagation through a uniaxial crystal shows that the two copies that form the image of the input to field through the imaging element 12 and the birefringent plate 46 making the DG 10 have images in different planes. This is due to the difference between the ordinary and the extraordinary refractive index. Using a material with large birefringence will make one of the two copies out of focus while the other will be in focus. It is advantageous to the present method to have both copies in focus at the same time in order to implement the characteristic function of the DG 10. Therefore, it is advantageous to the current method to use a low birefringence material, such as quartz, in implementing the WASE 14.

Multiple birefringent plates 46 can be used to further split the optical field and create multiple copies at the output of the DG, as in FIG. 5(b). The phase difference between these copies can be found by following the propagation of their fields through the sequence of plates.

Figure 6:
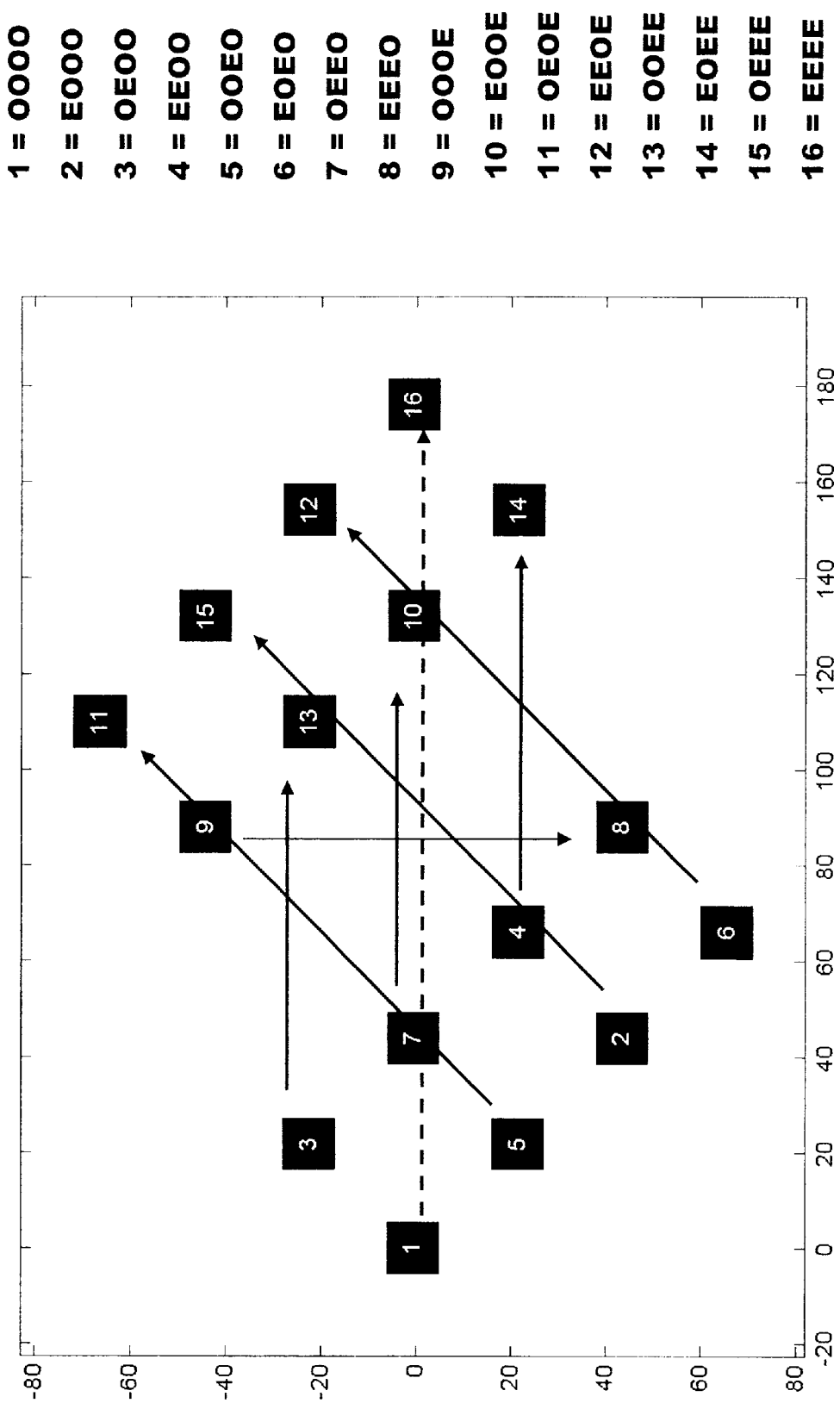
FIG. 6 illustrates a labeled output of a 4-plate birefringent wave-front/amplitude splitting element, which has phase diversity and shearing diversity when adjacent patterns are spaced 88 $\mu$m on a regular Cartesian grid. The interfering copies are outlined by the arrows.

FIG. 6 shows a pattern generated using four birefringent plates and three wave plates as the WASE 14 (arranged birefringent plate/wave plate, etc.). The legend indicates the optical path of the optical field that is focused by the imaging element at each labeled point. For example, the optical field that is focused at point labeled as "1" in the figure propagates as an ordinary wave through all the birefringent plates. Thus, the field is labeled as "oooo" in the legend. Similarly the field that is focused at the point labeled as "13" in the figure propagates as an ordinary wave in the first two plates and as an extraordinary wave in the last two, thus the label "ooee" in the legend. Equation (4) may be used to compute the amount of phase delay between the "oooo" copy and the other copies. For example, considering the phase angle of field labeled as "1" as a zero reference, the phase angle of the field labeled as "8", for example, can be computed based on its associated sequence, which is "eeeo". The phase angles $\alpha_i$, i=1, 16, are given by:

$\alpha_1 = 0+0+0+0$ $\alpha_2 = \Delta\Phi_1 + 0 + 0 + 0$ $\alpha_3 = 0 + \Delta\Phi_2 + 0 + 0$ $\alpha_4 = \Delta\Phi_1 + \Delta\Phi_2 + 0 + 0$ $\alpha_5 = 0 + 0 + \Delta\Phi_3 + 0$ $\alpha_6 = \Delta\Phi_1 + 0 + \Delta\Phi_3 + 0$ $\alpha_7 = 0 + \Delta\Phi_2 + \Delta\Phi_3 + 0$ $\alpha_8 = \Delta\Phi_1 + \Delta\Phi_2 + \Delta\Phi_3 + 0$ $\alpha_9 = 0 + 0 + 0 + \Delta\Phi_4$ $\alpha_{10} = \Delta\Phi_1 + 0 + 0 + \Delta\Phi_4$ $\alpha_{11} = 0 + \Delta\Phi_2 + 0 + \Delta\Phi_4$ $\alpha_{12} = \Delta\Phi_1 + \Delta\Phi_2 + 0 + \Delta\Phi_4$ $\alpha_{13} = 0 + 0 + \Delta\Phi_3 + \Delta\Phi_4$ $\alpha_{14} = \Delta\Phi_1 + 0 + \Delta\Phi_3 + \Delta\Phi_4$ $\alpha_{15} = 0 + \Delta\Phi_2 + \Delta\Phi_3 + \Delta\Phi_4$ $\alpha_{16} = \Delta\Phi_1 + \Delta\Phi_2 + \Delta\Phi_3 + \Delta\Phi_4 \quad (6)$ where $\Delta\Phi_i$ is the phase difference between the ordinary and the extraordinary waves in plate "i". The phase difference for each birefringent plate can be computed using Eq. (4). It can be adjusted by either changing the incidence angle of the optical field onto the birefringent plate or choosing a plate with different thickness.

Diffractive WASE

Figures 7A, 7B:
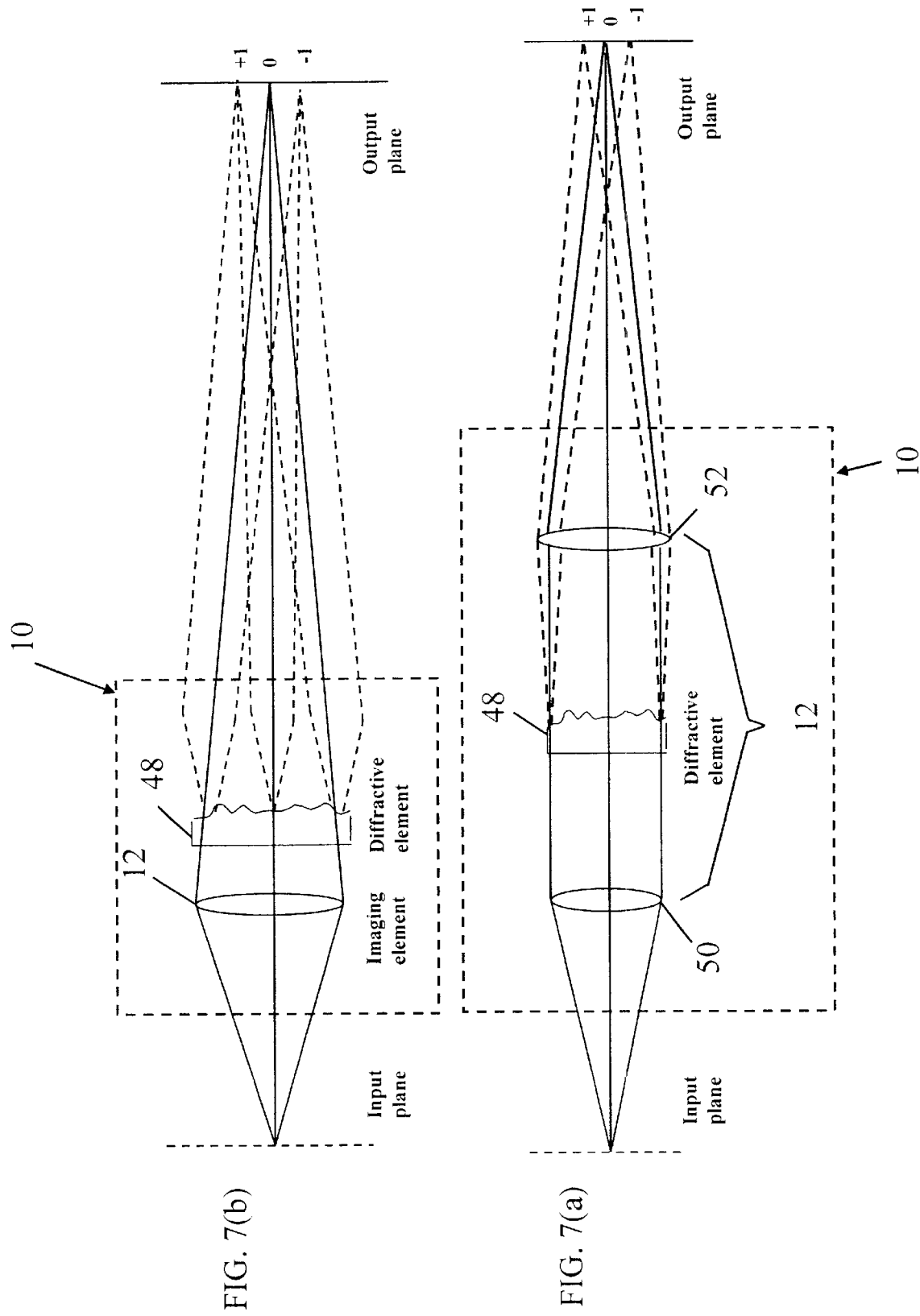
FIGS. 7(a) and 7(b) illustrate a diffractive implementation of a wave-front/amplitude splitting device. The diffractive element may be inside the imaging element, such as in the Fourier plane of a 4-f system in FIG. 7(a), or next to the imaging element as in FIG. 7(b)

Another type of wave-front/amplitude splitting device which may be used is a diffractive optical element 48. Two implementations are shown in FIGS. 7(a) and 7(b). In FIG. 7(a), the diffractive element 48 with the imaging element/system is placed in the Fourier plane of a 4-f imaging system like the FIG. 4(a) system. In FIG. 7(b), the diffractive element 48 is placed next to the imaging element 12. This technique is known as frequency plane filtering. Fourier optics theory can be used to design such a filter. Different setups used for array generation or spot array generation are possible. This includes the placement of the diffractive element differently with respect to the imaging element 12. To control the polarization in the fan-out patterns of diffractive optical elements (DOEs), the elements need to be in a vector diffraction regime rather than a scalar one. An example category is diffractive elements having sub-wavelength features. Sub-wavelength diffractive structures show different properties for different directions of polarizations of the input field. This effect is usually referred to as form birefringence because it is the structure of the diffractive element that gives its birefringent properties and not its refractive index (although they are somewhat connected to each other). Such elements can be used to generate polarization dependent characteristic patterns or impulse response functions.

The design of the diffractive element is based on Fourier optics. Consider that the input can be represented as a scalar field. Consider a diffractive element/field modulating element having an amplitude and phase given by $A(x,y)e^{i\Phi(x,y)}$ and placed in the Fourier plane of the imaging element 12 of the diversity generator 10, as in FIG. 7(a). According to Fourier optics, the image of the input plane in the output plane of the diversity generator 10 is the convolution between the sampled field and the Fourier transform of $A(x,y)e^{i\Phi(x,y)}$, which is the modulating function of the diffractive device 48. Note that arbitrary characteristic patterns can be implemented in this way, this method of diversity generation being less restrictive than the birefringent method. For a characteristic pattern of the diversity generator given by:

$$c(x,y)=\delta(x,y) \cdot K_0+$$
$$+\delta(x-\Delta_1,y) \cdot K_1 \cdot e^{i\alpha1} + \delta(x+\Delta_1-h,y) \cdot K_2+$$
$$+\delta(x,y-\Delta_1) \cdot K_3 \cdot e^{i\alpha1} + \delta(x,y+\Delta_1-h) \cdot K_4+$$
$$+\delta(x-\Delta_2,y) \cdot K_5 \cdot e^{i\alpha2} + \delta(x+\Delta_2-h,y) \cdot K_6+$$
$$+\delta(x,y-\Delta_2) \cdot K_7 \cdot e^{i\alpha2} + \delta(x,y+\Delta_2-h) \cdot K_8 \quad (7)$$

the modulation function of the diffractive element is the inverse Fourier transform of this pattern:

$$A(X,Y)e^{i\phi(X,Y)}=C(X,Y)=K_0+$$
$$+K_1 \cdot e^{i2\pi X\Delta_1} \cdot e^{i\alpha1} + K_2 \cdot e^{i2\pi X(h-\Delta_1)}+$$
$$+K_3 \cdot e^{i2\pi Y\Delta_1} \cdot e^{i\alpha1} + K_4 \cdot e^{i2\pi Y(h-\Delta_1)}+$$
$$+K_5 \cdot e^{i2\pi X\Delta_2} \cdot e^{i\alpha2} + K_6 \cdot e^{i2\pi X(h-\Delta_2)}+$$
$$+K_7 \cdot e^{i2\pi Y\Delta_2} \cdot e^{i\alpha2} + K_8 \cdot e^{i2\pi Y(h-\Delta_2)}+ \quad (8)$$

where (X,Y) are the spatial coordinates in the plane of the diffractive structure. This element is placed in the Fourier plane of the imaging element of the diversity generator. For example if the imaging element is a 4-f system as in FIG. 7(a), then its Fourier plane is the back focal plane of a first lens 50, which is also the front focal plane of a second lens 52. The actual physical dimension of h, $\Delta_1$, and $\Delta_2$ depend on the focal lengths of the two lenses. When the diffractive splitting element is placed at a different plane (see FIG. 7(b)), the characteristic pattern will still be its Fourier transform. However, it will have a different scaling factor and an additional quadratic phase curvature depending on the focal lengths of the lenses used in the 4-f system. The same is true if a finite focal length imaging element is used instead of the 4-f system, which is afocal.

Note that the resulting complex transmittance of the diffractive WASE involves a continuous phase and amplitude distribution. Additional use of patterned FME 20 in a cascaded DG (FIG. 2) may offer additional degrees of freedom in certain physical implementations.

The Patterned Field-modulating Element (FME) 20

The patterned field modulating element 20 shown in FIG. 2 is used to change the parameters of an optical field in a different manner for different regions on its aperture. These different regions are often called pixels. The FME 20 can change any one or more of the amplitude, phase, and the polarization of the optical field incident on it on a pixel by pixel basis. For this purpose one can use patterned phase and/or amplitude masks having different phase retardations and/or transmissivity at different pixels, spatial light modulators such as that from Cambridge Research Instrumentation, Inc., and patterned polarization modulators. The FME 20 might also implement a wavelength selection function which may be different for different regions/pixels on its aperture. If such an FME is used, characteristic patterns having wavelength diversity will be generated.

Implementation of Cascaded DG's

Figure 8:
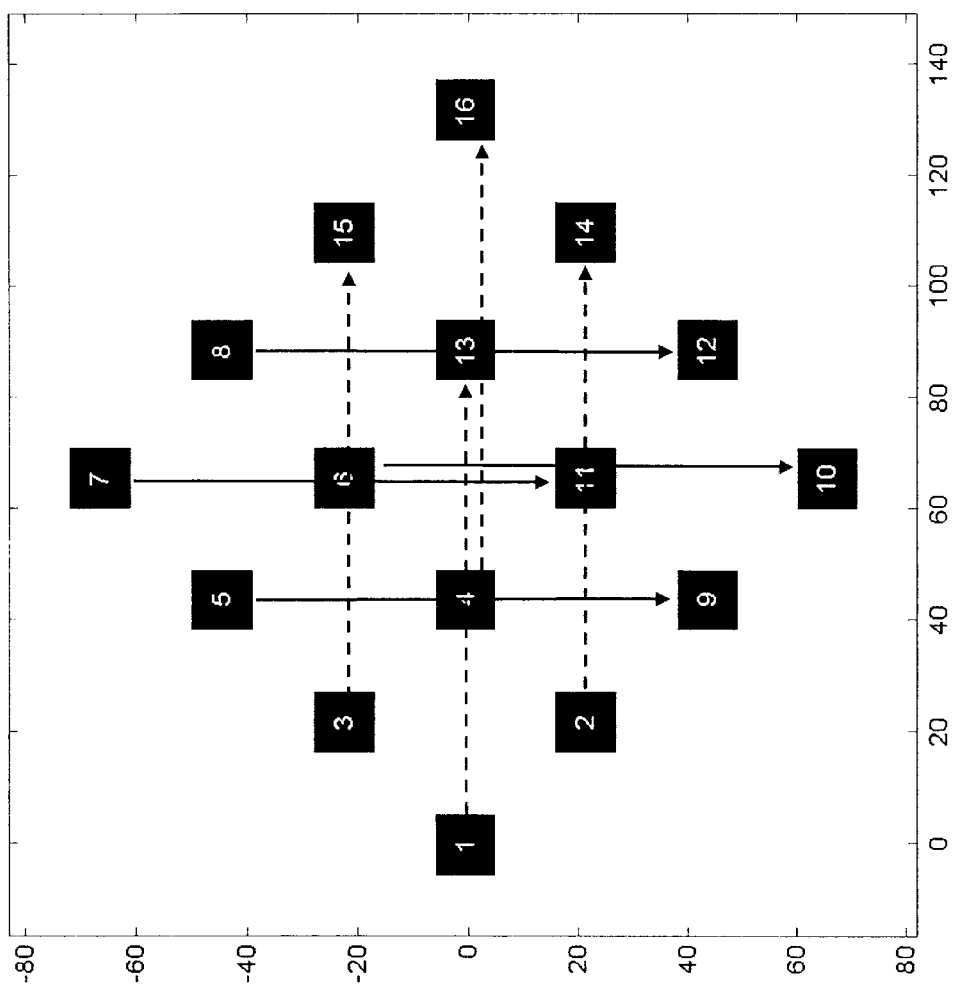
FIG. 8 illustrates a fan out pattern which does not have phase diversity but has shearing diversity when adjacent patterns are spaced 88 $\mu$m on a regular Cartesian grid. The interfering copies are outlined by the arrows.
Figure 9:
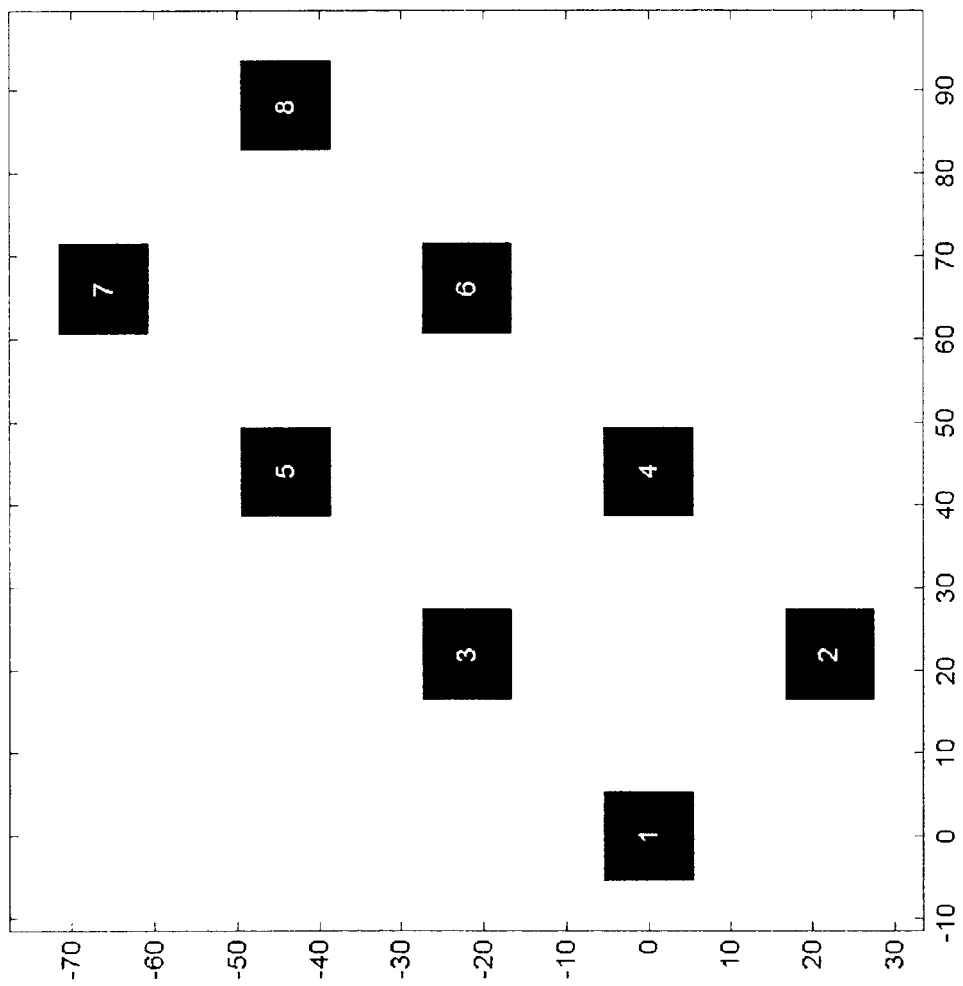
FIG. 9 illustrates an output pattern of an exemplary first stage of a cascaded DG of the invention.
Figure 10:
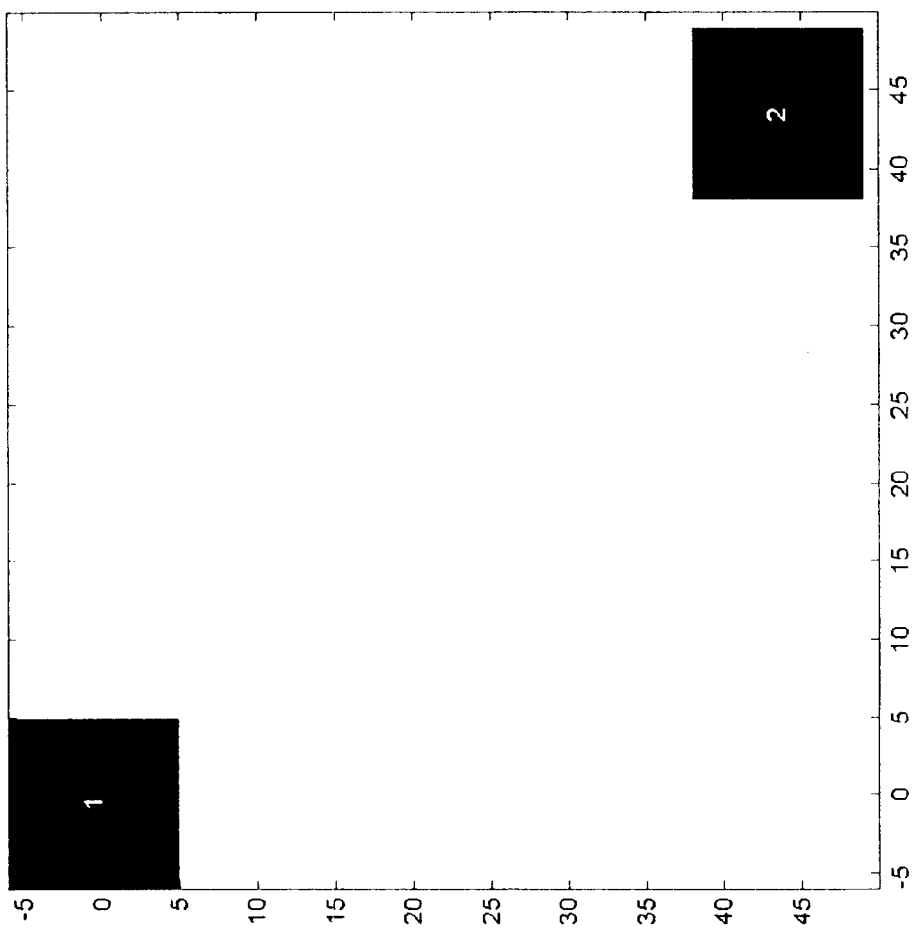
FIG. 10 illustrates an output pattern of an exemplary second stage of cascaded DG of the invention.
Figure 11:
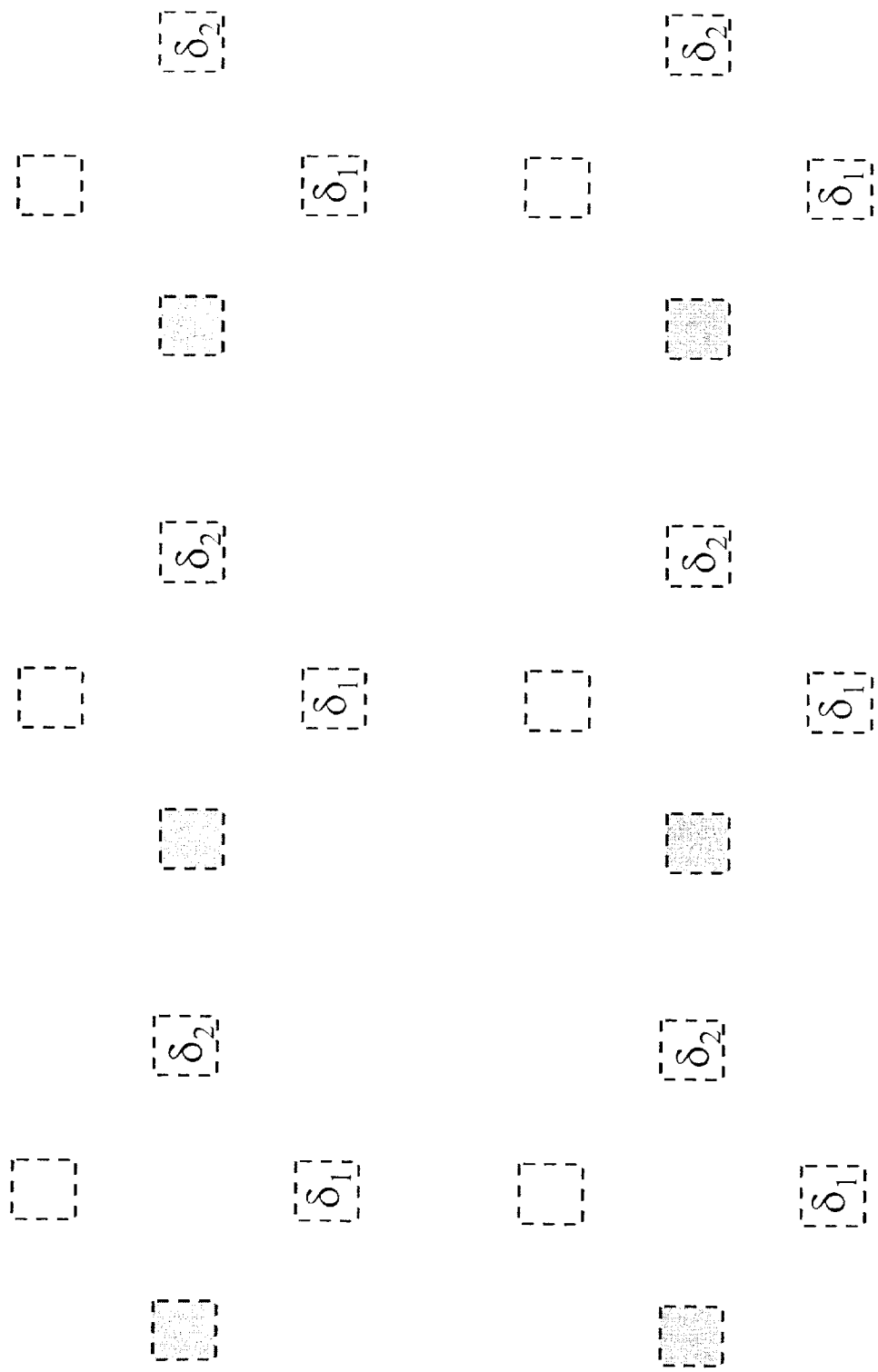
FIG. 11 illustrates an exemplary periodic FME (shift invariant DG), with 3×2 periods shown.
Figure 12:
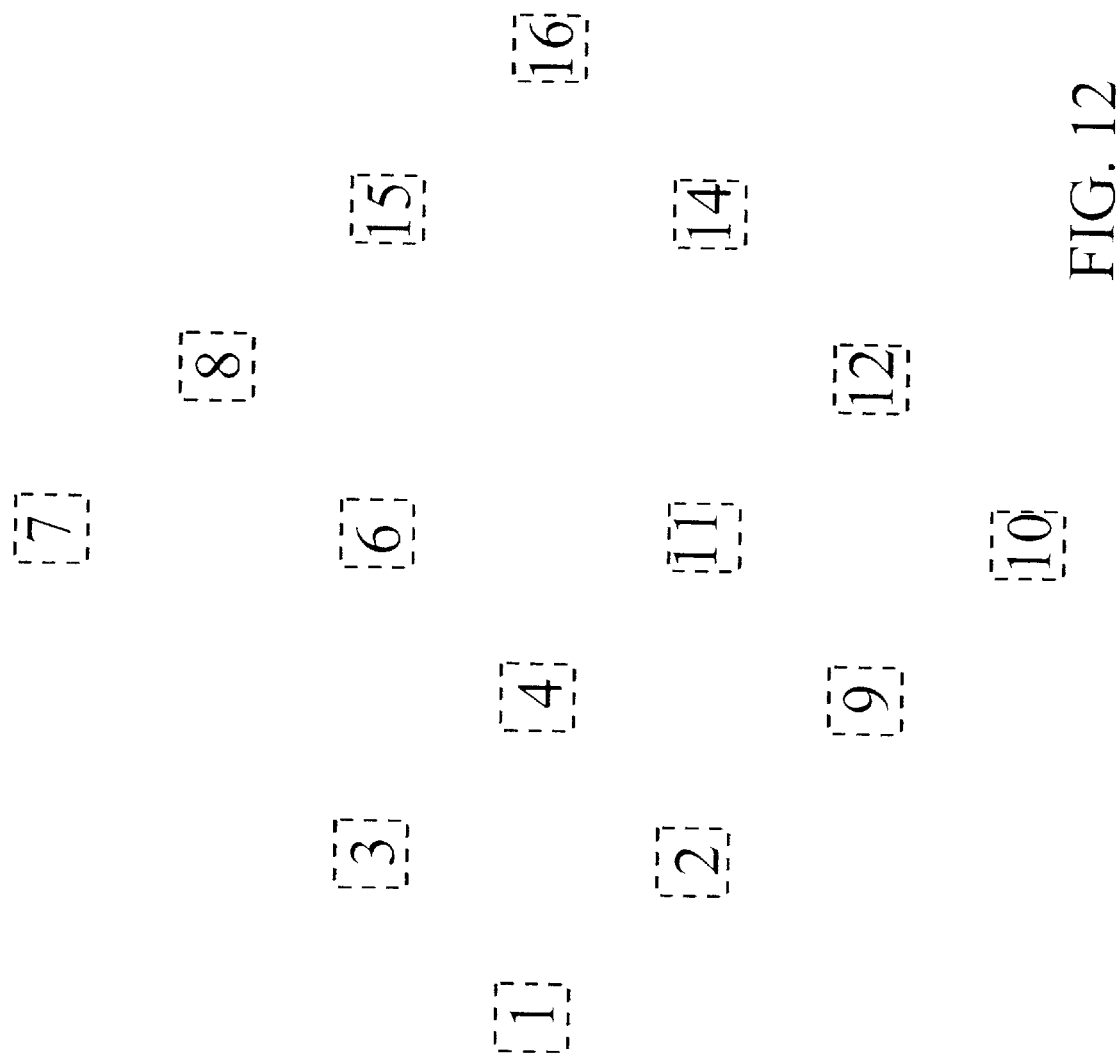
FIG. 12 illustrates an exemplary characteristic pattern of the cascaded DG.
Figure 13:
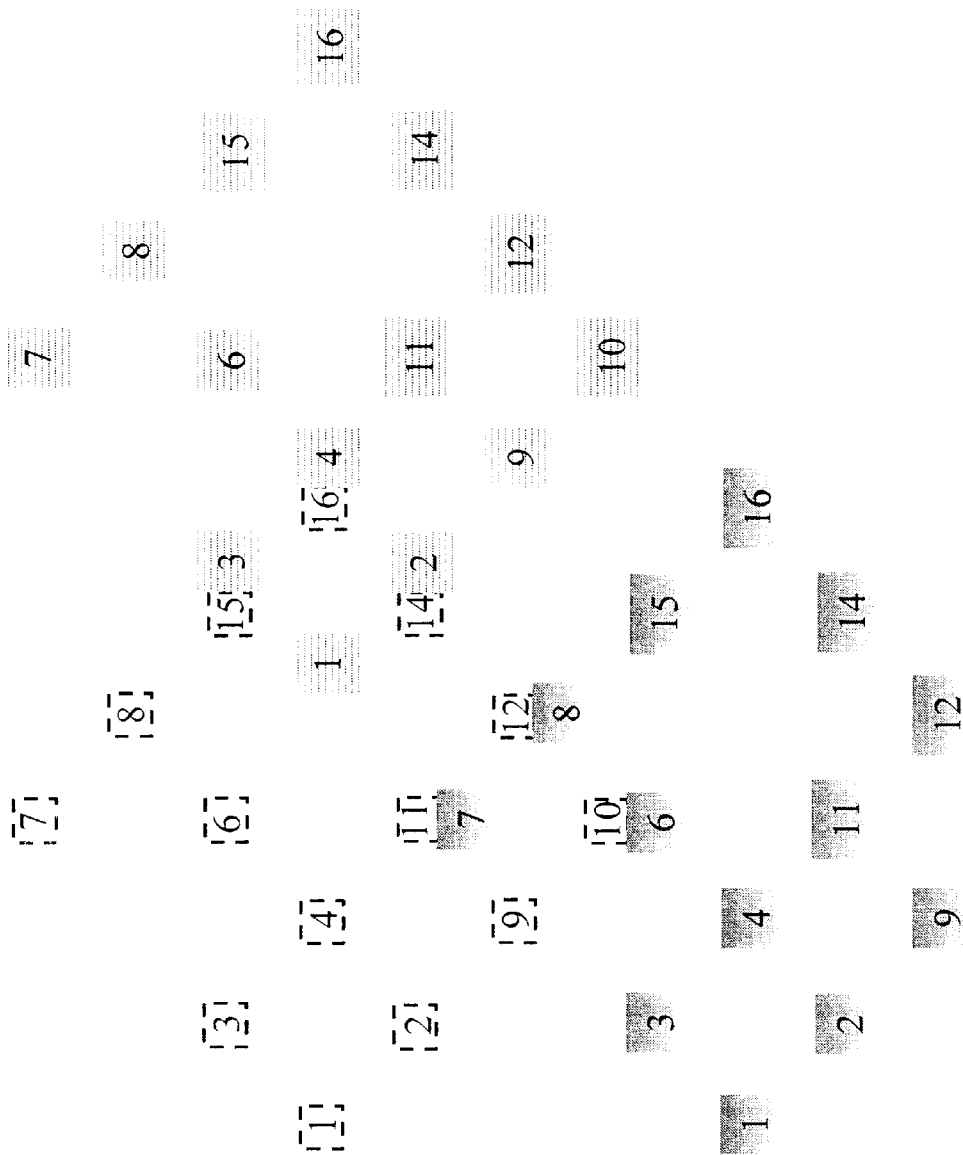
FIG. 13 illustrates an exemplary output of the cascaded DG for three input points.

Cascased diversity generators can be implemented as suggested in FIG. 2. The purpose is to add more degrees of freedom in generating the desired characteristic pattern. For example, consider the pattern of FIG. 8 with the input being a set of samples from a spatially and temporally coherent wave. If the samples are spaced 88 $\mu$m apart on a regular Cartesian grid one can use Equations 4 and 5 to find that this pattern does not have phase diversity, although it has shear diversity, i.e., $\alpha 13-\alpha 1=\alpha 15-\alpha 3=\alpha 14-\alpha 2=\alpha 16-\alpha 4$ and $\alpha 9-\alpha 5=\alpha 11-\alpha 7=\alpha 10-\alpha 6=\alpha 12-\alpha 8$. Also it does not provide non-overlapping copies. Now, consider a cascaded DG such as that in FIG. 2. Consider the first stage to implement the characteristic pattern in FIG. 9 while the second implements the characteristic pattern in FIG. 10. The characteristic pattern of the cascaded DG implemented using the two stages will be that in FIG. 8. Now consider adding a patterned FME in the intermediary plane. The patterned FME is made such that to block the field labeled "5" and to change the phase shift of the field labeled "6" by an amount $\delta_1$ and the field labeled "8" by an amount $\delta_2$. The phase shifts $\delta_1$ and $\delta_2$ are different. The FME can be made by a etching a glass plate with two etch levels and depositing reflective/opaque patches at the blocking pixels. For a shift invariant DG, such as that described here, the pattern on the FEM will be a periodic structure such as that shown in FIG. 11 (3×2 periods shown). Other techniques may be used such as using liquid crystal spatial light modulators that change both the amplitude and the phase of an incident field. The characteristic pattern of the cascaded DG containing the patterned FME is shown in FIG. 12. The overlap for three adjacent sampling points is shown in FIG. 13. Some fields are displaced in order to show overlap. As it can be seen from FIG. 13, the use of the patterned field-modulating element achieves two goals. Referring to FIG. 13, first is to create non-overlap copies labeled "1" and "9" and second is to create phase diversity in both the set of overlapping copies along horizontal adjacency as well as along vertical adjacency. The phase differences in the two sets of overlapping fields come either purely from birefringent propagation or from both birefringent propagation and local field modulation (phase shift) given by the field modulating element. The thicknesses of the birefringent plates give the purely birefringent phase shifts. As a result, the phase shifts of the fields in the characteristic pattern are given by Eq. (6) with the following changes:

COPY 5 is blocked as indicated by shaded element in FIG. 11

$$\alpha_6=\Delta\Phi_1+0+\Delta\Phi_3+0+\delta_1$$
$$\alpha_8=\Delta\Phi_1+\Delta\Phi_2+\Delta\Phi_3+0+\delta_2$$

COPY 15 is absent $$\alpha_{14}=\Delta\Phi_1+0+\Delta\Phi_{3+\Delta\Phi4}+\delta_1$$
$$\alpha_{16}=\Delta\Phi_1+\Delta\Phi_2+\Delta\Phi_3+\Delta\Phi_4+\delta_2 \quad (9)$$

Therefore the set of horizontal phase differences is given by $$\alpha_3-\alpha_{15}=(0+\Delta\Phi_2+0+0)-(0+\Delta\Phi_2+\Delta\Phi_3+\Delta\Phi_4)=$$

$$=-\Delta\Phi_3-\Delta\Phi_4$$

$$\alpha_4-\alpha_{16}=(\Delta\Phi_1+\Delta\Phi_2+0+0)-(\Delta\Phi_1+\Delta\Phi_2+\Delta\Phi_3+\Delta\Phi_4+\delta_2)=$$

$$=-\Delta\Phi_3-\Delta\Phi_4+\delta_2$$

$$\alpha_2-\alpha_{14}=(\Delta\Phi_1+0+0+0)-(\Delta\Phi_1+0+\Delta\Phi_3+\Delta\Phi_4+\delta_1)=$$

$$=-\Delta\Phi_3-\Delta\Phi_4+\delta_1$$

while the set of vertical phase differences is given by $$\alpha_7-\alpha_{11}=(0+\Delta\Phi_2+\Delta\Phi_3+0)-(0+\Delta\Phi_2+0+\Delta\Phi_4)=$$

$$=\Delta\Phi_3-\Delta\Phi_4$$

$$\alpha_6-\alpha_{10}=(\Delta\Phi_1+0+\Delta\Phi_3+0+\delta_1)-(\Delta\Phi_1+0+0+\Delta\Phi_4)=$$

$$=\Delta\Phi_3-\Delta\Phi_4+\delta_1$$

$$\alpha_8-\alpha_{12}=(\Delta\Phi_1+\Delta\Phi_2+\Delta\Phi_3+0+\delta_2)-(\Delta\Phi_1+\Delta\Phi_2+0+\Delta\Phi_4)=$$

$$=\Delta\Phi_3-\Delta\Phi_4+\delta_2$$

It is obvious from Eqs. (10) and (11) that the phase delays $\delta_1$ and $\delta_2$ and the plate thicknesses and/or tilt angles can be so chosen such that the phase differences $(\alpha_2-\alpha_{14})$, $(\alpha_3-\alpha_{15})$, and $(\alpha_4-\alpha_{16})$ are all different from each other. The same is true for the other set of phase differences, $(\alpha_7-\alpha_{11})$, $(\alpha_6-\alpha_{10})$, and $(\alpha_8-\alpha_{12})$. The additional phase diversity can be used to increase the accuracy of the estimated phase difference between the adjacent samples of the input field, by techniques known in the art as phase-shift algorithms.

The Sensor Array 18

The photodetector array 18 is a plurality of photodetectors placed to detect the intensity in overlapping or non-overlapping copies of the input samples, thus sensing the diversity information at the output of the DG 10. Therefore, the geometry of the array of sensors needs to match the geometry of the characteristic pattern. Image intensifiers/attenuators may be added before the array of photodetectors to increase the dynamic range of the photodetectors.

Method to Match a WASE to a Sampling Device and/or Detector Array

The individual photodetector elements in the detector array 18 have to be positioned to sense the intensities in the different imaged copies. Thus their positions in the output plane have to match the geometry of the array of samples and the geometry of the characteristic pattern. It is relatively easy to change the sampling geometry by using a configurable sampling device such as an ON/OFF spatial light modulator. It is more difficult to change the geometry of the detector array. The present method allows for an easy change of the characteristic pattern to match the sampling with the detector array. It is based on the scaling of the dimensions of the characteristic pattern independently from the scaling of the sampling and/or the detector array geometry. This allows for using multiple sampling and/or detector geometries with one WASE. The idea is to use a two step imaging system. The two magnification factors $M_1$ and $M_2$ can then be chosen to modify the dimensions of the characteristic pattern independently from the dimensions of the sampling grid and/or the detector array.

Birefringent WASE

Figure 14A:
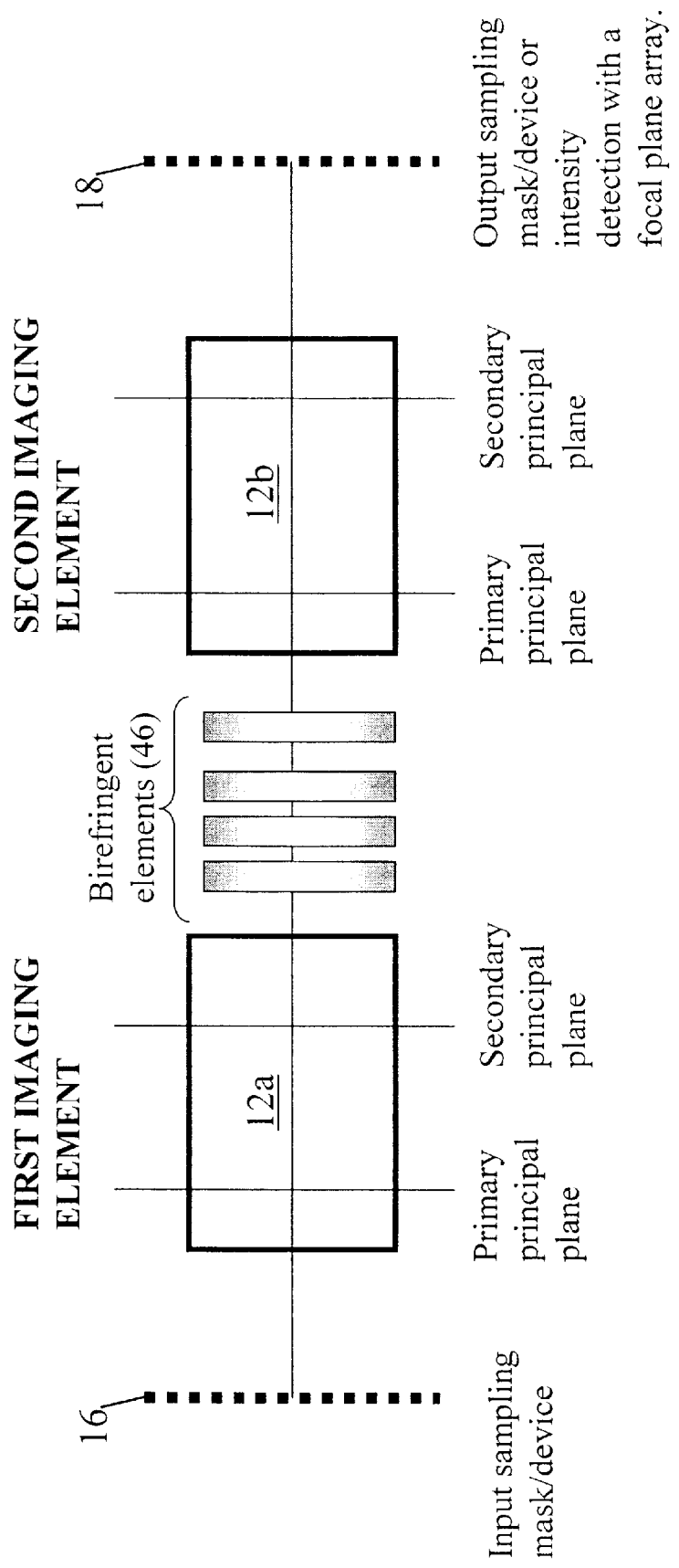
FIGS. 14(a) and 14(b) illustrates preferred two-step imaging systems of the invention respectively used to match the input sampling period to the characteristic pattern produced by: (a) a birefringent WASE; (b) a diffractive WASE.

FIG. 14(a) illustrates a DG 10 made of two imaging elements 12a, 12b and one set of birefringent elements 46 making the WASE. As mentioned before, the WASE may contain other elements such as waveplates, polarizers, filters to control the optical field.

The first imaging element 12a will magnify, by factor $M_2$, the dimensions in the input plane of the sampling geometry. It will have no effect on the characteristic pattern generated by the WASE. The second imaging element 12b will magnify, by factor $M_2$, the already magnified sampling geometry and the characteristic pattern of the WASE. Therefore, the overall magnification of the sampling geometry will be $M_1 \times M_2$, while that of the characteristic pattern will be $M_2$. This allows for independent magnification of the WASE and the sampling geometry, and matching of the input sampling period to the characteristic pattern produced by the birefringent WASE.

Diffractive WASE

Figure 14B:
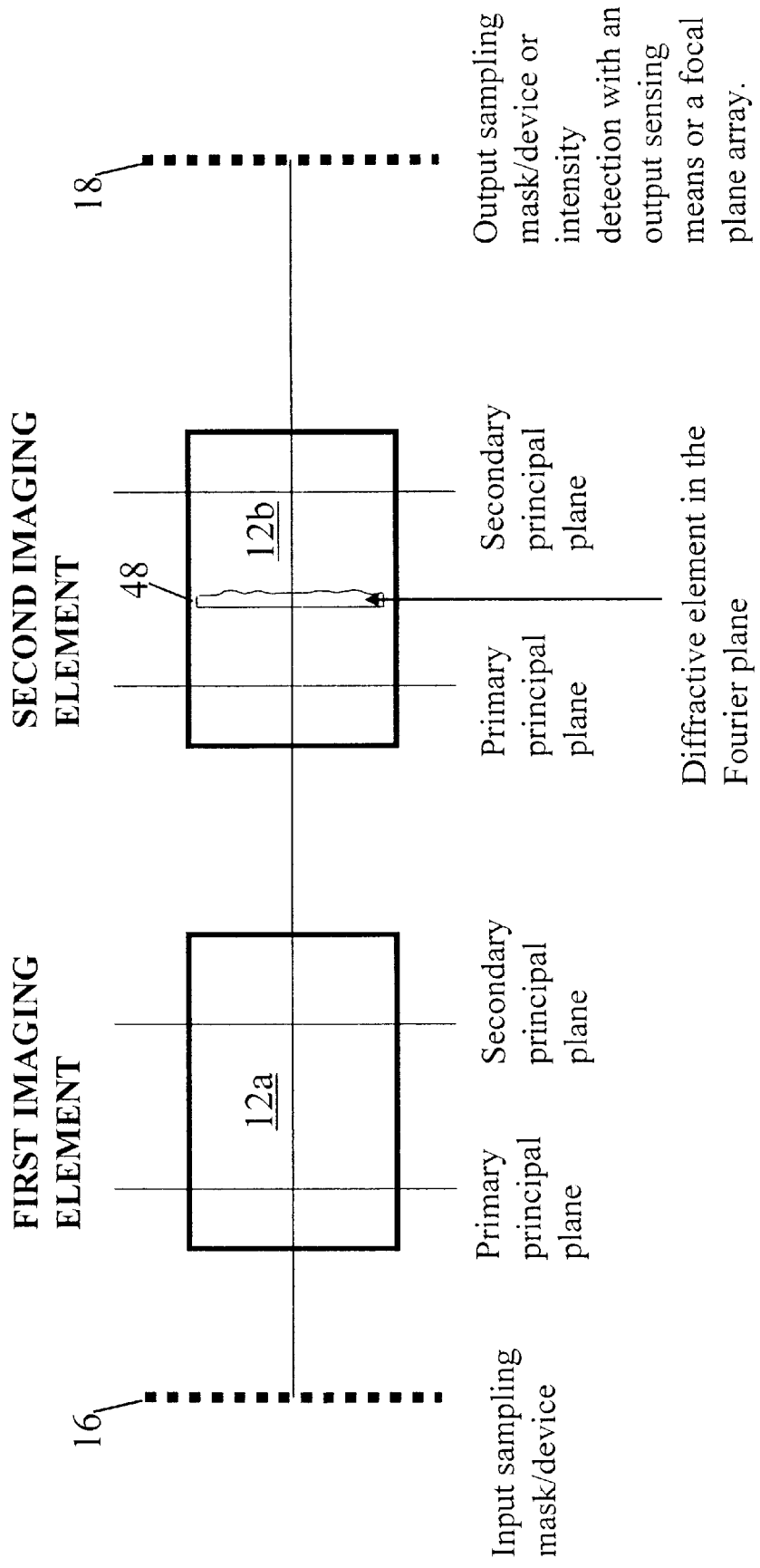

FIG. 14(b) illustrates a DG made of two cascaded imaging elements 12a, 12b and one diffractive WASE 48. The diffractive element is placed to generate a certain characteristic pattern with the second imaging element 12b as suggested by FIG. 7(a) and 7(b). For example, it can be placed in the Fourier plane of the second imaging element 12b. Then the magnification of the characteristic pattern of the second element 12b is independent of the magnification of the first imaging element 12a. If the magnification of the first imaging element is $M_1$ and that of the second is $M_2$ then the characteristic pattern of the diffractive WASE has magnification $M_2$ (compared to the case when the second imaging element is doing 1×1 imaging) and the magnification of the sampling geometry is $M_1 \times M_2$. This allows for independent magnification of the WASE and the sampling geometry.

The Processing Unit 20 and Algorithms

In a sensor of the invention, such as a diversity field sensor and/or a sampling field sensor, the information read by the focal plane array is sent to an analog or digital processing unit, which may be a dedicated processor or a multipurpose computer. Part or all the processing functions can be integrated in the detector array such as it is currently done in CMOS sensors. These are photodiode arrays made using a CMOS process with additional signal processing and addressing circuitry.

The signal-processing unit performs algorithms on the data obtained by the focal plane sensor or array of photodetectors. The algorithms are specific to each application of the present method. For example, different algorithms are used for wave-front sensing than for polarization sensing. However, the algorithms may be similar to the ones used in the corresponding multi-shot method the current method is applied to. That is because the method is used to generate measurements that are similar to those obtained with the multi-shot methods to which it is applied. Additional parameters are included depending on the construction of the sensor, especially the characteristics of the diversity generator such as the parameters labeled by K, $\alpha$, and P. The details are specific to each implementation. This concept is detailed below for a set of preferred applications from which other implementations will be apparent to those skilled in the art.

The details of applying the current method depend on the particular application chosen. We give the general steps to be followed leaving only a few elements of the physical implementation to be customized for each particular application. The common steps are:

1. Identify the multi-shot method to which the current method is applied to and the type of measurement diversity needed.
2. Identify the properties of the characteristic pattern based on the needed measurement diversity. This includes the number and characteristics of the non-overlapping copies, the type, the number, and the characteristics of the overlapping copies.

3. Generate characteristic pattern with minimum specification. The remaining specifications will be given by its specific physical implementation. For example, if three phase-shifted and overlapping copies need to be generated by the DG but the shear can take different values, do not specify the shear at this point. Different physical implementations will specify it differently.
4. Give the measurements at the output of the DG based on the specified characteristic pattern to obtain similar information to the multi-shot method that the current method is applied to. These measurements are common to different characteristic patterns that share the common specification up to this point.
5. Give the algorithm to invert the measurements based on the measurements and the specified properties of the characteristic patterns. Specify additional properties of the characteristic pattern as required by the inversion algorithm.
6. Specify the remaining properties of the characteristic pattern and its physical implementation by using a birefringent and/or a diffractive WASE.
7. Design the WASE to implement the specified pattern.

Further aspects of the invention will be understood through reference to particular applications of the invention to decode optical field information. These applications include wave front sensing, point phase-delay estimation between multiple wave-fronts/optical fields such as that done in common-path or two-beam interferometers, estimation of the Stokes/Jones vectors, and estimation of the spectral content of an optical field using Fourier transform spectroscopy (FTS). The current method can also be applied in other cases where multiple amplitude, phase, shear, and polarization diversity output frames are required. It can be used to reduce the number of required frames by generating similar diversity information through creating multiple appropriately modified copies of an output field. In addition, multiple sensor functions may be integrated into the same sensor device by implementing multiple functional elements into one physical device or by designing using one functional element such that it can serve multiple requirements for diversity generation.

The following examples illustrate the application of the method in two main situations:
- generation of diversity for one input field, such as in shearing interferometric wave-front sensors, or in polarization sensors
- generation of diversity for multiple input beams/fields such as in two-beam or common-path interferometers (e.g. Michelson/Twyman-Green, Fizeau and other). It can be done separately or simultaneously for each beam/field.

Diversity Generation for a Single Input Field

In this case the input consists of a single input field. This includes but it is not limited to wave front sensing using shearing interferometers, polarization sensing/ellipsometry, spatial and/or temporal coherence measurements. The basic diversity generation techniques described above are applicable to these particular applications.

Wave-front Sensing With Phase-shift Shearing Interferometers

Figure 15:
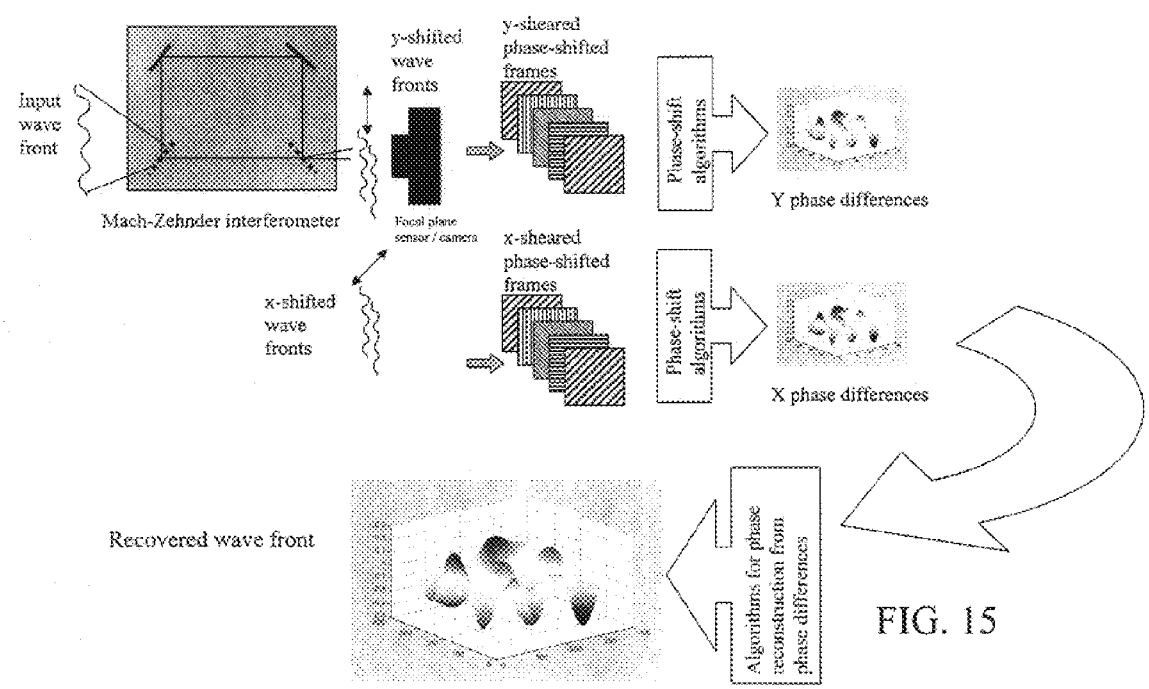
FIG. 15 illustrates wave front sensing with a phase-shift shearing interferometer which would benefit from application of the present invention.

Conventional wave-front sensors measure the amplitude and the phase distribution of a monochromatic spatially coherent input field. Interferometric shearing wave-front sensors use different methods to create two laterally shifted or sheared copies of the input, which they interfere at the output plane. In addition, the relative phase/optical path delay of one of the copies with respect to the other is changed and multiple phase-shifted frames/shots of the output are recorded. The information is used to estimate the input field information. Usually this is done for each lateral shear direction separately. FIG. 15 illustrates this technique. The wave-front map is reconstructed from measurements of the phase differences between adjacent points in the input aperture separated by the shearing distance in the direction of the shear. The present invention can be used to generate the required phase shift and shear diversity information in fewer frames than usually necessary, even in a single frame. In addition, the shear and phase-shift diversity information is generated along an essentially common optical path. Thus, the present method eliminates the disadvantages related to multi-path methods, which are the current solution to turning multi-shot systems into single-shot ones. These disadvantages include increased sensitivity to vibrations, increased complexity and size of the system, and poorer reliability (due to increased complexity).

We consider the application of the invention to sensing a continuous input. The diversity measurements include a direct measurement of the intensity of input wave-front to get its amplitude distribution and an interferometric measurement of the phase difference between laterally shifted (sheared) copies of the input on two shear directions, usually the Cartesian directions (STEP 1). Thus, the diversity data contains measurements of non-overlapping/non-interfering copies of the input, x-sheared overlapping copies, and y-sheared overlapping copies. In addition, the set of interferometric measurements of the sheared inputs along each shear direction contains multiple phase shifts as is done in phase shift shearing interferometers (STEP 2). A minimum of two different phase shifts is necessary in order to estimate the phase difference between the interfered samples. More than two different phase differences can be used to increase the accuracy of the estimate. We will consider the shear directions to be along $\Delta \vec{x}$ and $\Delta \vec{y}$ directions, which are two non-collinear directions. Thus, the characteristic pattern should contain one non-overlapping copy and two overlapping copies (at least) from adjacent samples of the same wave front for each of $\Delta \vec{x}$ and $\Delta \vec{y}$ adjacency directions, for each sample in the input. Thus, a general specification of the characteristic pattern (STEP 3) is given by:

$$c(\vec{r}) = \delta(\vec{r} - \vec{r}_0) \cdot K_0 \cdot e^{i\alpha 0+}$$
$$+ \delta(\vec{r} - \vec{r}_1{}^x) \cdot K_{11}{}^x \cdot e^{i\alpha 11x} + \delta(\vec{r} + \Delta \vec{x} - \vec{r}_1{}^x) \cdot K_{21}{}^x \cdot e^{i\alpha 21x}$$
$$+ \delta(\vec{r} - \vec{r}_2{}^x) \cdot K_{12}{}^x \cdot e^{i\alpha 12x} + \delta(\vec{r} + \Delta \vec{x} - \vec{r}_2{}^x) \cdot K_{22}{}^x \cdot e^{i\alpha 22x}$$
$$+ \delta(\vec{r} - \vec{r}_1{}^y) \cdot K_{11}{}^y \cdot e^{i\alpha 11y} + \delta(\vec{r} + \Delta \vec{x} - \vec{r}_1{}^y) \cdot K_{21}{}^y \cdot e^{i\alpha 21y}$$
$$+ \delta(\vec{r} - \vec{r}_2{}^y) \cdot K_{12}{}^y \cdot e^{i\alpha 12y} + \delta(\vec{r} + \Delta \vec{x} - \vec{r}_2{}^y) \cdot K_{22}{}^y \cdot e^{i\alpha 22y} \quad (12)$$

Referring to Eq. (12), the parameters labeled with K are real and positive numbers, while the parameters labeled with $\alpha$ are real numbers in the $(-\pi, \pi)$ interval. The exponents of the K-parameters are just labels and have no mathematical meaning. The same applies to the exponents of the $\vec{r}$ vectors. All the vectors have real components. The second and third terms are such that they interfere when coming from characteristic patterns adjacent along $\Delta \vec{x}$ shearing direction. The fourth and fifth terms interfere in a similar way but the phase difference $\alpha 12x - \alpha 22x$ is different from the phase difference $\alpha 11x - \alpha 21x$ to provide for phase-shift diversity similar to that in phase-shift interferometric wave-front sensors. The rest of the terms provide for similar phase diversity but with shear along the $\Delta \vec{y}$ shearing direction.

There are many possible characteristic patterns satisfying the above requirements. For example, the position vectors $\vec{r}_1^x, \vec{r}_2^x, \vec{r}_1^y, \vec{r}_2^y$ are not explicitly given but they are required to be such that the second and third terms interfere when coming from characteristic patterns adjacent along $\Delta \vec{x}$ shearing direction and similarly for the fourth and fifth terms. A similar requirement applies to the last two pairs in Eq. (12). There are many possible characteristic patterns that satisfy these requirements. Also, only the minimum number of non-overlapping as well as overlapping copies is given in the characteristic pattern in Eq. (12) (minimum specification). Increasing the number of copies provides redundant information, which can be used to increase the accuracy of the phase and amplitude estimates in the presence of measurement noise, as it is known to the skilled in the art. Following STEP 4 in the general application of the method, the measurements at the output of the DG are specified based on the specifications of the characteristic pattern up to this point. The photodetectors in the focal plane array or output sensing plane are placed such that (or the geometry of the array is such that) to measure the interference of the different overlapping copies, as well as the intensity in the non-overlapping copy. Obviously, if the characteristic pattern has more copies they can be detected in a similar way. Therefore, there will be three types of photodetectors, according to the signal they detect.

Figure 16:
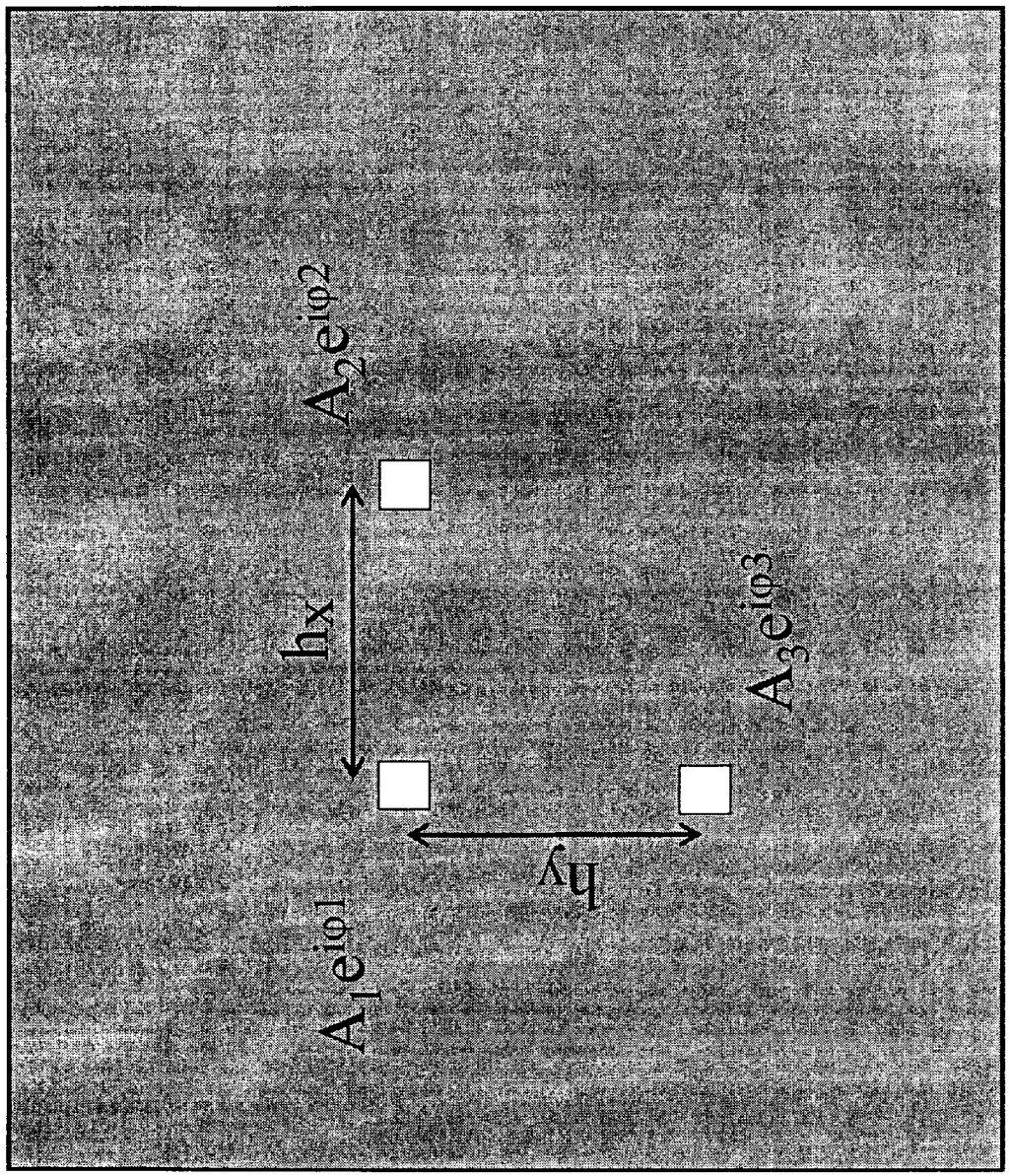
FIG. 16 illustrates three samples of a sparsely sampled input optical field.

The three type of signals/photodetectors are labeled: I(A), for photodetectors sensing the intensity in non-overlapping copies; $I(P_i^{\Delta \vec{x}})$, with i=1,N (the number of phase shifts per shear direction) for photodetectors sensing overlapping copies along the shear direction labeled with $\Delta \vec{x}$; $I(P_i^{\Delta \vec{y}})$, with i=1,N (the number of phase shifts per shear direction) for photodetectors sensing overlapping copies along the shear direction labeled with $\Delta \vec{y}$. In order to give the measurements (STEP 4) as well as the inversion algorithm that estimates the amplitudes and the phase differences from the measurements (STEP 5), consider a set of three adjacent samples at the input of the DG as shown in FIG. 16. Therefore the sampling geometry is a regular Cartesian grid with sampling distance $h_x$ on the x-axis and $h_y$ on the y-axis. In the simplest case, when the DG is shift-invariant, its output will consist of a set of three characteristic patterns following the adjacency of the samples at the input. In the shift-variant case the characteristic pattern may be different for different samples in the input as suggested by Eq. (1). The generalization to the shift-variant case will be obvious to those skilled in the art based on the specifications of the characteristic pattern and the sampling geometry. It is not considered here. The shear directions $\Delta \vec{x}$ and $\Delta \vec{y}$ do not have to be along the x and y axes, respectively. A choice was made in order to illustrate the argument. The set of diversity measurements for the pair of samples with horizontal adjacency is given by (STEP 4):

$$I(A_1) = |A_1 \cdot e^{i\phi_1} \cdot K_0 \cdot e^{i\alpha 0}|^2 = A_1^2 \cdot K_0^2$$

$$I(A_2) = |A_2 \cdot e^{i\phi_2} \cdot K_0 \cdot e^{i\alpha 0}|^2 = A_2^2 \cdot K_0^2$$

$$I(P_1^{\Delta \vec{x}}) = |A_1 \cdot e^{i\phi_1} \cdot K_{11}^x \cdot e^{i\alpha 11x} + A_2 \cdot e^{i\phi_2} \cdot K_{21}^x \cdot e^{i\alpha 21x}|^2 =$$
$$= A_1^2 \cdot (K_{11}^x)^2 30 A_2^2 \cdot (K_{21}^x)^2 + 2 \cdot K_{11}^x \cdot K_{21}^x \cdot A_1 \cdot A_2 \cdot \cos(\phi_1 - \phi_2 + \alpha 11x - \alpha 21x)$$

$$I(P_2^{\Delta \vec{x}}) = |A_1 \cdot e^{i\phi_1} \cdot K_{12}^x \cdot e^{i\alpha 12x} + A_2 \cdot e^{i\phi_2} \cdot K_{22}^x \cdot e^{i\alpha 22x}|^2 =$$
$$= A_1^2 \cdot (K_{12}^x)^2 + A_2^2 \cdot (K_{22}^x)^2 + 2 \cdot K_{12}^x \cdot K_{22}^x \cdot A_1 \cdot A_2 \cdot \cos(\phi_1 - \phi_2 + \alpha 12x - \alpha 22x)$$

A similar set of measurements is obtained for the pair of samples adjacent on the vertical direction, and is given by:

$$I(A_1) = |A_1 \cdot e^{i\phi_1} \cdot K_0 \cdot e^{i\alpha 0}|^2 = A_1^2 \cdot K_0^2$$

$$I(A_3) = |A_3 \cdot e^{i\phi_3} \cdot K_0 \cdot e^{i\alpha 0}|^2 = A_3^2 \cdot K_0^2$$

$$I(P_1^{\Delta \vec{y}}) = |A_1 \cdot e^{i\phi_1} \cdot K_{11}^y \cdot e^{i\alpha 11y} + A_3 \cdot e^{i\phi_3} \cdot K_{21}^y \cdot e^{i\alpha 21y}|^2 =$$
$$= A_1^2 \cdot (K_{11}^y)^2 + A_3^2 \cdot (K_{21}^y)^2 + 2 \cdot K_{11}^y \cdot K_{21}^y \cdot A_1 \cdot A_3 \cdot \cos(\phi_1 - \phi_3 + \alpha 11y - \alpha 21y)$$

$$I(P_2^{\Delta \vec{y}}) = |A_1 \cdot e^{i\phi_1} \cdot K_{12}^y \cdot e^{i\alpha 12y} + A_3 \cdot e^{i\phi_3} \cdot K_{22}^y \cdot e^{i\alpha 22y}|^2 =$$
$$= A_1^2 \cdot (K_{12}^y)^2 + A_2^2 \cdot (K_{22}^y)^2 + 2 \cdot K_{12}^y \cdot K_{22}^y \cdot A_1 \cdot A_3 \cdot \cos(\phi_1 - \phi_3 + \alpha 12y - \alpha 22y)$$

The amplitudes $A_1$, $A_2$, $A_3$ and the phase differences between adjacent samples maybe found using with the following parameterized algorithm:

$$A_1 = \frac{\sqrt{I(A_1)}}{K_0}; \quad A_2 = \frac{\sqrt{I(A_2)}}{K_0}; \quad A_3 = \frac{\sqrt{I(A_3)}}{K_0} \quad (15)$$

$$\varphi_1 - \varphi_2 = \tan^{-1}\left(\frac{D_1^x \cdot \cos(\alpha 12x - \alpha 22x) - D_2^x \cdot \cos(\alpha 11x - \alpha 21x)}{D_1^x \cdot \sin(\alpha 12x - \alpha 22x) - D_2^x \cdot \sin(\alpha 11x - \alpha 21x)}\right)$$

$$\varphi_1 - \varphi_3 = \tan^{-1}\left(\frac{D_1^y \cdot \cos(\alpha 12y - \alpha 22y) - D_2^y \cdot \cos(\alpha 11y - \alpha 21y)}{D_1^y \cdot \sin(\alpha 12y - \alpha 22y) - D_2^y \cdot \sin(\alpha 11y - \alpha 21y)}\right)$$

with the parameters labeled by D given by:

$$D_1^x = K_{12}^x \cdot K_{22}^x \cdot [K_0^2 \cdot I(P_1^{\Delta \vec{x}}) - I(A_1) \cdot (K_{11}^x)^2 - I(A_2) \cdot (K_{21}^x)^2]$$

$$D_2^x = K_{11}^x \cdot K_{21}^x \cdot [K_0^2 \cdot I(P_2^{\Delta \vec{x}}) - I(A_1) \cdot (K_{12}^x)^2 - I(A_2) \cdot (K_{22}^x)^2]$$

$$D_1^y = K_{12}^y \cdot K_{22}^y \cdot [K_0^2 \cdot I(P_1^{\Delta \vec{y}}) - I(A_1) \cdot (K_{11}^y)^2 - I(A_3) \cdot (K_{21}^y)^2]$$

$$D_2^y = K_{11}^y \cdot K_{21}^y \cdot [K_0^2 \cdot I(P_2^{\Delta \vec{y}}) - I(A_1) \cdot (K_{12}^y)^2 - I(A_3) \cdot (K_{22}^y)^2] \quad (16)$$

Equation (15) is obtained by forming the ratios $\sin(\phi_1-\phi_2)/\cos(\phi_1-\phi_2)$ and $\sin(\phi_1-\phi_3)/\cos(\phi_1-\phi_3)$. The parameters labeled with K and $\alpha$ are given by the amplitudes and the phases, respectively, of the different components of the characteristic pattern (see Eq. (12)). Thus, they depend on the actual construction of the DG and can be set as discussed before. They can be measured by calibrating the system with a known input. The above inversion algorithms require that $(\alpha 11x - \alpha 21x)$ is different from $(\alpha 12x - \alpha 22x)$ and that $(\alpha 11y - \alpha 21y)$ is different from $(\alpha 12y - \alpha 22y)$. This requirement has already been imposed on the characteristic pattern of Eq. (12). Other phase estimation algorithms are possible. They are similar to those in prior art with the difference that the interferometric equation for different phase shifts $\alpha$:

$$I(\alpha) = |E_A e^{i\phi_A} + E_B e^{i(\phi_B + \alpha)}|^2 = A^2 + B^2 + 2AB\cos(\phi_A - \phi_B + \alpha) \quad (17)$$

changes to a parameterized version $$I(\alpha_1 - \alpha_2) = A^2 \cdot K_A^2(\alpha_1) + B^2 \cdot K_B^2(\alpha_2) + K_{AB}(\alpha_2 - \alpha_2) \cdot A \cdot B \cdot \cos(\phi_A - \phi_B + \alpha_1 - \alpha_2) \quad (18)$$

as suggested by Eq. (13) and (14) also.

The requirements on the characteristic pattern defined up to this point define a general characteristic pattern to be used for this particular application of the method. There are many characteristic patterns, which can be physically implemented in a DG, and which satisfy the above requirements. They differ from each other by their geometry and by the number and the value of the phase shifts (labeled with $\alpha$ in the characteristic pattern). The geometry of the characteristic pattern is given by the choice and number of position vectors $\vec{r}_1^x, \vec{r}_2^x, \vec{r}_1^y, \vec{r}_2^y$ as well as the choice and the direction of shear vectors $\Delta\vec{x}$ and $\Delta\vec{y}$ (any two, at least, non-collinear shear directions will do). The DG can be implemented, as shown before, using birefringent elements, diffractive elements, and combinations of birefringent and/or diffractive elements with field modulating elements, which give more freedom in implementing certain characteristic patterns.

Further specification of the characteristic pattern (STEP 6) depends on the sampling geometry. For example, consider a particular case with sampling on a Cartesian grid at 88 μm in both directions. The characteristic pattern is still incompletely specified and there are many that could be used. The exact specification of the characteristic pattern (STEP 7) depends on the choice of shear directions as well as the choice of vectors $\vec{r}_1^x$, $\vec{r}_2^x$, $\vec{r}_1^y$, $\vec{r}_2^y$.

SFS With Birefringent WASE

Figure 17:
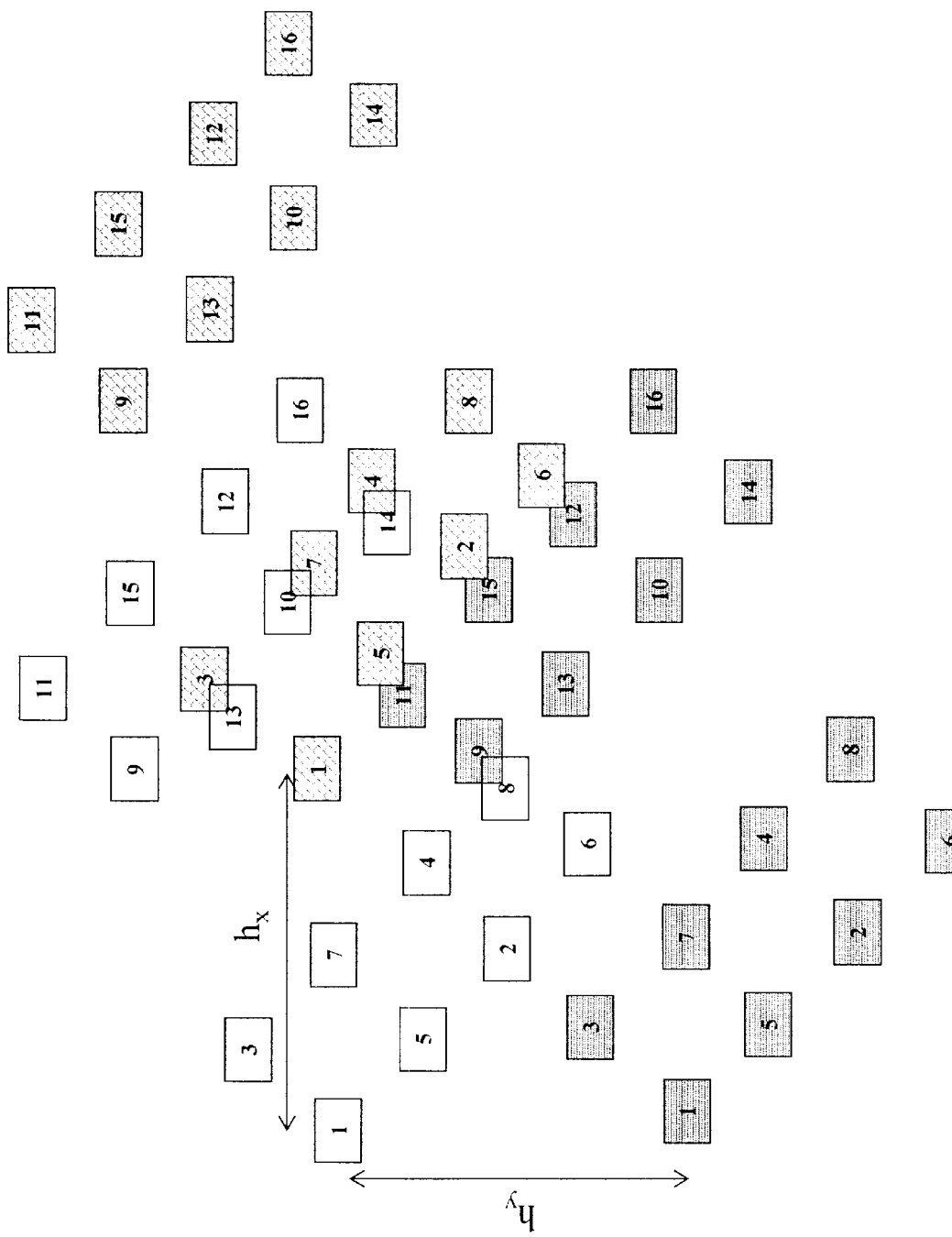
FIG. 17 illustrates overlap at the output of the DG for the samples in FIG. 15 and the characteristic pattern in FIG. 6.

One possible characteristic pattern is shown in FIG. 6, while the overlap between the output copies of different samples is shown in FIG. 17. The dimensions in FIG. 6 are in microns. The input field is a monochromatic and spatially coherent optical field, polarized to obtain the splits of ordinary and extraordinary waves shown in FIG. 6. The pattern in FIG. 6 is obtained by using four plates of birefringent uniaxial material. The thicknesses of the plates for a given set of lateral displacements can be found with Eq. (3), while the phase shifts of the different copies can be found using Eq. (6). A lower birefringence material, such as quartz, is preferred because the needed lateral shifts are small (on the order of 100 μm in this case) and because it gives better control of the phase of the different output copies (a small tilt or thickness variation has a smaller effect on the phase shifts). For example, in order to generate the pattern in FIG. 6, quartz plates with their optical axis at 45 degrees to the surface of the plate can be used. The required thicknesses are 10.66 mm (Q1), 5.33 mm (Q2), 5.33 mm (Q3), and 16.86 mm (Q4). If calcite cut at 45 degrees is used however, the required thicknesses become 0.567 mm, 0.283 mm, 0.283 mm, and 0.896 mm. Also, each micron of added thickness in the quartz plates adds 2.57 degrees of phase delay between the extraordinary and the ordinary fields. The phase delay is about 20 times larger in calcite plates, i.e. 53.2254 degrees per micron of thickness, requiring far tighter tolerances in manufacturing the plates. The situation is similar for the phase delay produced by tilting the birefringent plate, which is one order of magnitude larger for calcite than for quartz.

Figure 18:
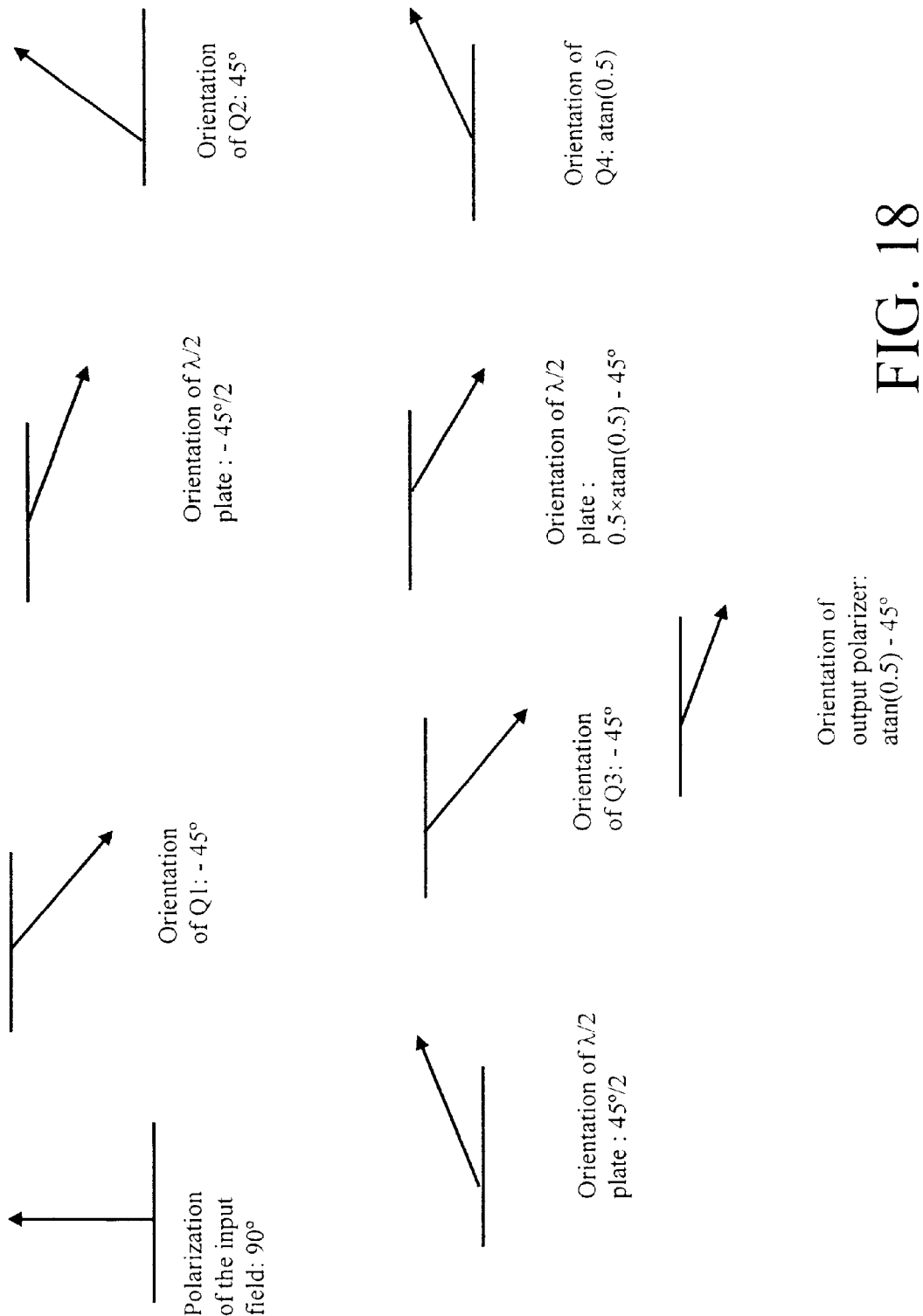
FIG. 18 illustrates orientation of different components in a birefringent WASE to generate the pattern in FIG. 6 and interference information. Positive angles are measured counterclockwise while negative angles are measured clockwise from the horizontal axis.

Additional polarization rotators or wave plates may be placed between the different quartz plates in order to adjust the amplitudes of the different output copies. In order to obtain interference signals, a polarizer is placed after the four birefringent plates. The type of polarizer and its orientation is selected to obtain the desired amplitudes and polarizations in the different output copies. For example, consider an input beam polarized along the vertical axis, as shown in FIG. 18. A possible choice of birefringent elements, waveplates, and polarizer is the following (in order): plate Q2, λ/2 waveplate, plate Q3, λ/2 waveplate, plate Q4, λ/2 waveplate, plate Q1, and linear polarizer. The projections on a plane parallel to the face the plates (consider normal incidence for all plates) of the optical axes of the quartz plates Q1 through Q4 as well as the optical axes of the λ/2 waveplates and the polarization direction of the polarizer are shown in FIG. 18. This choice is not unique. Different types of waveplates and polarizer may be chosen as well as a different sequence for the set of quartz plates. The characteristic pattern of the resulting DG is given by:

$$c_{\text{overlap}}(\vec{r}) = \sum_{j=1}^{16} \delta(\vec{r} - \vec{r}_j) \cdot K_j \cdot e^{i\alpha_j} \quad (19)$$

with $\vec{r}_1$=(0 μm,0 μm), $\vec{r}_2$=(44 μm,44 μm), $\vec{r}_3$=(22 μm,−22 μm), $\vec{r}_4$=(66 μm,22 μm), $\vec{r}_5$=(22 μm,22 μm), $\vec{r}_6$=(66 μm,66 μm), $\vec{r}_7$=(44 μm,0 μm), $\vec{r}_8$=(88 μm,44 μm), $\vec{r}_9$=(88 μm,−44 μm), $\vec{r}_{10}$=(132 μm,0 μm), $\vec{r}_{11}$=(110 μm,−66 μm), $\vec{r}_{12}$=(154 μm,−22 μm), $\vec{r}_{13}$=(110 μm,−22 μm), $\vec{r}_{14}$=(154 μm,22 μm), $\vec{r}_{15}$=(132 μm,−44 μm), $\vec{r}_{16}$=(176 μm,0 μm). The values of the K-parameters can be adjusted by proper orientation of the λ/2 waveplates and the polarizer. The K-parameters are all equal, for the orientations given in FIG. 18. FIG. 6 contains the propagation sequences for the optical fields in each of the fan-out copies. This can be used to find the phases $\alpha_j$, with the reference $\alpha_0$=0, as explained before in Eq. (4) and (6).

The solid arrows in FIG. 6 indicate the overlap between copies coming from immediately adjacent neighbors while the broken arrows indicate the overlap between horizontal neighbors spaced at a distance $2h_x$. Note that this pattern does not contain any non-overlap terms because 3 copies overlap in the horizontal direction, 3 in the diagonal direction, and one in the vertical direction, all between adjacent neighbors. In addition, one copy overlaps in the horizontal direction between neighbors spaced by $2h_x$. Choose one shear direction to be the horizontal direction and the other to be a diagonal direction, at 45 degrees to the horizontal. This satisfies the non-collinearity requirement of the characteristic pattern. This characteristic pattern requires at least two measurements for obtaining all the necessary information because it lacks non-overlapping copies. Also, non-overlapping copies can be generated using other plate sequences and/or using patterned field-modulating elements. One of the two measurements is done with the polarizer set like in FIG. 18 while the other measurement is done with the polarizer rotated 45 degrees from that position. Rotating the polarizer to the new position extinguishes either the points labeled [1 2 3 4 5 6 7 8] or the points labeled [9 10 11 12 13 14 15 16], depending on the direction of rotation. The characteristic pattern in this case will be given by:

$$c_{\text{non-overlap}}(\vec{r}) = \sum_{j=1}^{8} \delta(\vec{r} - \vec{r}_j) \cdot \sqrt{2} \cdot K_j \cdot e^{i\alpha_j} \quad (20)$$

if the set labeled [1 2 3 4 5 6 7 8] remains. The K-parameters will remain equal with each other. The square root factor is given by the rotation of the polarizer. The phase angles $\alpha_j$ and displacement vectors $\vec{r}_j$, j=1,8, are unchanged. Any of the copies in the new characteristic pattern will provide the required I(A) measurements and one or more can be used to estimate the amplitudes of the samples in the input. The amplitude of each sample in the input can be found for example using:

$$A = \sum_{j=1}^{8} \frac{I(j; \text{non-overlap})}{2K_j} \quad (21)$$

where I(j; non-overlap) is the intensity in the copy labeled "j" of the non-overlap characteristic pattern. Choose the two non-collinear directions to be $\Delta\vec{x}=(88\ \mu m, 0\ \mu m)$ and $\Delta\vec{y}=(88\ \mu m, -88\ \mu m)$. Thus, the phase diversity measurements are $$I(P_1^{\Delta\vec{x}})=I(3;\text{overlap})\ \text{and/or}\ I(4;\text{overlap})$$

$$I(P_2^{\Delta\vec{x}})=I(7;\text{overlap})$$

$$I(P_1^{\Delta\vec{y}})=I(5;\text{overlap})\ \text{and/or}\ I(6;\text{overlap})$$

$$I(P_2^{\Delta\vec{y}})=I(2;\text{overlap}) \tag{22}$$

The measurements given by I(3;overlap) and I(4;overlap) provide no phase diversity because $(\alpha_3-\alpha_{13})=(\alpha_4-\alpha_{14})$. The same holds for I(5;overlap) and I(6;overlap), for which $(\alpha_5-\alpha_{11})=(\alpha_6-\alpha_{12})$. One or two measurements can be used for each of $I(P_1^{\Delta\vec{x}})$ and $I(P_1^{\vec{y}})$. Using two will increase the accuracy of the intensity measurement. One can directly apply the phase estimation part of the inversion algorithm given in Eq. (15) by choosing only I(3;overlap) for $I(P_1^{\Delta\vec{x}})$ and I(5;overlap) for $I(P_1^{\Delta\vec{y}})$. The correspondence between the K and $\alpha$ parameters is the following: $K_3=K_{11}^x$, $K_{13}=K_{21}^x$, $K_7=K_{12}^x$, $K_{10}=K_{22}^x$, $K_5=K_{11}^y$, $K_{11}=K_{21}^y$, $K_2=K_{12}^y$, and $K_{15}=K_{22}^y$; $\alpha_3=\alpha 11x$, $\alpha_{13}=\alpha 21x$, $\alpha_7=\alpha 12x$, $\alpha_{10}=\alpha 22x$, $\alpha_5=\alpha 11y$, $\alpha_{11}=\alpha 21y$, $\alpha_2=\alpha 12y$, and $\alpha_{15}=\alpha 22y$.

In addition, the chosen characteristic pattern also provides for interference along a third direction, although without phase diversity. Thus, only the absolute value of the phase difference is known. There is also overlap along the horizontal direction but from second order neighbors. The phase difference information along two non-collinear shearing directions can be used to find the two dimensional phase distribution in the input, as required.

SFS With Field Modulating Element

Figures 19A, 19B:
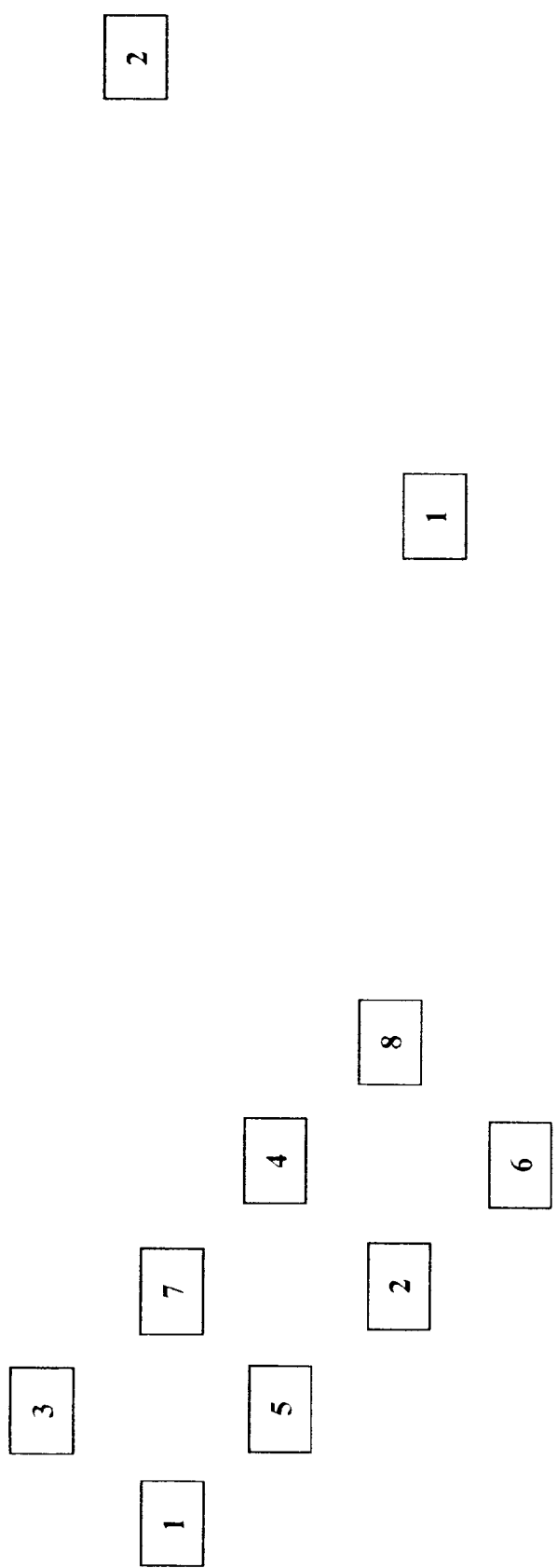
FIGS. 19(a) and 19(b) respectively illustrate characteristic patterns of the two stage DG.
Figures 20A, 20B:
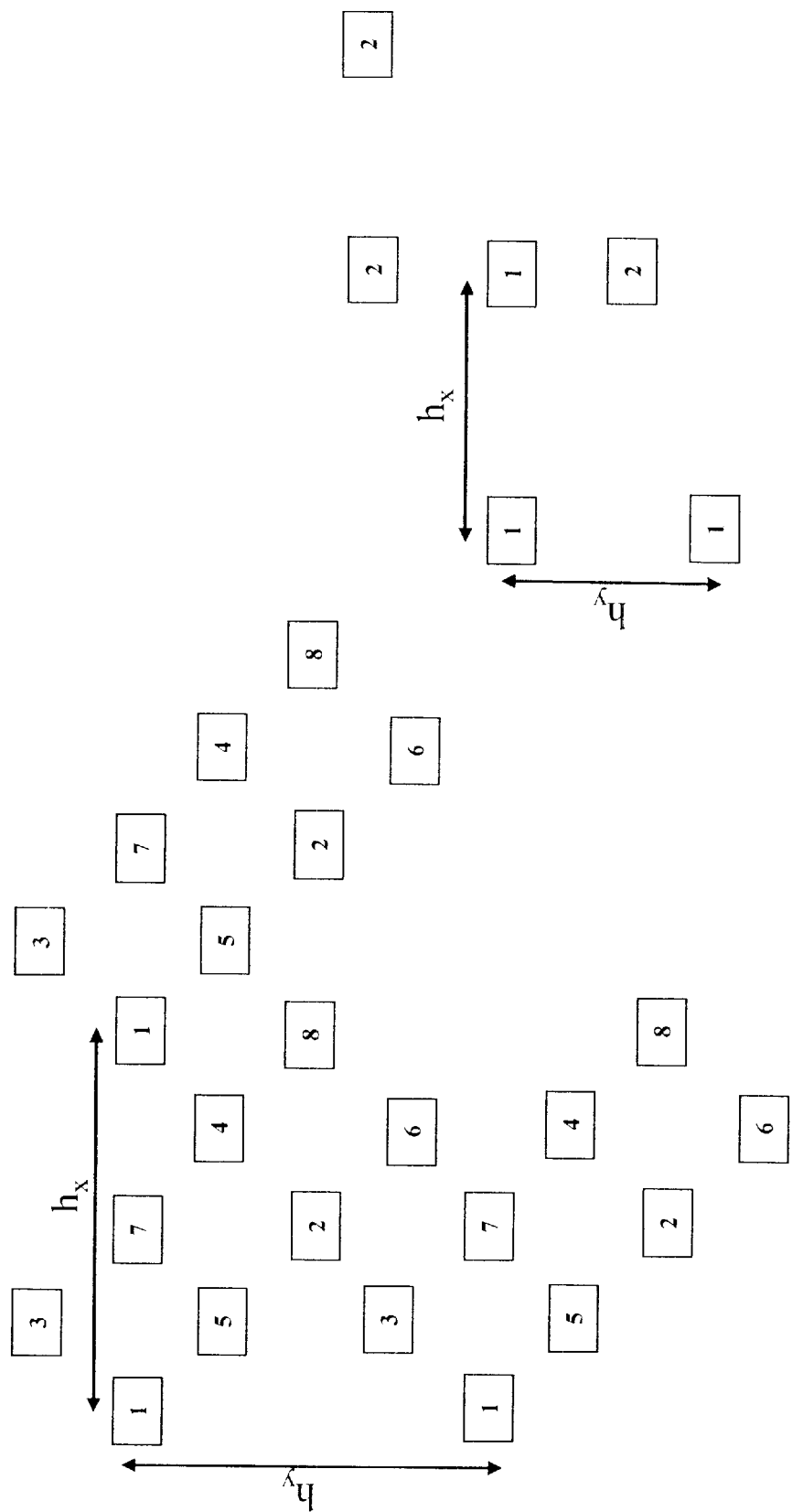
FIGS. 20(a) and 20(b) respectively illustrate adjacency of the two characteristic patterns with the three input samples in FIG. 16 for the DG first stage and the DG second stage.

A third different phase difference as well as non-overlapping copies can be generated in a cascaded implementation of the diversity generator, which uses additional field modulating elements. Here, we give the characteristic patterns of the two stages as well as the pattern on the FME. FIGS. 19(a) and (b) show the characteristic patterns of the first and the second stage, respectively, while FIGS. 20(a) and 20(b) respectively show the adjacency of the characteristic patterns of each stage for three points in the input as shown in FIG. 16. FIG. 21 shows the pattern on the FME. FIGS. 22(a) and (b) respectively show the characteristic pattern of the cascaded DG having the above described FME in the intermediary plane. As it can be seen from FIG. 22, the use of the patterned field-modulating element achieves two goals. First, the FME eliminates the overlap between second order neighbors on the horizontal direction by eliminating the field labeled "16". This provides for direct amplitude measurements for each input sample by creating non-overlapping fields, such as those labeled "9" and "1". The FME also gives more phase diversity measurements. The phase differences in the two sets of overlapping fields come either purely from birefringent propagation or from both birefringent propagation and local field modulation (phase shift) given by the field modulating element. The phase angles at are given by Eq. (6) with the following changes:

$$\alpha_4=\Delta\Phi_1+\Delta\Phi_2+0+0+\delta_1$$

$$\alpha_6=\Delta\Phi_1+0+\Delta\Phi_3+0+\delta_2$$

COPY 8 is blocked $$\alpha_{12}=\Delta\Phi_1+\Delta\Phi_2+0+\Delta\Phi_4+\delta_1$$

$$\alpha_{14}=\Delta\Phi_1+0+\Delta\Phi_3+\Delta\Phi_4+\delta_2$$

COPY 16 is absent $\tag{23}$

Therefore the set of horizontal phase differences is given by $$\alpha_3-\alpha_{13}=(0+\Delta\Phi_2+0+0)-(0+0+\Delta\Phi_3+\Delta\Phi_4)=$$

$$=\Delta\Phi_2-\Delta\Phi_3-\Delta\Phi_4$$

$$\alpha_{7-\alpha 10}=(0+\Delta\Phi_2+\Delta\Phi_3+0)-(\Delta\Phi_1+0+0+\Delta\Phi_4)=$$

$$=-\Delta\Phi_1+\Delta\Phi_2+\Delta\Phi_3-\Delta\Phi_4$$

$$\alpha_4-\alpha_{14}=(\Delta\Phi_1+\Delta\Phi_2+0+0+\delta_1)-(\Delta\Phi_1+0+\Delta\Phi_3+\Delta\Phi_4)=$$

$$=\Delta\Phi_2-\Delta\Phi_3-\Delta\Phi_4+\delta_1+\delta_2$$

while the set of diagonal phase differences is given by $$\alpha_3-\alpha_{13}=(0+\Delta\Phi_2+0+0)-(0+0+\Delta\Phi_3+\Delta\Phi_4)=$$

$$=\Delta\Phi_2-\Delta\Phi_3-\Delta\Phi_4$$

$$\alpha_{15}-\alpha_2=(0+\Delta\Phi_2+\Delta\Phi_3+\Delta\Phi_4)-(\Delta\Phi_1+0+0+0)=$$

$$=-\Delta\Phi_1+\Delta\Phi_2+\Delta\Phi_3-\Delta\Phi_4$$

$$\alpha_{12-\alpha 6}=(\Delta\Phi_1+\Delta\Phi_2+0+\Delta\Phi_4)-(\Delta\Phi_1+0+\Delta\Phi_3+0+\delta_2)=$$

$$=\Delta\Phi_2-\Delta\Phi_3-\Delta\Phi_4+\delta_1+\delta_2$$

It is obvious from Eqs.(10) and (11) that, for $\delta_1-\delta_2=\delta$, the phase delay $\delta$ and the plate thicknesses can be so chosen such that the phase differences $(\alpha_3-\alpha_{13})$, $\alpha_7-\alpha_{10}$, and $(\alpha_4-\alpha_{14})$ are all different from each other. The same is true for the other set of phase differences, $(\alpha_{11}-\alpha_{15})$, $(\alpha_{15}-\alpha_2$, and $(\alpha_{12}-\alpha_6)$. The additional phase diversity can be used to increase the accuracy of the estimated phase difference between the adjacent samples of the input field. Another possible characteristic pattern for this application of the method was discussed before and is shown in FIG. 12. It was obtained by transforming a characteristic pattern without phase diversity into one having phase diversity. Therefore, multiple patterns can be generated for the purpose of this application of the method. The use of patterned field modulating elements in conjunction with birefringent elements provides more freedom in generating the diversity pattern.

Other characteristic patterns and phase estimation algorithms can be used based on the recipe given above of forming the cosine and the sine of the phase difference from multiple phase-shifted (phase diversity) measurements.

Estimation of the Stokes Vectors/polarization State Associated With an Optical Field In this case, the goal is to estimate the Stokes parameters of an input optical field. Consider the two orthogonally polarized components of an optical field to be:

$$\vec{E}_x(t)=\hat{i}E_{0x}(t)\cos[(\bar{k}z-\bar{\omega}t)+\epsilon_x(t)]$$

$$\vec{E}_y(t)=\hat{j}E_{0y}(t)\cos[(\bar{k}z-\bar{\omega}t)+\epsilon_y(t)] \tag{26}$$

where t is the time variable and $$\vec{E}(t)=\vec{E}_x(t)+\vec{E}_y(t). \tag{27}$$

The Stokes parameters can be expressed as:

$$S_0=<E_{0x}^2(t)>+<E_{0y}^2(t)>$$

$$S_1=<E_{0x}^2(t)>-<E_{0y}^2(t)>$$

$$S_2=<2E_{0x}(t)E_{0y}(t)\cos(\epsilon)>$$

$$S_3 = \langle 2E_{0x}(t)E_{0y}(t)\sin(\epsilon)\rangle \quad (28)$$

where $\epsilon = \epsilon_x - \epsilon_y$ and $\langle \cdot \rangle$ stands for time average. The four parameters, $S_0$ to $S_4$, can be measured using four measurements, for example. The choice of measurements, thus the choice of characteristic pattern, is not a unique one. For example, intensities in the x and y polarizations, $\langle E_{0x}^2(t)\rangle$ and $\langle E_{0y}^2(t)\rangle$, respectively, can be measured separately by filtering the input through a linear polarizer and measuring the output intensity for two orthogonal orientations of the polarizer. The quantities $\langle 2E_{0x}(t)E_{0y}(t)\cos(\epsilon)\rangle$ and $\langle 2E_{0x}(t)E_{0y}(t)\sin(\epsilon)\rangle$ can be measured by splitting the input field in the two orthogonal components, $E_{0x}(t)$ and $E_{0y}(t)$, for example, by using a polarizing beam splitter, and interfering the two fields with appropriate phase delays. This defines the set of diversity measurements needed (STEP 1 in the general application of the method). Equations (26) and (27) suggest that any state of polarization can be considered as a superposition of two orthogonal states of polarization with a given phase lag between them. It is helpful to consider the characteristic pattern for each of the two orthogonal states of polarization, i.e. $c_x(\vec{r})$ and $c_y(\vec{r})$. Those skilled in the art will note that all the interference measurements are between modified copies of the same input sample. Therefore, each input sample is treated independently and we shall consider only an input field having only one input sample in the following remarks. An input sample having an electrical field given as $\vec{E}_{input}(t) = \vec{E}_x(t) + \vec{E}_y(t)$ will be mapped at the output of the DG into multiple samples:

$$\vec{E}_{output}(t) = \vec{E}_x(t) \cdot c_x(\vec{r}) + \vec{E}_y(t) \cdot c_y(\vec{r}) \quad (29)$$

The goal is to estimate the state of polarization of $\vec{E}_{input}(t)$ from intensity measurements made on $\vec{E}_{output}(t)$. Therefore, the two characteristic patterns $c_x(\vec{r})$ and $c_y(\vec{r})$ are such that each has at least one non-overlapping copy and two overlapping copies. The latter copies of each pattern overlap with the corresponding copies in the other pattern to provide phase diversity required by the estimation of the phase lag $\epsilon = \epsilon_x - \epsilon_y$. The two generic characteristic patterns with minimum specification are given by (STEP3):

$$c_x(\vec{r}) = \delta(\vec{r} - \vec{r}_{0x}) \cdot K_{0x} \cdot e^{i\alpha 0x} +$$
$$+ \delta(\vec{r} - \vec{r}_{1x}) \cdot K_{1x} \cdot e^{i\alpha 1x} + \delta(\vec{r} - \vec{r}_{2x}) \cdot K_{2x} \cdot e^{i\alpha 2x}$$

$$c_y(\vec{r}) = \delta(\vec{r} - \vec{r}_{0y}) \cdot K_{0y} \cdot e^{i\alpha 0y} +$$
$$+ \delta(\vec{r} - \vec{r}_{1y}) \cdot K_{1y} \cdot e^{i\alpha 1y} + \delta(\vec{r} - \vec{r}_{2y}) \cdot K_{2y} \cdot e^{i\alpha 2y} \quad (30)$$

The first term of each characteristic pattern is the non-overlapping copy. The second term of $c_x(\vec{r})$ overlaps with the second term of $c_y(\vec{r})$ and the same applies to the last term of each characteristic pattern. The generic intensity measurements at the output of the DG are (STEP 4):

$$I(\langle E_{0x}^2 \rangle) = \langle |E_{0x}(t) \cdot e^{i\epsilon_x(t)} \cdot K_{0x} \cdot e^{i\alpha 0x}|^2 \rangle = \langle E_{0x}(t)^2 \rangle \cdot K_{0x}^2$$

$$I(\langle E_{0y}^2 \rangle) = \langle |E_{0y}(t) \cdot e^{i\epsilon_y(t)} \cdot K_{0y} \cdot e^{i\alpha 0y}|^2 \rangle = \langle E_{0y}(t)^2 \rangle \cdot K_{0y}^2$$

$$I_1(\epsilon) = \langle |E_{0x}(t) \cdot e^{i\epsilon_x(t)} \cdot K_{1x} \cdot e^{i\alpha 1x} + E_{0y}(t) \cdot e^{i\epsilon_y(t)} \cdot K_{1y} \cdot e^{i\alpha 1y}|^2 \rangle =$$
$$= \langle E_{0x}(t)^2 \rangle \cdot K_{1x}^2 + \langle E_{0y}(t)^2 \rangle \cdot K_{1y}^2 +$$
$$+ K_{1x} \cdot K_{1y} \cdot \langle 2 \cdot E_{0x}(t) \cdot E_{0y}(t) \cdot \cos(\epsilon_x(t) - \epsilon_y(t) + \alpha 1x - \alpha 1y) \rangle$$

$$I_2(\epsilon) = \langle |E_{0x}(t) \cdot e^{i\epsilon_x(t)} \cdot K_{2x} \cdot e^{i\alpha 2x} + E_{0y}(t) \cdot e^{i\epsilon_y(t)} \cdot K_{2y} \cdot e^{i\alpha 2y}|^2 \rangle =$$
$$= \langle E_{0x}(t)^2 \rangle \cdot K_{2x}^2 + \langle E_{0y}(t)^2 \rangle \cdot K_{2y}^2 +$$
$$+ K_{2x} \cdot K_{2y} \cdot \langle 2 \cdot E_{0x}(t) \cdot E_{0y}(t) \cdot \cos(\epsilon_x(t) - \epsilon_y(t) + \alpha 2x - \alpha 2y) \rangle$$

This choice of characteristic pattern and intensity measurement is not unique. An algorithm to estimate the Stokes parameters of the input sample by solving the system of equations (31) is:

$$S_0 = \frac{I(\langle E_{0x}^2 \rangle)}{K_{0x}^2} + \frac{I(\langle E_{0y}^2 \rangle)}{K_{0y}^2} \quad (32)$$

$$S_1 = \frac{I(\langle E_{0x}^2 \rangle)}{K_{0x}^2} - \frac{I(\langle E_{0y}^2 \rangle)}{K_{0y}^2}$$

$$S_2 = \frac{D_1 \cdot \sin(\alpha 2x - \alpha 2y) - D_2 \cdot \sin(\alpha 1x - \alpha 1y)}{\sin[(\alpha 2x - \alpha 2y) - (\alpha 1x - \alpha 1y)]}$$

$$S_3 = \frac{D_1 \cdot \cos(\alpha 2x - \alpha 2y) - D_2 \cdot \cos(\alpha 1x - \alpha 1y)}{\sin[(\alpha 2x - \alpha 2y) - (\alpha 1x - \alpha 1y)]}$$

with $$D_1 = \frac{1}{K_{1x} \cdot K_{1y}}\left(I_1(\epsilon) - I(\langle E_{0x}^2 \rangle) \cdot \frac{K_{1x}^2}{K_{0x}^2} - I(\langle E_{0y}^2 \rangle) \cdot \frac{K_{1y}^2}{K_{0y}^2}\right) \quad (33)$$

$$D_2 = \frac{1}{K_{2x} \cdot K_{2y}}\left(I_2(\epsilon) - I(\langle E_{0x}^2 \rangle) \cdot \frac{K_{2x}^2}{K_{0x}^2} - I(\langle E_{0y}^2 \rangle) \cdot \frac{K_{2y}^2}{K_{0y}^2}\right)$$

and the requirement that $(\alpha 2x - \alpha 2y) \neq (\alpha 1x - \alpha 1y)$ (STEP 6). In some cases only the phase lag $\epsilon$ is of interest (e.g., ellipsometric measurements). It can be estimated based on the measurements shown in Eq. (31) using an algorithm similar to that used above for estimating the phase difference between adjacent samples of the input field, i.e.:

$$\epsilon = \tan^{-1}\left(\frac{D_1 \cdot \cos(\alpha 2x - \alpha 2y) - D_2 \cdot \cos(\alpha 1x - \alpha 1y)}{D_1 \cdot \sin(\alpha 2x - \alpha 2y) - D_2 \cdot \sin(\alpha 1x - \alpha 1y)}\right) \quad (34)$$

Similarly, more phase shifted and overlapping copies can be used for a more accurate estimate of the phase delay. The measurements in (31) can be used to estimate the polarization state of the input sample without estimating the Stokes parameters. For example $(\langle E_{0x}(t)^2 \rangle)^{1/2}$, $(\langle E_{0y}(t)^2 \rangle)^{1/2}$, and $\epsilon$ can be estimated using algorithms similar to those used above in the phase difference between adjacent samples.

The diversity generator can be implemented using bireftingent plates, following a similar procedure to that described above to estimate phase difference between adjacent samples. It can also be implemented using form birefringent diffractive elements. We describe an example implementation using a birefringent WASE. We give a possible choice of characteristic pattern following the same labeling scheme as in FIG. 6. Then, we give the measurements and the inversion algorithm to obtain $S_0$, $S_1$, $S_2$, and $S_3$.

The example characteristic pattern is generated with a cascaded DG with an additional FME shown in FIG. 23. The characteristic patterns of the first and the second stage of the DG are shown in FIG. 23(a) and 23(b) respectively. FIG. 23(c) shows the pattern on the FME which is such that to add a phase shift $\delta$ to copy labeled "3" in FIG. 23(a). FIG. 23(d) shows the output pattern of the cascaded DG following the same numbering scheme as in FIG. 12 together with the legend showing the propagation through the sequence of plates. Copies labeled "2" and "4" are slightly displaced to emphasize their overlap with copies "5" and "7". The two characteristic patterns are parameterized as follows:

$$c_x(\vec{r}) = \delta(\vec{r} - \vec{r}_1) \cdot K_1 \cdot e^{i\alpha_1} + \delta(\vec{r} - \vec{r}_3) \cdot K_3 \cdot e^{i\alpha_3}$$

$$+ \delta(\vec{r} - \vec{r}_5) \cdot K_5 \cdot e^{i\alpha_5} + \delta(\vec{r} - \vec{r}_6) \cdot K_6 \cdot e^{i\alpha_6}$$

$$c_y(\vec{r}) = \delta(\vec{r} - \vec{r}_7) \cdot K_7 \cdot e^{i\alpha_7} + \delta(\vec{r} - \vec{r}_8) \cdot K_8 \cdot e^{i\alpha_8}$$

$$+ \delta(\vec{r} - \vec{r}_2) \cdot K_2 \cdot e^{i\alpha_2} + \delta(\vec{r} - \vec{r}_4) \cdot K_4 \cdot e^{i\alpha_4} \quad (35)$$

The correspondence between the K and α parameters of the generic representation and that of the particular pattern shown in FIG. 23 and Eq. (35) is the following: $K_1 = K_{0x}$, and/or $K_3 = K_{0x}$, $K_2 = K_{1x}$, $K_4 = K_{2x}$, $K_7 = K_{0y}$ and/or $K_8 = K_{0y}$, $K_5 = K_{1y}$, and $K_6 = K_{2y}$. The phase angles are given by:

$$\alpha_2 = \Delta\Phi_1 + 0 + 0$$

$$\alpha_3 = 0 + \Delta\Phi_2 + 0 + \delta$$

$$\alpha_4 = \Delta\Phi_1 + \Delta\Phi_2 + 0$$

$$\alpha_5 = 0 + 0 + \Delta\Phi_3$$

$$\alpha_6 = \Delta\Phi_1 + 0 + \Delta\Phi_3$$

$$\alpha_7 = 0 + \Delta\Phi_2 + \Delta\Phi_3 + \delta$$

$$\alpha_8 = \Delta\Phi_1 + \Delta\Phi_2 + \Delta\Phi_3 \quad (36)$$

with $\alpha_1 = 0$. Either one or both intensity measurements in the output copies labeled "1" and "3" can be used to estimate $I(<E_{0x}^2>)$. The same is true for the copies labeled "6" and "8" and the estimate of $<E_{0y}^2(t)>$. The inversion algorithm is given by Eq. (32) with the above correspondence of the parameters involved.

Temporal Coherence/spectral Content Estimation

This essentially involves applying the techniques described above to non-monochromatic fields. For example, the information in the phase-shifted frames of a Fourier transform spectrometer can be generated using the above techniques.

Spatial Coherence Estimation With Coherence Interferometers

This essentially involves applying the techniques described above to spatially incoherent fields. Coherence diversity together with phase diversity is generated in this case.

Two-beam Interferometers

In this case, the phase delay between two different wave fronts is measured. Only phase diversity data (and no shear diversity) is required. The two input fields have to be coherent with each other. For example they may be the fields at the output of two-beam interferometers, such as Michelson/Twyman-Green, Fizeau, Mach-Zehnder and others.

Figure 24A:
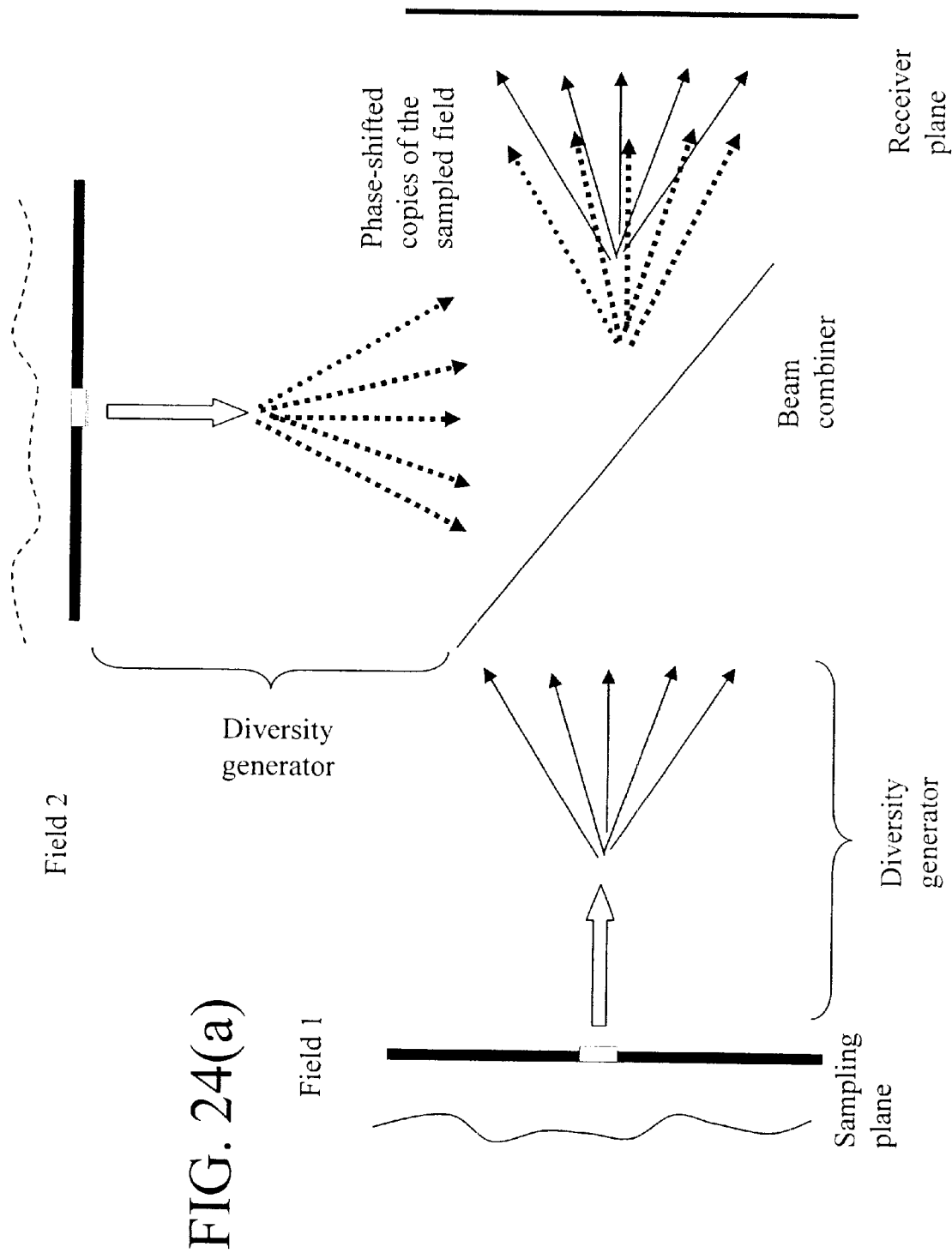
FIGS. 24(a) and 24(b) respectively illustrate diversity generation for multiple input fields: (a) separately, on separate paths; (b) simultaneously, on the same path.
Figure 24B:
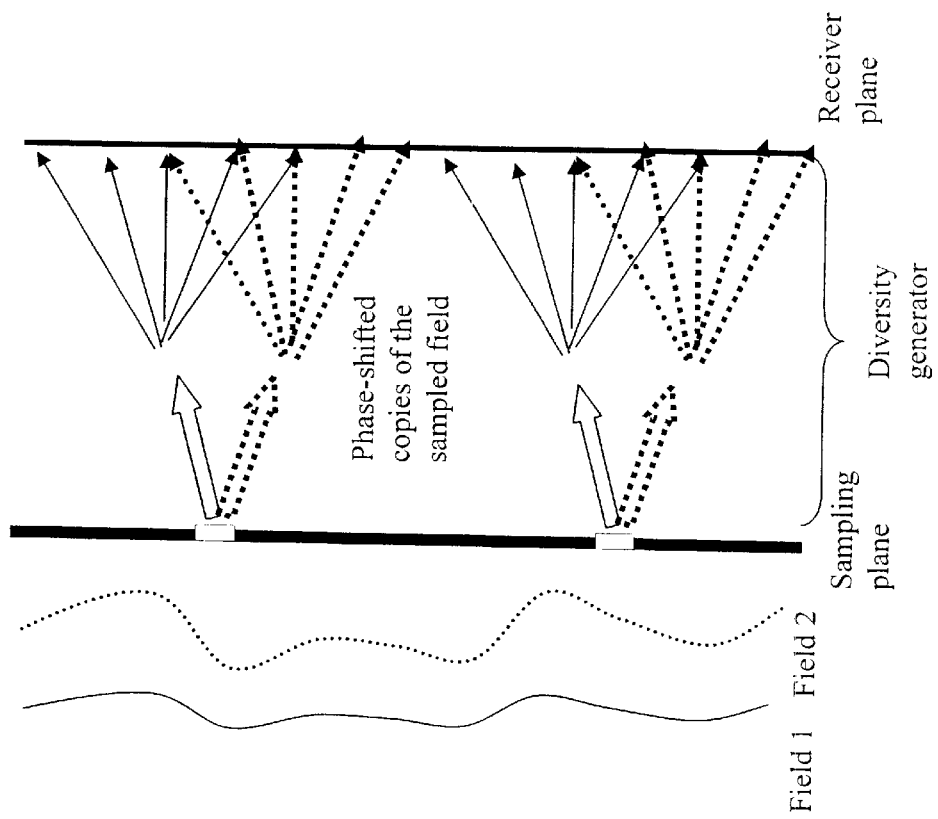

The two characteristic patterns containing the phase diversity data can be generated (i) separately for each input field and then overlapped in order to obtain interferometric data (FIG. 24(a)) or (ii) simultaneously for both inputs in a way such that the desired overlap, thus interferometric data, is obtained (FIG. 24(b)). Here, in FIG. 24(a), the characteristic pattern of each path has to produce overlap between copies in different paths/fields, as opposed to overlap of copies from the same field in the phase difference estimation discussed above. Referring to FIG. 24(b), which illustrates case (ii), characteristic patterns have to be generated simultaneously for two different input fields. The characteristic pattern of each field has to be such that overlap between copies in different fields occurs. However, if the polarizations of the two input fields are orthogonal then FIG. 24(b) is similar to estimation of the Stokes vectors/polarization state associated with an optical field and one can apply the same strategies and algorithms as in that case.

We will further consider the application of the present method to a Michelson interferometer and to a Fizeau interferometer. Other two-beam interferometers can be treated similarly. Given the fact that both cases in FIG. 24(a) and 24(b) can be reduced to previously discussed applications of the current method, only a general description of the application of the current method to a Michelson and a Fizeau interferometer is given here. Those skilled in the art will follow the application of the method in the previously discussed cases for further consideration. The application of the current method in the case of FIG. 24(b) is given next.

Michelson Interferometer

Consider a Michelson interferometer for an example application of the present invention. In a conventional phase-shift Michelson interferometer, the input field is split in two copies. One copy is sent into the measurement arm while the other is sent into the reference arm. The phase of the measurement copy is modulated by a surface to be measured or by other means. The two copies are interfered at the output of the interferometer with different phase delays between them in order to estimate the phase difference between them at each point in the output plane, as shown in FIG. 25(a). The present invention can be used to generate the phase diversity information required by the estimation of the phase delay between the two copies at a set of points in the output aperture. From the specification of the application it is clear that only phase diversity data is required.

Figure 25B:
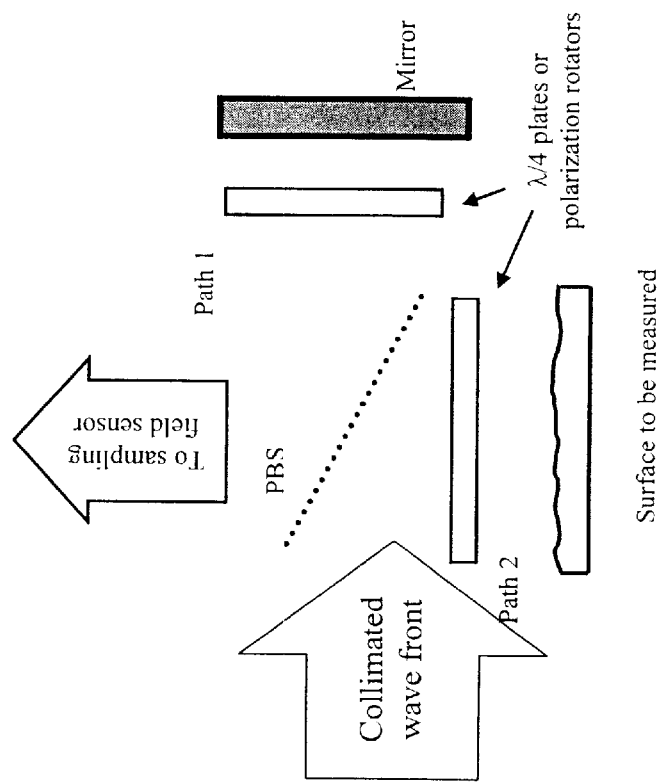
FIGS. 25(a) and 25(b) respectively illustrate a Michelson/Twyman-Green interferometer with a: (a) Regular phase-shift system and (b) a system with diversity generator.
Figure 25A:
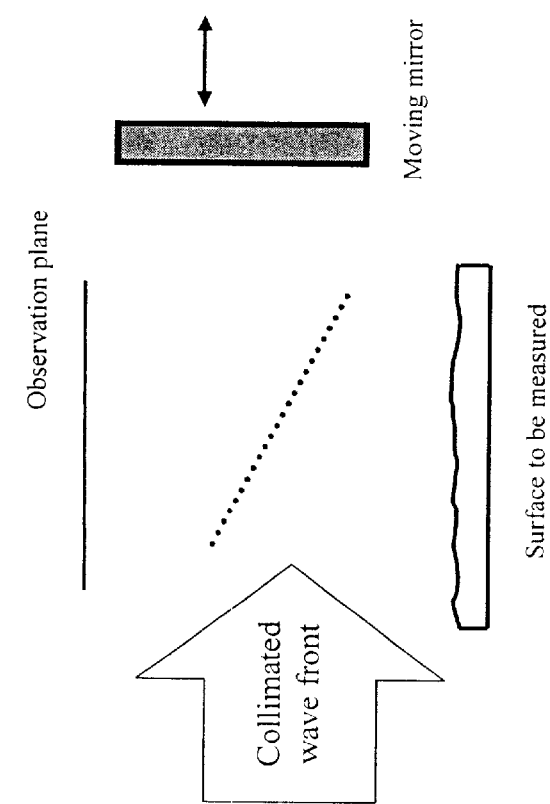

This application of the method to a Michelson interferometer is shown in FIG. 25(b). Referring to FIG. 25(b), path 1 is the reference path and path 2 is the measurement path. A preferred embodiment for this application of the current method uses a polarization beam splitter (PBS) to send light with different polarizations on the two paths. In addition, a λ/4 waveplate is placed in each path to rotate the two polarizations into orthogonal directions and transform the PBS into a beam combiner. The interferometer outputs two orthogonally polarized beams and the phase delay between the two beams at each point in its output needs to be estimated. A direct application of the method described to estimate the Stokes vectors above accomplishes the estimation.

In addition, the generation of phase diversity information can be done separately in each path (case (i)), or at least one path, by placing an SDG in that path.

Fizeau Interferometer

Figure 26B:
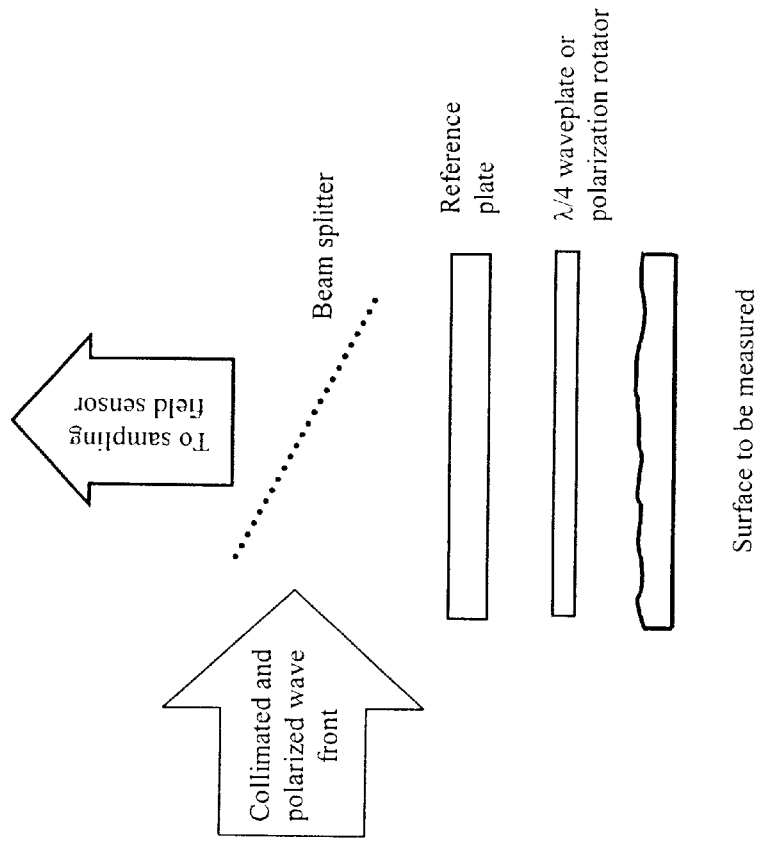
FIGS. 26(a) and 26(b) respectively illustrate a Fizeau interferometer with (a) regular phase-shift system and (b) a system with a diversity generator.
Figure 26A:
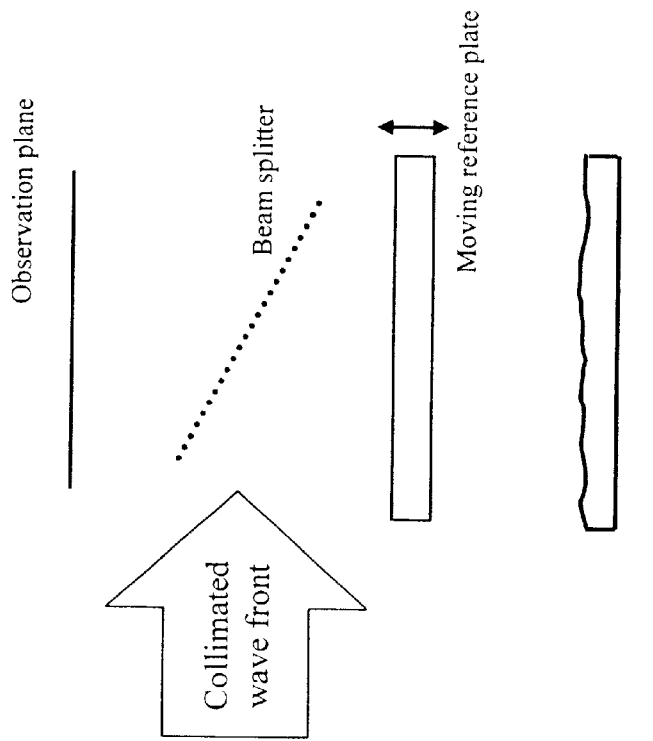

The application of the current method to a Fizeau interferometer is similar to its application to a Michelson interferometer and it is shown in FIGS. 26(a) and (b). In addition, similarly to a Michelson interferometer, the generation of the phase diversity information can be done separately in each path (case (i)), or at least one path, by placing an SDG in that path.

Figure 27:
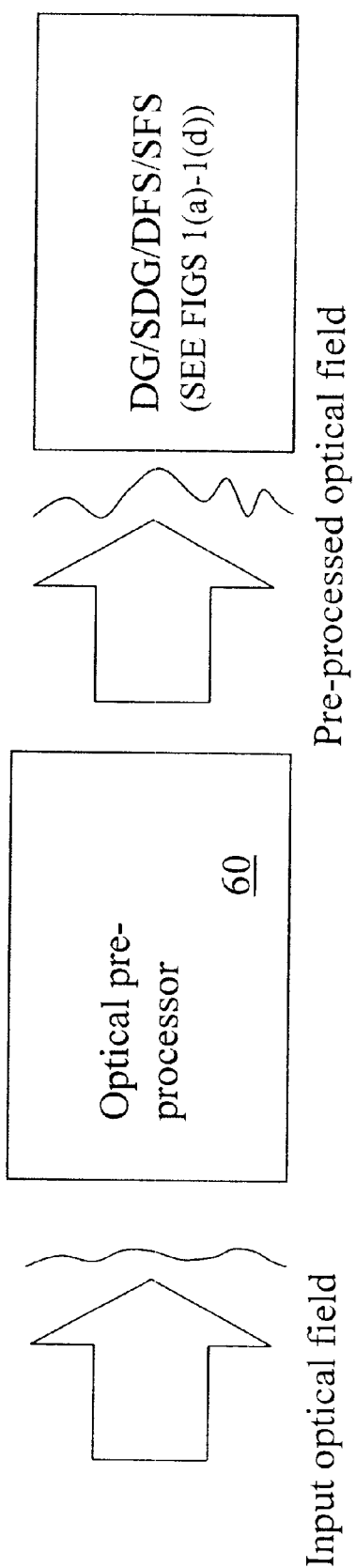
FIG. 27 illustrates a sampling field sensor with optical pre-processor.

DG/SDG/DFS/SFS Device With Optical Pre-processor (FIG. 27)

The DG/SDG/DFS/SFS FIGS. 1(a)–1(d) system can be used alone or with a multitude of known optical systems which process the coherence, spectral, phase, amplitude, polarization, and spectral content of the input optical field. FIG. 27 shows such a setup with the input system as optical pre-processor 60. This is helpful, for example, in eliminating the vibration sensitivity of the optical pre-processor by generating the required amplitude, phase, polarization, coherence, and multispectral information in a smaller (than usually) number of frames of the output data. The idea is to have all the information in only one frame. The optical pre-processor can be a Fizeau or a Michelson interferometer, for example, as explained above. Other examples are the rotational shearing interferometer and the MESA system (geometrically desensitized interferometer) made by ZYGO Corp. A different optical pre-processor may be desirable depending on the particular situation of use.

Figure 28:
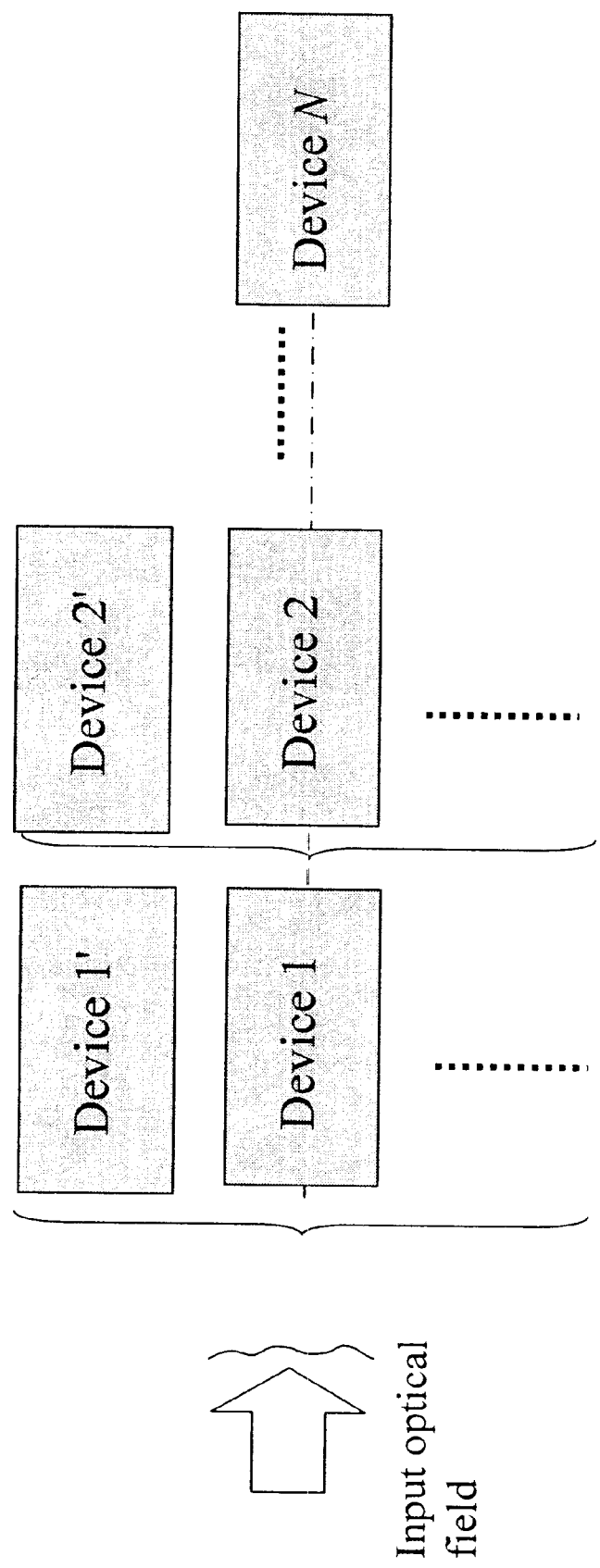
FIG. 28 illustrates a parallel/cascade use of a DG/SDG/DFS/SFS of FIGS. 1(a)–1(d).

Method for Using Multiple DG/SDG/DFS/SFS Devices Alone or in Conjunction With Other Optical Systems for Series/parallel Processing of the Optical Field A cascaded system of the invention uses a multitude of the FIG. 28 basic systems (with similar or different characteristics) with the input plane of each system coinciding with the output plane of the preceding (with the exception of the first in the series, of course) system. Sampling devices may or may not be placed at the intermediary (output/input) planes. The optical field can also be redirected for parallel processing using microelectronic mirrors/digital mirror devices (MEMS/DMD) sampling devices.

From the examples and description, artisans will appreciate that the invention provides a method to generate amplitude, phase, shear, and polarization diversity in an optical system along an essentially common optical path for the purpose of interferometric phase, amplitude, polarization, coherence, and spectral content estimation of sparsely sampled optical fields. The method can be applied to continuous fields by using a sampling device to obtain sparsely sampled optical fields. The input field is imaged through a wavefront/amplitude splitting element, such as a birefringent or a diffractive element, such that multiple appropriately modified copies are obtained in the output plane.

Further, the invention provides a device for generating amplitude, phase, shear, and polarization diversity in sparsely sampled fields along an essentially common optical path, the diversity generator (DG) illustrated in FIG. 1(a). The DG includes an imaging system and a wavefront/amplitude splitting element, which may be a birefringent and/or diffractive element. The method also provides a device for generating amplitude, phase, shear, and polarization diversity in continuous fields along an essentially common optical path, the sampling diversity generator (SDG) illustrated in FIG. 1(b). The SDG consists of sampling device and a DG. The sampling device is used to obtain a sparsely sampled field, which is then fed to the DG. The method also provides for a device (diversity field sensor or DFS) that retrieves information from a sparsely sampled input field by using a DG in conjunction with an appropriately designed array of photodetectors to measure the intensity at the output of the DG and a data processor. The data is processed with algorithms parameterized by the characteristics of the fan out, in order to retrieve information about the input. The method also provides a similar device (sampling field sensor or SFS) shown in FIG. 1(d), which is capable of retrieving information from continuous fields by combining a sampling device with a DFS.

The invention also provides a method to match the fan-out geometry of a given wavefront/amplitude splitting element with multiple sampling geometries and/or detector arrays in an DG/SDG/DFS/SFS device. Multiple devices may be used alone or in conjunction with other optical systems for series and/or parallel processing of the input to optical field.

These and other features will be apparent to artisans. While various embodiments of the present invention have been shown and described, it should be understood that other modifications, substitutions and alternatives are apparent to one of ordinary skill in the art. Such modifications, substitutions and alternatives can be made without departing from the spirit and scope of the invention, which should be determined from the appended claims.

Various features of the invention are set forth in the appended claims.

What is claimed is:

1. A light field sensor comprising:
   a sampling mask, the mask including an array of holes for transmitting light field samples therethrough;
   an imaging lens for imaging the sampling mask;
   a set of birefringent plates which fan out an image produced by said imaging lens such that multiple copies of a sample sampled by said sampling mask are produced, the multiple copies having a predetermined phase shift and polarization;
   an output sensing plane for sensing intensity of an output optical field; and
   a processor for estimating sample intensity and phase at the sampling mask, the processor using an interferometric algorithm parameterized by said sampling mask, imaging lens and birefringent plates and relationships therebetween.

2. The light field sensor of claim 1, wherein the multiple copies are positioned such that there is at least partial overlap between at least two of: any of the copies, any of sample images, and a second optical field.

3. The light field sensor of claim 1, further comprising a recording medium that records the intensity of the output optical field.

4. The sensor of claim 1, further comprising one of a waveplate and a phase retarder placed after one of the birefringent plates in order to modify a phase delay between an extraordinary component and an ordinary component of an optical field exiting the one of the birefringent plates.

5. The sensor of claim 1, further comprising a polarization element placed after the birefringent plates and before the output sensing plane in order to select a common polarization component of an extraordinary component and an ordinary component of an optical field exiting the birefringent plates, thereby producing interference between the extraordinary component and the ordinary component.

6. A method for generating diversity information from an input optical field comprising samples separated by empty regions, the method comprising:
   generating diversity information from the samples in the input optical field through use of a diversity fan out device, wherein the generating includes fanning out images of the samples, together with a copy of a first sample image of the sample images placed at least partially in an empty region between the sample images, on a substantially common optical path;
   providing interferometric diversity information on the substantially common optical path by providing at least partial overlap between at least two of: the copy, any of the sample images, and a second optical field; and
   estimating, through interferometric algorithms applied to the diversity information and parameterized based upon said fan out device at least one of the following properties of at least one of the samples: phase, amplitude, state of polarization and spectral content.

7. The method of claim 6, wherein said step of estimating is conducted upon a single frame of diversity information.

8. The method of claim 6, further comprising reconstructing a wave-front map from estimates of phase obtained through said step of estimating by obtaining phase differences between different samples of the input field.

9. The method according to claim 6, further comprising reconstructing a wave-front map, wherein said step of estimating comprises estimating phase differences between the samples of the input field and the second optical field.

10. The method according to claim 6, wherein said step of estimating includes estimating a polarization state of the input optical field, the step of generating comprising fanning out phase-shifted copies of a first polarization component together with phase-shifted copies of a second polarization component from a plurality of the samples of the input optical field.

11. The method of claim 6, further comprising sampling a continuous optical field to provide the samples separated by the empty regions of the input optical field.

12. The method according to claim 11, wherein the sampling is conducted through using a device selected from the group consisting of amplitude masks, phase masks, liquid crystal amplitude modulators, liquid crystal phase modulators, micro-electromechanical mirrors, lenslet arrays, arrays of focusing optical elements, optical fibers, optical fiber bundles.

13. The method of claim 6, further comprising:
fanning out the sample images with a plurality of copies, at least some of the copies being placed in empty regions between the sample images on the substantially common optical path, the plurality of copies including one of: multiple copies of one of the sample images and a copy of different sample images; and
providing at least partial overlap between at least two of: any of the copies, any of the sample images, and the second optical field, to provide the diversity information on the substantially common optical path.

14. The method according to claim 10, further comprising producing interferometric polarization information by overlapping at least partially one of: a copy of a first polarization component of one sample and an image of the first polarization component of the one sample with one of a copy of a second polarization component of the one sample and an image of the second polarization component of the one sample.

15. The method according to claim 6, further comprising modifying one of a phase, amplitude, state of polarization and spectral content of one of: the copy and one of the sample images.

16. The method according to claim 6, further comprising providing phase diversity by adjusting a phase of the copy to be substantially different from a phase of the first sample image.

17. The method according to claim 6, further comprising providing shearing diversity by positioning the copy and the first sample image such that:
at least partial overlap exists between the copy and one of a second sample image and a copy of the second sample image; and
at least partial overlap exists between the first sample image and a copy of a third sample image.

18. The method according to claim 17, wherein an imaginary axis connecting the first sample image and the second sample image is substantially orthogonal to a second imaginary axis connecting the first sample image and the third sample image.

19. The method according to claim 6, further comprising providing polarization diversity by providing a state of polarization of the copy substantially different from a state of polarization of the first sample image.

20. The method according to claim 19, wherein the state of polarization of the copy is substantially orthogonal to the state of polarization of the first sample image.

21. The method according to claim 6, providing spectral diversity by providing a spectral content of the copy substantially different from a spectral content of the first sample image.

22. The method according to claim 6, wherein said second optical field is provided by a reference path of a conventional interferometer.

23. The method according to claim 22, wherein said conventional interferometer is selected from the group consisting of two-beam interferometers, Michelson interferometers, Fizeau interferometers, Mach-Zehnder interferometers, geometrically desensitized interferometers, rotational shear interferometers, and Twyman-Green interferometers.

24. The method according to claim 6, wherein said second optical field comprises samples separated by empty regions.

25. The method of claim 24, further comprising sampling a continuous optical field to provide the samples separated by the empty regions of one of the input optical field and the second optical field.

26. The method according to claim 25, wherein the sampling is conducted through using a device selected from the group consisting of amplitude masks, phase masks, liquid crystal amplitude modulators, liquid crystal phase modulators, micro-electromechanical mirrors, lenslet arrays, arrays of focusing optical elements, and optical fibers.

27. The method according to claim 10, wherein a polarization state of said second polarization component is substantially orthogonal to a polarization state of said first polarization component.

28. A method for generating diversity information from an optical field comprising samples separated by empty regions, the diversity information including at least some interferometric image elements, the method comprising:
imaging the samples of the optical field into sample images;
splitting at least one of a wavefront and an amplitude of the sample images produced by said imaging to produce at least one additional copy of a first a sample image of the sample images, the copy of the first sample image and the sample images being created along a substantially common optical path,
positioning the copy at least partially in a space between the sample images; and
providing at least partial overlap between at least two of: the copy, any of the sample images, and a second optical field.

29. The method according to claim 28, wherein said splitting is conducted by a diffractive element.

30. The method according to claim 29, wherein said imaging is conducted by an imaging element, and the diffractive element is placed within one of a pupil, a Fourier plane, and a focal plane of the imaging element.

31. The method according to claim 28, wherein said step of imaging is conducted by an imaging element and the diffractive element is placed adjacent the imaging element.

32. The method according to claim 28, wherein said splitting is conducted by a birefringent element.

33. The method according to claim 32, wherein the birefringent element is made at least partially from materials selected from: quartz, calcite, magnesium fluoride, $YVO_4$, $LiNbO_3$, and $BaB_2O_4$.

34. The method according to claim 28, wherein said splitting introduces a phase shift in the copy.

35. The method according to claim 28, wherein said splitting introduces a polarization shift in the copy.

36. The method according to claim 28, wherein a plurality of copies of the first sample image are generated, further comprising:

field modulating at least some of the copies and the first sample image through selectively changing at least one of an amplitude, phase, state of polarization, and spectral content, in a different way for the at least some of the copies and the first sample image; and conducting a second stage of said steps of imaging and splitting with the field obtained from said field modulating.

37. The method according to claim 32, wherein the imaging is conducted by an imaging element placed after the birefringent element.

38. The method of claim 28, further comprising sampling a continuous optical field to provide the samples separated by the empty regions of the input optical field.

39. The method according to claim 28, further comprising:

splitting at least one of the wavefront and the amplitude of the sample images produced by the imaging to produce a plurality of copies, the copies and the sample images being created along the substantially common optical path, the plurality of copies including one of: multiple copies of one of the sample images and a copy of different sample images;

positioning at least some of the copies at least partially in the spaces between the sample images; and providing at least partial overlap between at least one of: any of the copies, any of the sample images, and the second optical field.

40. The method according to claim 28, further comprising modifying one of a phase, amplitude, state of polarization and spectral content of one of: the copy and one of the sample images.

41. The method according to claim 28, further comprising providing phase diversity by adjusting a phase of the copy to be substantially different from a phase of the first sample image.

42. The method according to claim 28, further comprising providing shearing diversity by positioning the copy of the first sample image and the first sample image such that:

at least partial overlap exists between the copy and one of a second sample image and a copy of the second sample image; and at least partial overlap exists between the first sample image and a copy of a third sample image.

43. The method according to claim 42, wherein an imaginary axis connecting the first sample image and the second sample image is substantially orthogonal to a second imaginary axis connecting the first sample image and the third sample image.

44. The method according to claim 28, further comprising providing polarization diversity by providing a state of polarization of the copy substantially different from a state of polarization of the first sample image.

45. The method according to claim 44, wherein the state of polarization of the copy is substantially orthogonal to the state of polarization of the first sample image.

46. The method according to claim 28, providing spectral diversity by providing a spectral content of the copy substantially different from a spectral content of the first sample image.

47. The method according to claim 28, wherein said second optical field is provided by a reference path of a conventional interferometer.

48. The method according to claim 47, wherein said conventional interferometer is selected from the group consisting of two-beam interferometers, Michelson interferometers, Fizeau interferometers, Mach-Zehnder interferometers, geometrically desensitized interferometers, rotational shear interferometers, and Twyman-Green interferometers.

49. The method according to claim 38, wherein the sampling is conducted through using a device selected from the group consisting of amplitude masks, phase masks, liquid crystal amplitude modulators, liquid crystal phase modulators, micro-electromechanical mirrors, lenslet arrays, arrays of focusing optical elements, and optical fibers.

50. The method of claim 28, further comprising:

one of sensing and recording intensity of the sample images and copy, including interferometric information provided by said overlap;

processing information obtained in said step of one of sensing and recording in order to estimate through interferometric algorithms at least one of a phase, amplitude, state of polarization, and spectral content of at least some of the samples of the input optical field.

51. The method of claim 32, further comprising modifying a phase delay between an extraordinary component and an ordinary component of an optical field exiting the birefringent element through using one of a waveplate and a phase retarder.

52. The method according to claim 32, further comprising producing interference between an extraordinary component and an ordinary component of an optical field exiting the birefringent element, through using a polarization element placed after the birefringent element such that a common polarization component of the extraordinary component and the ordinary component is selected.

53. The method according to claim 28, wherein the imaging is conducted by an afocal imaging element.

* * * * *

UNITED STATES PATENT AND TRADEMARK OFFICE
CERTIFICATE OF CORRECTION

| | | |
|---|---|---|
| PATENT NO. | : 6,639,683 B1 | Page 1 of 1 |
| APPLICATION NO. | : 09/690576 | |
| DATED | : October 28, 2003 | |
| INVENTOR(S) | : Remy Tumbar et al. | |

It is certified that error appears in the above-identified patent and that said Letters Patent is hereby corrected as shown below:

In the Claims

Column 33, in claim 14, line 5, after "one sample with" delete "one of".

Column 34, in claim 28, line 9, after "copy of a first" delete "a".

Signed and Sealed this

Twenty-ninth Day of May, 2007

JON W. DUDAS
*Director of the United States Patent and Trademark Office*